US012338356B2

(12) United States Patent
Yoshimori et al.

(10) Patent No.: US 12,338,356 B2
(45) Date of Patent: Jun. 24, 2025

(54) NONAQUEOUS INK COMPOSITION, AND RECORDING METHOD AND RECORDED MATTER MANUFACTURING METHOD USING SAME

(71) Applicant: DNP FINE CHEMICALS CO., LTD., Yokohama (JP)

(72) Inventors: Keishiro Yoshimori, Yokohama (JP); Yuka Orikasa, Yokohama (JP); Kisei Matsumoto, Yokohama (JP); Koujun Utaka, Yokohama (JP); Mitsuyoshi Tamura, Yokohama (JP); Mitsuteru Yamada, Yokohama (JP); Ryouhei Oka, Yokohama (JP); Yoshiya Maegawa, Yokohama (JP)

(73) Assignee: DNP FINE CHEMICALS CO., LTD., Yokohama (JP)

( * ) Notice: Subject to any disclaimer, the term of this patent is extended or adjusted under 35 U.S.C. 154(b) by 266 days.

(21) Appl. No.: 18/246,728

(22) PCT Filed: Sep. 30, 2021

(86) PCT No.: PCT/JP2021/036069
§ 371 (c)(1),
(2) Date: Mar. 27, 2023

(87) PCT Pub. No.: WO2022/071477
PCT Pub. Date: Apr. 7, 2022

(65) Prior Publication Data
US 2023/0365826 A1 Nov. 16, 2023

(30) Foreign Application Priority Data

Sep. 30, 2020 (JP) ................. 2020-166569
Sep. 30, 2020 (JP) ................. 2020-166585

(51) Int. Cl.
*C09D 11/36* (2014.01)
*B41M 5/00* (2006.01)
(52) U.S. Cl.
CPC ........... *C09D 11/36* (2013.01); *B41M 5/0047* (2013.01); *B41M 5/0064* (2013.01)
(58) Field of Classification Search
CPC ..... C09D 11/106; C09D 11/107; C09D 11/14; C09D 11/36; B41M 5/0047; B41M 5/0065
See application file for complete search history.

(56) References Cited

U.S. PATENT DOCUMENTS

2004/0266907 A1 12/2004 Sugita et al.
2009/0124731 A1 5/2009 Mizutani et al.
2015/0035895 A1 2/2015 Kubota et al.
2015/0210878 A1* 7/2015 Iida ................. C08K 5/3417
106/31.78
2015/0353749 A1 12/2015 Yoda et al.
2016/0237292 A1 8/2016 Koike et al.

FOREIGN PATENT DOCUMENTS

| EP | 1 857 513 A1 | 11/2007 |
| EP | 2 210 922 A1 | 7/2010 |
| EP | 2 341 109 A1 | 7/2011 |
| JP | 2005-15672 A | 1/2005 |
| JP | 2010-121015 A | 6/2010 |
| JP | 2010-126585 A | 6/2010 |
| JP | 2014-95079 A | 5/2014 |
| JP | 2014-185207 A | 10/2014 |
| JP | 2015-196731 A | 11/2015 |
| JP | 2016-113594 A | 6/2016 |
| JP | 2016-150983 A | 8/2016 |
| JP | 2017-088714 A | 5/2017 |
| JP | 2018-53207 A | 4/2018 |
| JP | 2018-17812 A | 11/2018 |
| JP | 2019-31618 A | 2/2019 |
| WO | 2004/007626 A1 | 1/2004 |

OTHER PUBLICATIONS

Nov. 30, 2021 International Search Report issued in International Patent Application No. PCT/JP2021/036069.
May 11, 2021 Notice of Reasons for Refusal issued in Japanese Patent Application No. 2021-031478.
Oct. 5, 2021 Notice of Reasons for Refusal issued in Japanese Patent Application No. 2021-031478.
May 11, 2021 Notice of Reasons for Refusal issued in Japanese Patent Application No. 2021-031603.
Oct. 5, 2021 Notice of Reasons for Refusal issued in Japanese Patent Application No. 2021-031603.
Oct. 30, 2024 Extended Search Report issued in European Patent Application No. 21875773.0.
Mar. 28, 2024 Office Action issued in Australian Patent Application No. 2021355246.
May 31, 2023 Office Action issued in India Patent Application No. 202347022585.
May 7, 2025 Office Action issued in Chinese Application No. 202180065779.3.

* cited by examiner

*Primary Examiner* — Anh T Vo

(74) *Attorney, Agent, or Firm* — Oliff PLC

(57) ABSTRACT

A nonaqueous ink composition contains organic solvents. The organic solvents include an organic solvent (a) and an organic solvent (b). Organic solvent (a): Glycol ether dialkyl. Organic solvent (b): At least one selected from the group consisting of alkylamide-based solvents (b1), cyclic amide-based solvents (b2), and lactone-based solvents (b3) each having a ring including six or more members.

22 Claims, No Drawings

NONAQUEOUS INK COMPOSITION, AND RECORDING METHOD AND RECORDED MATTER MANUFACTURING METHOD USING SAME

TECHNICAL FIELD

The present invention relates to a nonaqueous ink composition, a recording method using the nonaqueous ink composition, and a method for producing a recorded product.

BACKGROUND ART

Ink compositions widely used include aqueous ink compositions, which include water or a mixture of water and an organic solvent and a colorant dissolved or dispersed therein, and nonaqueous ink compositions, which include a water-free organic solvent and a colorant dissolved or dispersed therein.

For example, Patent Document 1 discloses a nonaqueous ink composition including a colorant, a specific glycol ether, and a five-membered ring lactone solvent. Patent Document 1 states that the nonaqueous ink composition is suitable for use in printing on substrates, has a high ability to dry during recording and high storage stability, and provides high print quality and high record stability.

Patent Document 1 also states that the nonaqueous ink composition preferably contains a binder resin, which is used to adjust the viscosity of the nonaqueous ink composition and to provide, to the nonaqueous ink composition, an improved ability to be fixed on polyvinyl chloride substrates.

Patent Document 1: WO2004/007626

DISCLOSURE OF THE INVENTION

Problems to be Solved by the Invention

Since the five-membered ring lactone solvent can easily permeate into resin substrates, the nonaqueous ink composition containing the five-membered ring lactone solvent has a high ability to permeate into resin substrates although it has a high ability to dry during recording.

The inventors have found that unfortunately, as the permeation of such a nonaqueous ink composition into a resin substrate increases, the solvent in the nonaqueous ink composition tends to remain in the substrate even after the nonaqueous ink composition is allowed to dry sufficiently on the surface of the substrate. If a film is bonded to the surface of the resulting recorded product, the residual solvent, derived from the nonaqueous ink composition and remaining in the substrate, may volatilize to cause lifting of the film from the substrate. In the description, such a problem will also be referred to as deterioration of the post-processability of the recorded product.

It is an object of the present invention to provide a nonaqueous ink composition that has a high ability to dry during recording and provides a recorded product having good post-processability.

For example, the substrate (recording medium) on which the nonaqueous ink composition is to be used may include a resin substrate with a pressure-sensitive adhesive layer on one side. In some cases, the nonaqueous ink composition is used to record on the other side of such a resin substrate with the pressure-sensitive adhesive layer on one side, and the pressure-sensitive adhesive layer is bonded to an additional material (adherend).

Studies by the inventors have revealed that in such cases, however, a five-membered ring lactone solvent in the nonaqueous ink composition can permeate from the decorated layer into the pressure-sensitive adhesive layer on the back side to deteriorate the adhesion properties of the pressure-sensitive adhesive layer (the adhesion between the recorded product and the adherend).

Studies by the inventors have further revealed that stretching the recorded product, which includes the resin substrate and the nonaqueous ink composition deposited thereon, may cause blushing of the layer decorated with the nonaqueous ink composition so that the decorated layer will no longer have the desired color and design.

It is an object of the present invention to provide a nonaqueous ink composition that is useful on a variety of substrates, is less likely to deteriorate the adhesion properties of a pressure-sensitive adhesive layer even when used to record (print), for example, on one side of a resin substrate with the pressure-sensitive adhesive layer on the other side (less likely to deteriorate the adhesion between the recorded product and the adherend), and is effectively prevented from causing blushing of the decorated layer even during the stretching of the recorded product.

Means for Solving the Problems

As a result of intensive studies for solving the problem described above, the inventors have completed the present invention based on findings that a nonaqueous ink composition containing specific organic solvents provides a solution to the problem.

As a result of further intensive studies for solving the problem, the inventors have completed the present invention based on findings that a nonaqueous ink composition containing a specific organic solvent and a resin with a specific weight average absolute molecular weight also provides a solution to the problem. Specifically, the present invention provides the following aspects.

(1) A nonaqueous ink composition including organic solvents including an organic solvent (a) and an organic solvent (b),
wherein the organic solvent (a) is a dialkyl glycol ether, and
wherein the organic solvent (b) is at least one selected from the group consisting of an alkylamide solvent (b1), a cyclic amide solvent (b2), and a six- or more-membered ring lactone solvent (b3).

(2) The nonaqueous ink composition according to aspect (1), wherein the content of the organic solvent (b) is in the range of 3.0 mass % or more and 30.0 mass % or less based on the total mass of the nonaqueous ink composition.

(3) The nonaqueous ink composition according to aspect (1) or (2), wherein the organic solvent (a) is a dialkyl glycol ether represented by formula (1):

[Chem. 1]

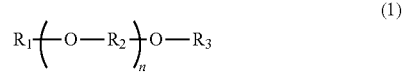

(1)

where $R_1$ and $R_3$ each represent an alkyl group, $R_2$ represents an ethylene or propylene group, and n represents an integer of 2 to 4.

(4) The nonaqueous ink composition according to aspect (3), wherein the total number of carbon atoms in $R_1$ and $R_3$ in formula (1) is two or more and six or less.

(5) The nonaqueous ink composition according to aspect (4), wherein in formula (1) for the organic solvent (a), $R_1$ is a methyl or ethyl group and $R_3$ is an ethyl group, and/or in formula (1), $R_1$ and $R_3$ are methyl groups and $R_2$ is a propylene group.

(6) The nonaqueous ink composition according to any one of aspects (1) to (5), wherein the content of impurities derived from the organic solvent (a) is 0.5 mass % or less based on the total mass of the organic solvent (a), and wherein the content of impurities derived from the organic solvent (b) is 0.5 mass % or less based on the total mass of the organic solvent (b).

(7) A nonaqueous ink composition including an organic solvent and a resin,
wherein the organic solvent includes an organic solvent (b),
wherein the resin has a weight average absolute molecular weight of 15,000 or more and 80,000 or less, and
wherein the organic solvent (b) is at least one selected from the group consisting of an alkylamide solvent (b1), a cyclic amide solvent (b2), and a six- or more-membered ring lactone solvent (b3).

(8) The nonaqueous ink composition according to aspect (7), wherein the resin includes at least one selected from the group consisting of an acrylic resin, a vinyl chloride-vinyl acetate copolymer resin, and a cellulosic resin.

(9) The nonaqueous ink composition according to aspect (7) or (8), wherein the content of impurities derived from the organic solvent (b) is 0.5 mass % or less based on the total mass of the organic solvent (b).

(10) The nonaqueous ink composition according to any one of aspects (1) to (9), wherein the organic solvent (b) is an alkylamide solvent (b1).

(11) The nonaqueous ink composition according to aspect (10), wherein the alkylamide solvent (b1) is represented by formula (2):

[Chem. 2]

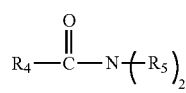

(2)

where $R_4$ represents hydrogen or an alkyl group having one or more and four or less carbon atoms, and $R_1$ represents an alkyl group having two or more and four or less carbon atoms.

(12) The nonaqueous ink composition according to aspect (11), wherein the alkylamide solvent (b1) includes at least one selected from the group consisting of N,N-diethylformamide, N,N-diethylpropanamide, and N,N-diethylacetamide.

[13] The nonaqueous ink composition according to any one of aspects (1) to (9), wherein the organic solvent (b) is a cyclic amide solvent (b2).

(14) The nonaqueous ink composition according to aspect (13), wherein the cyclic amide solvent (b2) is represented by formula (3):

[Chem. 3]

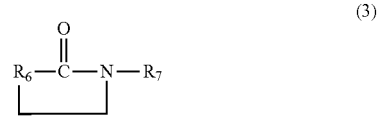

where $R_6$ represents an alkylene group having four or more and five or less carbon atoms, and $R_7$ represents hydrogen, an alkyl group having one or more and two or less carbon atoms, or an unsaturated hydrocarbon group.

(15) The nonaqueous ink composition according to aspect (14), wherein the cyclic amide solvent (b2) includes at least one selected from the group consisting of ε-caprolactam, N-methylcaprolactam, and N-vinylcaprolactam.

(16) The nonaqueous ink composition according to any one of aspects (1) to (9), wherein the organic solvent (b) is a six- or more-membered ring lactone solvent (b3).

(17) The nonaqueous ink composition according to aspect (16), wherein the six- or more-membered ring lactone solvent (b3) is represented by formula (4):

[Chem. 4]

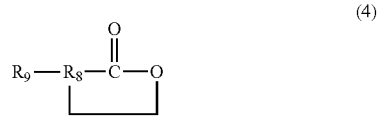

where $R_8$ represents an alkylene group having four or more and five or less carbon atoms, and $R_9$ represents hydrogen or an alkyl group having one or more and two or less carbon atoms.

(18) The nonaqueous ink composition according to aspect (17), wherein the six- or more-membered ring lactone solvent (b3) includes at least one selected from the group consisting of δ-valerolactone, δ-hexanolactone, and ε-caprolactone.

(19) The nonaqueous ink composition according to any one of aspects (1) to (18), wherein the content of water is 1.0 mass % or less based on the total mass of the nonaqueous ink composition.

(20) The nonaqueous ink composition according to any one of aspects (1) to (19), wherein the nonaqueous ink composition is for use on a resin substrate.

(21) A recording method including ejecting the nonaqueous ink composition according to any one of aspects (1) to (19) onto a surface of a substrate by an inkjet method.

(22) A method for producing a recorded product, the method including ejecting the nonaqueous ink composition according to any one of aspects (1) to (19) onto a surface of a substrate by an inkjet method.

Effects of the Invention

The nonaqueous ink composition of the present invention has a high ability to dry during recording and provides a recorded product having good post-processability. Thus, the nonaqueous ink composition of the present invention is useful on a variety of substrates (recording media) including non-absorbable substrates, such as resin substrates, metal sheets, and glass, absorbable substrates, such as paper and fabrics, and surface-coated substrates.

The nonaqueous ink composition of the present invention is also useful on a variety of substrates (recording media) including non-absorbable substrates, such as resin substrates, metal sheets, and glass, absorbable substrates, such as paper and fabrics, and surface-coated substrates. The nonaqueous ink composition of the present invention may also be used to record (print) on one side of a resin substrate with a pressure-sensitive adhesive layer on the other side. Even in such a case, the nonaqueous ink composition of the present invention is less likely to deteriorate the adhesion properties of the pressure-sensitive adhesive layer (the adhesion between the recorded product and the adherend), and is effectively prevented from causing blushing of the decorated layer even during the stretching of the recorded product.

PREFERRED MODE FOR CARRYING OUT THE INVENTION

Hereinafter, specific embodiments of the present invention will be described in detail. It will be understood that the embodiments described below are not intended to limit the present invention and may be altered or modified as appropriate for implementation without departing from the gist of the present invention.

Nonaqueous Ink Composition According to First Embodiment

An embodiment of the present invention is directed to a nonaqueous ink composition including organic solvents including a dialkyl glycol ether (organic solvent (a)) and at least one (organic solvent (b)) selected from the group consisting of an alkylamide solvent (b1), a cyclic amide solvent (b2), and a six- or more-membered ring lactone solvent (b3).

The nonaqueous ink composition with such features has a high ability to dry during recording and provides a recorded product having good post-processability. Thus, the nonaqueous ink composition according to this embodiment is useful on a variety of substrates (recording media) including resin substrates.

As used herein, the term "nonaqueous ink composition" means an organic solvent-containing, ink composition (oil-based ink composition) that does not intentionally contain water and may unintentionally contain water derived from the air, additives, or other sources. Such an ink composition differs from any aqueous ink composition including water or a mixture of water and an organic solvent and a colorant dissolved or dispersed therein. The "nonaqueous ink composition" is highly quick-drying and enables easy printing (recording) on non-absorbable substrates, such as resin substrates and metal substrates. The same applies to the nonaqueous ink composition according to a second embodiment of the present invention described later.

The nonaqueous ink composition preferably has a water content of 5.0 mass % or less, more preferably 3.0 mass % or less, even more preferably 1.0 mass % or less, furthermore preferably 0.5 mass % or less, based on the total mass of the nonaqueous ink composition. For example, the nonaqueous ink composition may be a jet printing, nonaqueous ink composition, and in such a case, the nonaqueous ink composition can be ejected onto the surface of a substrate by an inkjet method with improved ejection stability and improved storage stability without causing troubles, such as nozzle clogging.

Hereinafter, each component in the nonaqueous ink composition according to this embodiment will be described.

Organic Solvents

The organic solvents include an organic solvent (a) and an organic solvent (b).

Organic solvent (a): dialkyl glycol ether

Organic solvent (b): at least one selected from the group consisting of an alkylamide solvent (b1), a cyclic amide solvent (b2), and a six- or more-membered ring lactone solvent (b3)

Hereinafter, each of the organic solvent (a) and the organic solvent (b) will be described more specifically.

Organic Solvent (a)

The organic solvent (a) is a dialkyl glycol ether. The dialkyl glycol ether is a glycol compound with alkyl-substituted OH groups at both ends. The dialkyl glycol ether, which has a suitable level of volatility, allows the nonaqueous ink composition to dry before the occurrence of image blurring and to provide high image quality. Moreover, the dialkyl glycol ether cannot well permeate into resins and thus allows the recorded product to have improved post-processability. Furthermore, the dialkyl glycol ether is less likely to dissolve or swell plastic materials or adhesives and thus allows the nonaqueous ink composition to have a good adequacy for inkjet heads and other components in a case where the nonaqueous ink composition is a jet printing ink composition to be ejected onto the surfaces of substrates by inkjet method.

The dialkyl glycol ether may be, for example, a dialkyl glycol ether represented by formula (1) below.

[Chem. 5]

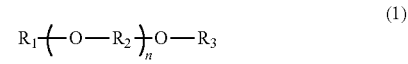

(1)

In formula (1), $R_1$ and $R_3$ each represent an alkyl group, $R_2$ represents an ethylene or propylene group, and n represents an integer of 2 to 4.

Examples of the dialkyl glycol ether includes ethylene glycol dibutyl ether, ethylene glycol dipropyl ether, diethylene glycol dimethyl ether, diethylene glycol diethyl ether, diethylene glycol methyl ethyl ether, diethylene glycol dipropyl ether, diethylene glycol propyl methyl ether, diethylene glycol isopropyl methyl ether, diethylene glycol dibutyl ether, diethylene glycol butyl methyl ether, diethylene glycol butyl ethyl ether, diethylene glycol methyl-2-ethyl hexyl ether, triethylene glycol dimethyl ether, triethylene glycol diethyl ether, triethylene glycol ethyl methyl ether, tetraethylene glycol dimethyl ether, tetraethylene glycol diethyl ether, tetraethylene glycol ethyl methyl ether, propylene glycol diethyl ether, propylene glycol ethyl methyl ether, propylene glycol methyl propyl ether, propylene glycol methyl butyl ether, propylene glycol methyl-2-ethyl hexyl ether, dipropylene glycol dimethyl ether, dipropylene glycol diethyl ether, dipropylene glycol ethyl methyl ether, dipropylene glycol methyl propyl ether, dipropylene glycol dipropyl ether, dipropylene glycol methyl butyl ether, tripropylene glycol dimethyl ether, tripropylene glycol diethyl ether, and tripropylene glycol ethyl methyl ether.

In the dialkyl glycol ether of formula (1), the total number of carbon atoms in $R_1$ and $R_3$ is preferably two or more and eight or less, more preferably two or more and six or less. In the dialkyl glycol ether of formula (1), $R_1$ is more preferably a methyl or ethyl group, and $R_3$ is more preferably an ethyl group, and/or $R_1$ and $R_3$ are more preferably methyl groups, and $R_2$ is more preferably a propylene group.

The dialkyl glycol ether with $R_1$ and $R_3$ having two or more and six or less carbon atoms in total is more volatile than, for example, diethylene glycol dibutyl ether (with $R_1$ and $R_3$ having eight carbon atoms in total) and thus forms a nonaqueous ink composition with a higher ability to dry during recording.

Examples of the dialkyl glycol ether with $R_1$ and $R_3$ having two or more and six or less carbon atoms in total include diethylene glycol methyl ethyl ether, diethylene glycol diethyl ether, diethylene glycol dimethyl ether, dipropylene glycol dimethyl ether, diethylene glycol isopropyl methyl ether, triethylene glycol dimethyl ether, tetraethylene glycol dimethyl ether, and tetraethylene glycol diethyl ether.

The dialkyl glycol ether of formula (1) with $R_1$ being a methyl or ethyl group and $R_3$ being an ethyl group and/or the dialkyl glycol ether of formula (1) with $R_1$ and $R_3$ being methyl groups and $R_2$ being a propylene group has a lower ability to permeate than, for example, diethylene glycol dimethyl ether (with $R_1$ and $R_3$ being methyl groups and $R_2$ being an ethylene group). This is more effective in providing recorded products with improved post-processability.

Examples of the dialkyl glycol ether of formula (1) with $R_1$ being a methyl or ethyl group and $R_3$ being an ethyl group include diethylene glycol methyl ethyl ether, diethylene glycol diethyl ether, triethylene glycol diethyl ether, and tetraethylene glycol diethyl ether. Examples of the dialkyl glycol ether of formula (1) with $R_1$ and $R_3$ being methyl groups and $R_2$ being a propylene group include dipropylene glycol dimethyl ether.

The lower limit of the content of the organic solvent (a) in the nonaqueous ink composition is preferably, but not limited to, 30.0 mass % or more, more preferably 40.0 mass % or more, even more preferably 50.0 mass % or more, based on the total mass of the nonaqueous ink composition.

The upper limit of the content of the organic solvent (a) in the nonaqueous ink composition is preferably, but not limited to, 90.0 mass % or less, more preferably 80.0 mass % or less, based on the total mass of the nonaqueous ink composition.

The dialkyl glycol ether, which can absorb water or water vapor from, for example, the air, is preferably dried in advance before being mixed with other components. The use of the pre-dried dialkyl glycol ether helps to form a nonaqueous ink composition with a proper water content (e.g., at most 1.0 mass % based on the total mass of the nonaqueous ink composition). A method for drying the dialkyl glycol ether includes, for example, drying inert gas (e.g., nitrogen gas) in an inert gas atmosphere, such as nitrogen, and then blowing the dried inert gas into the dialkyl glycol ether for a certain period of time.

During the production of the organic solvent (a) (dialkyl glycol ether), impurities are often generated, such as polymers, side reaction products, and decomposition products. For example, the content of impurities in a certain commercially available dialkyl glycol ether may be as high as about 10 mass % based on its total mass. It is preferred, therefore, that before the mixing of the organic solvent (a) with other components, the impurity content of the organic solvent (a) be preliminarily reduced to 0.5 mass % or less based on the total mass of the organic solvent (a). Low-boiling-point impurities in the organic solvent (a) may deteriorate the post-processability of the recorded product or may cause troubles, such as dissolution or swelling of plastic materials or adhesives in printer components, such as inkjet heads. Moreover, high-boiling-point impurities in the dialkyl glycol ether may reduce the ability of the nonaqueous ink composition to dry during recording and thus may cause print blurring. The preliminary reduction of the impurity content of the organic solvent (a) to 0.5 mass % or less before the mixing of the organic solvent (a) with other components helps to further improve the ability to dry during recording, the adequacy for components, and the post-processability of the recorded product.

Examples of impurities in the organic solvent (a) include, but are not limited to, triethylene glycol (boiling point 285° C.), tetraethylene glycol (boiling point 327° C.), polyethylene glycol (boiling point 330° C. or higher), ethylene glycol monoethyl ether (boiling point 135° C.), ethylene glycol monomethyl ether (boiling point 124° C.), ethylene glycol diethyl ether (boiling point 121° C.), ethylene glycol dimethyl ether (boiling point 98° C.), diethyl ether (boiling point 35° C.), ethyl methyl ether (boiling point 12° C.), diethyl ketone (boiling point 101° C.), dimethyl ketone (boiling point 57° C.), ethyl methyl ketone (boiling point 80° C.), ethoxyethanol (boiling point 135° C.), and ethanol (boiling point 78° C.).

The purification of the organic solvent (a) may be achieved by a method that includes repeatedly distilling the organic solvent (a) with narrow distillation temperature intervals to exclude impurities as much as possible or repeatedly performing extraction on the organic solvent (a) or by an industrial production process that includes the above steps and a procedure for preventing contamination.

Organic Solvent (b)

The organic solvent (b) is at least one selected from the group consisting of an alkylamide solvent (b1), a cyclic amide solvent (b2), and a six- or more-membered ring lactone solvent (b3). The organic solvent (b) has a lower ability to permeate into substrates than five-membered ring lactone solvent-containing nonaqueous ink compositions. This allows the nonaqueous ink composition to provide a recorded product with good post-processability.

The organic solvent (b) can quickly dry on the surfaces of substrates while it can somewhat permeate into substrates. Thus, the organic solvent (b)-containing ink composition has a high ability to dry during recording as five-membered ring lactone solvent-containing nonaqueous ink compositions do, and enables clear printing (recording) with less blurring. The less-blurring printing effect cannot be achieved simply by selecting a low-boiling-point solvent for increasing the ability to dry.

Moreover, the organic solvent (b) is less likely to dissolve or swell plastic materials or adhesives and thus provides, to the nonaqueous ink composition, a good adequacy for inkjet heads and other components in a case where the nonaqueous ink composition is a jet printing ink composition to be ejected onto the surfaces of substrates by inkjet method.

Hereinafter, each of the alkylamide solvent (b1), the cyclic amide solvent (b2), and the six- or more-membered ring lactone solvent (b3) categorized as the organic solvent (b) will be described.

(1) Alkylamide Solvent

The alkylamide solvent includes a compound including: a hydrogen atom or an alkyl group ($C_nH_{2n+1}$—); and a —C(=O)—N— group (amide bond). For example, the alkylamide solvent to be used preferably has the structure below.

[Chem. 6]

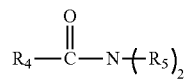

(2)

In Formula (2), $R_4$ represents hydrogen or an alkyl group having one or more and four or less carbon atoms, and $R_5$ represents an alkyl group having two or more and four or less carbon atoms.

Examples of the alkylamide solvent include N,N-diethylformamide, N,N-diethylacetamide, N,N-dipropylformamide, N,N-dibutylformamide, N,N-diethylpropanamide, and N,N-dipropylpropanamide. To make the present invention particularly advantageous, the nonaqueous ink composition preferably contains at least one selected from the group consisting of N,N-diethylformamide, N,N-diethylpropanamide, and N,N-diethylacetamide.

The nonaqueous ink composition may contain N,N-dimethylformamide or N,N-dimethylacetamide. To make the present invention particularly advantageous, however, it is preferred to exclude N,N-dimethylformamide and N,N-dimethylacetamide.

(2) Cyclic Amide Solvent

The cyclic amide solvent is a solvent having a —C(=O)—N— group-containing cyclic structure. For example, the cyclic amide solvent to be used preferably has the structure below.

[Chem. 7]

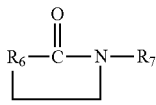

(3)

In formula (3), $R_6$ represents an alkylene group having four or more and five or less carbon atoms, and $R_7$ represents hydrogen, an alkyl group having one or more and two or less carbon atoms, or an unsaturated hydrocarbon group.

$R_7$ is more preferably hydrogen or an alkyl group having one or more and two or less carbon atoms.

Examples of the cyclic amide solvent include N-methylcaprolactam, N-acetylcaprolactam, ε-caprolactam, N-vinylcaprolactam, 2-pyrrolidone, N-methyl-2-pyrrolidone, N-ethyl-2-pyrrolidone, N-propyl-2-pyrrolidone, N-ethyl-ε-caprolactam, N-propyl-ε caprolactam, and N-methyl-ε-caprolactam. Among them, the nonaqueous ink composition preferably contains at least one selected from the group consisting of ε-caprolactam, N-methylcaprolactam, and N-vinylcaprolactam.

The nonaqueous ink composition may contain N-methyl-2-pyrrolidone, N-ethyl-2-pyrrolidone, 1,3-dimethyl-2-imidazolidinone, or N-methyloxazolidinone. To make the present invention particularly advantageous, however, it is preferred to exclude N-methyl-2-pyrrolidone, N-ethyl-2-pyrrolidone, 1,3-dimethyl-2-imidazolidinone, and N-methyloxazolidinone.

(3) Six- or More-Membered Ring Lactone Solvent

The six- or more-membered ring lactone solvent is a solvent having a six- or more-membered cyclic ester structure. For example, the six- or more-membered ring lactone solvent to be used preferably has the structure below.

[Chem. 8]

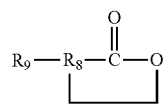

(4)

In formula (4), $R_8$ represents an alkylene group having four or more and five or less carbon atoms, and $R_9$ represents hydrogen or an alkyl group having one or more and two or less carbon atoms.

Examples of the six- or more-membered ring lactone solvent include δ-valerolactone, δ-hexanolactone, δ-heptalactone, δ-octalactone, δ-nonalactone, δ-decalactone, δ-undecalactone, and ε-caprolactone.

The nonaqueous ink composition containing the organic solvent (a) and the organic solvent (b) including at least one selected from the group consisting of the alkylamide solvent (b1), the cyclic amide solvent (b2), and the six- or more-membered ring lactone solvent (b3) produces advantageous effects according to the present invention. In particular, the nonaqueous ink composition preferably contains, as the organic solvent (b), at least one of the alkylamide solvent (b1) and the cyclic amide solvent (b2), and more preferably contains the alkylamide solvent (b1) as the organic solvent (b).

The upper limit of the content of the organic solvent (b) (at least one selected from the group consisting of the alkylamide solvent (b1), the cyclic amide solvent (b2), and the six- or more-membered ring lactone solvent (b3)) in the nonaqueous ink composition is preferably, but not limited to, 60.0 mass % or less, more preferably 45.0 mass % or less, even more preferably 35.0 mass % or less, furthermore preferably 17.0 mass % or less, based on the total mass of the nonaqueous ink composition.

The lower limit of the content of the organic solvent (b) in the nonaqueous ink composition is preferably, but not limited to, 3.0 mass % or more, more preferably 5.0 mass % or more, based on the total mass of the ink composition.

The upper and lower limits of the content of the organic solvent (b) apply to all of the alkylamide solvent (b1), the cyclic amide solvent (b2), and the six- or more-membered ring lactone solvent (b3). In particular, in a case where the organic solvent (b) is the six- or more-membered ring lactone solvent (b3), the content of the organic solvent (b) is preferably 5.0 mass % or more and 15.0 mass % or less based on the total mass of the nonaqueous ink composition.

It is preferred that before the mixing of the organic solvent (b) (at least one selected from the group consisting of the alkylamide solvent (b1), the cyclic amide solvent (b2), and the six- or more-membered ring lactone solvent (b3)) with other components, the impurity content of the organic solvent (b) be preliminarily reduced to 0.5 mass % or less based on the total mass of the organic solvent (b). Low-boiling-point impurities in the organic solvent (b) may deteriorate the post-processability of the recorded product or may cause troubles, such as dissolution or swelling of plastic materials or adhesives in printer components, such as inkjet heads. The preliminary reduction of the impurity content of the organic solvent (b) to 0.5 mass % or less before the mixing of the organic solvent (b) with other components helps to further improve the ability to dry during recording, the adequacy for components, and the post-processability of the recorded product. The preliminary reduction of the impurity content of the organic solvent (b) to 0.5 mass % or less also helps to prevent print blurring more effectively, which would otherwise be caused by high-boiling-point impurities in the organic solvent (b) that are capable of reducing the ability to dry during recording.

The purification of the organic solvent (b) may be achieved by a method that includes repeatedly distilling the organic solvent (b) with narrow distillation temperature intervals to exclude impurities as much as possible or repeatedly performing extraction on the organic solvent (b) or by an industrial production process that includes the above steps and a procedure for preventing contamination.

Additional Organic Solvent

The organic solvents may include an additional organic solvent in addition to the organic solvents (a) and (b). Specifically, such an additional organic solvent may be a monoalkyl glycol ether, which is a glycol derivative with one alkyl-substituted OH group, or a carbonate ester.

Examples of the monoalkyl glycol ether include ethylene glycol mono-n-butyl ether, ethylene glycol mono-isobutyl ether, ethylene glycol mono-tert-butyl ether, ethylene glycol mono-2-ethylhexyl ether, diethylene glycol mono-methyl (or -ethyl, -propyl, -isopropyl, -n-butyl, -isobutyl, -tert-butyl, or -2-ethylhexyl) ether, triethylene glycol mono-methyl (or -ethyl, -propyl, -isopropyl, -n-butyl, -isobutyl, -tert-butyl, or -2-ethylhexyl) ether, tetraethylene glycol mono-methyl (or -ethyl, -propyl, -isopropyl, -n-butyl, -isobutyl, -tert-butyl, or -2-ethylhexyl) ether, propylene glycol mono-n-butyl ether, propylene glycol mono-isobutyl ether, propylene glycol mono-tert-butyl ether, propylene glycol mono-2-ethylhexyl ether, dipropylene glycol mono-methyl (or -ethyl, -propyl, -isopropyl, -n-butyl, -isobutyl, -tert-butyl, or -2-ethylhexyl) ether, tripropylene glycol mono-methyl (or -ethyl, -propyl, -isopropyl, -n-butyl, -isobutyl, or -tert-butyl) ether, and tetrapropylene glycol mono-methyl (or -ethyl, -propyl, -isopropyl, -n-butyl, -isobutyl, -tert-butyl, or -2-ethylhexyl) ether.

Examples of the carbonate ester include ethylene carbonate and propylene carbonate.

The nonaqueous ink composition may also contain organic solvents other than the above organic solvents. Examples of such other organic solvents include cyclic esters, such as γ-butyrolactone, γ-valerolactone, γ-hexalactone, γ-heptalactone, γ-octalactone, γ-nonalactone, γ-decalactone, and γ-undecalactone; oxazolidinone solvents, such as 3-methyl-2-oxazolidinone, 3-ethyl-2-oxazolidinone, and N-vinylmethyloxazolidinone; acetate solvents, such as triethylene glycol butyl ether acetate, ethylene glycol butyl ether acetate, diethylene glycol ethyl ether acetate, diethylene glycol methyl ether acetate, diethylene glycol butyl ether acetate, propylene glycol methyl ether acetate, dipropylene glycol methyl ether acetate, 1-methoxy-2-propyl acetate, 2-methylbutyl acetate, 3-methoxybutyl ether acetate, and cyclohexyl acetate; amide solvents other than the alkylamide solvent (b1) and the cyclic amide solvent (b2), such as 3-methoxypropanamide, 3-butoxypropanamide, N,N-dimethyl-3-methoxypropanamide, N,N-dibutyl-3-methoxypropanamide, N,N-dibutyl-3-butoxypropanamide, and N,N-dimethyl-3-butoxypropanamide; $C_1$ to $C_5$ alkyl alcohols, such as methyl alcohol, ethyl alcohol, n-propyl alcohol, isopropyl alcohol, n-butyl alcohol, sec-butyl alcohol, tert-butyl alcohol, isobutyl alcohol, and n-pentanol; monovalent alcohol solvents, such as 3-methoxy-3-methyl-1-butanol, 3-methoxy-1-propanol, 1-methoxy-2-propanol, and 3-methoxy-n-butanol; ketones or ketoalcohols, such as acetone, diacetone alcohol, methyl ethyl ketone, methyl n-propyl ketone, methyl isopropyl ketone, methyl n-butyl ketone, methyl isobutyl ketone, methyl n-amyl ketone, methyl hexyl ketone, methyl isoamyl ketone, diethyl ketone, ethyl n-propyl ketone, ethyl isopropyl ketone, ethyl n-butyl ketone, ethyl isobutyl ketone, di-n-propyl ketone, diisobutyl ketone, cyclopentanone, cyclohexanone, methyl cyclohexanone, isophorone, and acetyl ketone; ethers, such as tetrahydrofuran and dioxane; oxyethylene or oxypropylene copolymers, such as polyethylene glycol and polypropylene glycol; diols, such as ethylene glycol, propylene glycol, diethylene glycol, dipropylene glycol, 1,3-propanediol, isobutylene glycol, triethylene glycol, tripropylene glycol, tetraethylene glycol, 1,3-propanediol, 2-methyl-1,2-propanediol, 2-methyl-1,2-propanediol, 1,2-butanediol, 1,3-butanediol, 1,4-butanediol, 1,2-pentanediol, 1,2-hexanediol, 1,5-pentanediol, 1,6-hexanediol, 2-methyl-2,4-pentanediol, 3-methyl-1,3-butanediol, 3-methyl-1,5-pentanediol, and 2-methyl-2,4-pentanediol; triols, such as glycerol, trimethylolethane, trimethylolpropane, and 1,2,6-hexanetriol; tetravalent alcohols, such as meso-erythritol and pentaerythritol; alkanol amines, such as monoethanolamine, diethanolamine, triethanolamine, N-methylethanolamine, N-ethylethanolamine, N-butylethanolamine, N-methyldiethanolamine, N-ethyldiethanolamine, and N-butyldiethanolamine; acetic acid esters, such as methyl acetate, ethyl acetate, n-propyl acetate, isopropyl acetate, n-butyl acetate, isobutyl acetate, hexyl acetate, and octyl acetate; lactic acid esters, such as methyl lactate, ethyl lactate, butyl lactate, propyl lactate, ethylhexyl lactate, amyl lactate, and isoamyl lactate; saturated hydrocarbons, such as n-hexane, isohexane, n-nonane, isononane, dodecane, and isododecane; unsaturated hydrocarbons, such as 1-hexene, 1-heptene, and 1-octene; cyclic unsaturated hydrocarbons, such as cyclohexene, cycloheptene, cyclooctene, 1,1,3,5,7-cyclooctatetraene, and cyclododecene; aromatic hydrocarbons, such as benzene, toluene, and xylene; morpholines, such as N-methylmorpholine, N-ethylmorpholine, and N-formylmorpholine; terpene solvents; and dibasic acid esters, such as dimethyl oxalate, diethyl oxalate, dimethyl malonate, diethyl malonate, dipropyl malonate, dimethyl succinate, diethyl succinate, dimethyl glutarate, and diethyl glutarate. It is preferred to select solvents with suitable HLB values depending on the resin or the dispersant to be used in combination with them.

The nonaqueous ink composition may contain a five-membered ring lactone solvent. Preferably, however, the nonaqueous ink composition is free of any five-membered ring lactone solvent. The content of a five-membered ring lactone solvent, if any, in the nonaqueous ink composition should preferably be 5.0 mass % or less, more preferably 3.0 mass % or less, even more preferably 1.0 mass % or less, based on the total mass of the nonaqueous ink composition.

Examples of the five-membered ring lactone solvent include γ-butyrolactone, γ-valerolactone, γ-hexanolactone, and γ-heptanolactone.

Colorant

The nonaqueous ink composition according to this embodiment includes a colorant. The colorant may be any type and may be a dye or a pigment. Preferably, the colorant is a pigment (pigment colorant) for the purpose of providing recorded products having high resistance to water, light, and so on. The nonaqueous ink composition according to this embodiment may include any pigment, such as an organic or inorganic pigment used for conventional ink compositions. The nonaqueous ink composition may include a single pigment or a combination of two or more pigments.

Examples of the organic pigment include insoluble azo pigments, soluble azo pigments, pigments derived from dyes, phthalocyanine organic pigments, quinacridone organic pigments, perylene organic pigments, perinone organic pigments, azomethine organic pigments, anthraquinone organic pigments (anthrone organic pigments), xanthene organic pigments, diketopyrrolopyrrole organic pigments, dioxazine organic pigments, nickel azo pigments, isoindolinone organic pigments, pyranthrone organic pigments, thioindigo organic pigments, condensed azo organic pigments, benzimidazolone organic pigments, quinophthalone organic pigments, isoindoline organic pigments, organic solid solution pigments, such as quinacridone solid solution pigments and perylene solid solution pigments, and other pigments such as lake pigments and carbon black.

Examples of the organic pigment, represented by color index (C.I.) numbers, include C.I. Pigment Yellow 1, 2, 3, 12, 13, 14, 16, 17, 20, 24, 73, 74, 75, 83, 93, 95, 97, 98, 109, 110, 114, 117, 120, 125, 128, 129, 130, 137, 138, 139, 147, 148, 150, 151, 153, 154, 155, 166, 168, 180, 185, 213, and 214, C.I. Pigment Red 5, 7, 9, 12, 48, 49, 52, 53, 57:1, 97, 112, 122, 123, 146, 149, 150, 168, 177, 180, 184, 192, 202, 206, 208, 209, 215, 216, 217, 220, 223, 224, 226, 227, 228, 238, 240, 254, 255, 269, and 291, C.I. Pigment Orange 16, 36, 43, 51, 55, 59, 61, 64, 71, and 73, C.I. Pigment Violet 19, 23, 29, 30, 37, 40, and 50, C.I. Pigment Blue 15, 15:1, 15:3, 15:4, 15:6, 16, 22, 60, and 64, C.I. Pigment Green 7, 36, 58, 59, 62, and 63, C.I. Pigment Brown 23, 25, and 26, and C.I. Pigment Black 7.

Examples of the dye that may be used for the nonaqueous ink composition according to this embodiment include azo dyes, benzoquinone dyes, naphthoquinone dyes, anthraquinone dyes, cyanine dyes, squarylium dyes, croconium dyes, merocyanine dyes, stilbene dyes, diarylmethane dyes, triarylmethane dyes, fluoran dyes, spiropyran dyes, phthalocyanine dyes, indigo dyes such as indigoid, fulgide dyes, nickel complex dyes, and azulene dyes.

Examples of the inorganic pigment that may be used for the nonaqueous ink composition according to this embodiment include titanium dioxide, barium sulfate, calcium carbonate, zinc oxide, barium carbonate, silica, talc, clay, synthetic mica, alumina, zinc oxide, lead sulfate, lead yellow, zinc yellow, rouge (red iron(III) oxide), cadmium red, ultramarine, ferric hexacyanoferrate, chromium oxide green, cobalt green, amber, titanium black, aluminum, titanium, indium, synthetic iron black, and inorganic solid solution pigments.

The nonaqueous ink composition according to this embodiment may contain a pigment in the form of particles with any average dispersion diameter that allows the desired color to be produced. To have good dispersibility, good dispersion stability, and sufficient coloring power, the pigment is preferably in the form of particles with a volume average particle diameter in the range of 5 nm or more, more preferably in the range of 20 nm or more, even more preferably in the range of 30 nm or more, while the volume average particle diameter depends on the type of the pigment used. When the volume average particle diameter is at least the lower limit shown above, the nonaqueous ink composition will have higher light fastness. The volume average particle diameter is preferably in the range of 300 nm or less, more preferably in the range of 200 nm or less, even more preferably in the range of 150 nm or less. When the volume average particle diameter is at most the upper limit shown above and the nonaqueous ink composition is a jet printing ink composition, the nonaqueous ink composition can be ejected with higher stability onto the surfaces of substrates by inkjet method. In this embodiment, the volume average particle diameter of the pigment is the volume average particle diameter (D50) measured under 25° C. conditions using a particle size distribution measurement system (Nanotrac Wave (a particle size analyzer manufactured by MicrotracBEL Corporation)).

An ink set may be provided including nonaqueous ink compositions according to this embodiment. In this case, the pigments in the nonaqueous ink compositions may have the same volume average particle diameter or different volume average particle diameters.

The content of the pigment in the nonaqueous ink composition according to this embodiment may be any level that allows the formation of desired images and may be adjusted as appropriate. Specifically, the content of the pigment in the nonaqueous ink composition is preferably 0.05 mass % or more, more preferably 0.1 mass % or more, based on the total mass of the nonaqueous ink composition, while it depends on the type of the pigment. The content of the pigment in the nonaqueous ink composition is preferably 20 mass % or less, more preferably 10 mass % or less, based on the total mass of the nonaqueous ink composition. The pigment at a content in the range of 0.05 mass % or more and 20 mass % or less will have a good balance between dispersion stability and coloring power.

The nonaqueous ink composition according to this embodiment may be used to record (print) in any color, and a colorant or a combination of colorants may be selected and used depending on the desired color or colors. Any color ink may be used, such as yellow, magenta, cyan, or black ink, and any other type of ink may also be used, such as light magenta, light cyan, light black, orange, green, red, or white ink.

Resin

The nonaqueous ink composition according to this embodiment may contain a resin for forming a decorated layer with higher fixability, higher water resistance, and higher stretchability. Examples of the resin that may be used include, but are not limited to, acrylic resins, polystyrene resins, polyester resins, vinyl chloride resins, vinyl acetate resins, vinyl chloride-vinyl acetate copolymer resins, polyethylene resins, polyurethane resins, rosin-modified resins, phenolic resins, terpene resins, polyamide resins, vinyl toluene-α-methylstyrene copolymers, ethylene-vinyl acetate copolymers, cellulose acetate butyrate, cellulose acetate propionate, silicone (silicon) resins, acrylamide resins, epoxy resins, resins produced by copolymerization of any of these resins, and any mixture of these resins. Preferred examples include acrylic resins, vinyl chloride resins, cellulosic resins, polyester resins, and polyurethane resins. Alternatively, resins produced by copolymerization of any of these resins or any mixture of these resins may be used.

In particular, the nonaqueous ink composition according to this embodiment preferably contains at least one of an acrylic resin and a vinyl chloride-vinyl acetate copolymer resin (vinyl chloride-vinyl acetate resin) so that it can provide higher levels of water resistance, solvent resistance, and stretchability. The nonaqueous ink composition containing at least one of an acrylic resin and a vinyl chloride-vinyl acetate copolymer resin (vinyl chloride-vinyl acetate resin) may be a jet printing ink composition. In such a case, the nonaqueous ink composition can be ejected with higher levels of responsiveness and stability onto the surfaces of substrates during high-speed recording by inkjet method.

The acrylic resin may be any (meth)acrylate ester monomer-based polymer resin. The acrylic resin may be a homopolymer of a single radically-polymerizable monomer or a copolymer of two or more selected radically-polymerizable monomers. In particular, the acrylic resin for use in the nonaqueous ink composition according to this embodiment is preferably a homopolymer of methyl methacrylate or a copolymer of methyl methacrylate and at least one compound selected from the group consisting of butyl methacrylate, ethoxyethyl methacrylate, and benzyl methacrylate. Commercially available (meth)acrylic resins may also be used, such as Paraloid B99N, Paraloid B60, Paraloid B66, and Paraloid B82 available from Rohm and Haas Company.

The vinyl chloride resin may be either a homopolymer of a vinyl chloride monomer or a copolymer of two or more selected polymerizable monomers. The vinyl chloride copolymer resin may be, for example, a vinyl chloride-vinyl acetate copolymer resin. The vinyl chloride-vinyl acetate copolymer resin may be a polymer of a vinyl chloride monomer and a vinyl acetate monomer. Examples of the vinyl chloride-vinyl acetate copolymer resin include vinyl chloride-vinyl acetate copolymers, vinyl chloride-vinyl acetate-maleic acid copolymers, vinyl chloride-vinyl acetate-vinyl alcohol copolymers, vinyl chloride-vinyl acetate-hydroxyalkyl acrylate copolymers, and any mixture thereof. The vinyl chloride-vinyl acetate copolymer resin is available from Nissin Chemical Co., Ltd. under trade names such as SOLBIN C, SOLBIN CL, SOLBIN CNL, SOLBIN CLL, SOLBIN CLL2, SOLBIN C5R, SOLBIN TA2, SOLBIN TA3, SOLBIN A, SOLBIN AL, SOLBIN TA5R, and SOLBIN M5.

The cellulosic resin is a resin that has a cellulose skeleton and is obtained by biologically or chemically introducing functional groups into cellulose used as a raw material. Examples of the cellulosic resin include cellulose acetate alkylate resins, such as cellulose acetate butyrate resins, cellulose acetate propionate resins, and cellulose acetate propionate butyrate resins, cellulose acetate resins, nitrocellulose resins, and any mixture thereof. The cellulosic resin is available from Eastman Chemical Company under trade names such as CAB-551-0.01, CAB-551-0.2, CAB-553-0.4, CAB-531-1, CAB-381-0.1, CAB-381-0.5, CAB-381-2, CAB-381-20, CAP-504, and CAP-482-0.5.

The polyester resin includes at least a structural unit formed by polycondensation of an alcohol component with a carboxylic acid component. The polyester resin may include a modified polyester resin. The polyester resin is available from Toyobo Co., Ltd. under trade names such as VYLON 226, VYLON 270, VYLON 560, VYLON 600, VYLON 630, VYLON 660, VYLON 885, VYLON GK250, VYLON GK810, and VYLON GK890, and available from Unitika Ltd. under trade names such as elitleUE-3200, elitleUE-3285, elitleUE-3320, elitleUE-9800, and elitleUE-9885.

The polyurethane resin includes at least a structural unit formed by copolymerization of an alcohol component and an isocyanate component. The polyurethane resin may include a polyester-, polyether-, or caprolactone-modified polyurethane resin. The polyurethane resin is available from Arakawa Chemical Industries, Ltd. under trade names such as UREARNO KL-424, UREARNO KL-564, UREARNO KL-593, and UREARNO 3262, and available from DIC Corporation under trade names such as PANDEX 372E, PANDEX 390E, PANDEX 394E, PANDEX 304, PANDEX 305E, PANDEX P-870, PANDEX P-910, PANDEX P-895, PANDEX 4030, and PANDEX 4110.

The acrylic resin, the vinyl chloride resin, the cellulosic resin, the polyester resin, and the polyurethane resin may be used alone. Preferably, a mixture of two or more of the acrylic resin, the vinyl chloride resin, the cellulosic resin, the polyester resin, and the polyurethane resin is used, and more preferably, a mixture of the acrylic resin and the vinyl chloride resin is used. The ratio between the contents of the acrylic resin and the vinyl chloride resin may be controlled such that the nonaqueous ink composition will satisfy the requirements for coloring, drying ability, coating physical properties, printability, and other properties. The mixing ratio between the acrylic resin and the vinyl chloride resin may be changed to any value as needed.

For example, the content (mass %) of the resin in the nonaqueous ink composition according to this embodiment is preferably, but not limited to, 0.05 mass % or more, more preferably 0.1 mass % or more, even more preferably 0.5 mass % or more, furthermore preferably 1 mass % or more, based on the total mass of the nonaqueous ink composition. For example, the content (mass %) of the resin in the nonaqueous ink composition is preferably, but not limited to, 20 mass % or less, more preferably 15 mass % or less, based on the total mass of the nonaqueous ink composition.

Dispersant

If necessary, the nonaqueous ink composition according to this embodiment may contain a dispersant. The dispersant may be any type used for nonaqueous ink compositions. The dispersant is preferably a polymer dispersant. Such a dispersant includes a polyester, polyacrylic, polyurethane, polyamine, or polycaprolactone main chain; and a polar group side chain, such as an amino, carboxyl, sulfone, or hydroxyl group. Examples of the polyacrylic dispersant that may be used include Disperbyk-2000, 2001, 2008, 2009, 2010, 2020, 2020N, 2022, 2025, 2050, 2070, 2095, 2150, 2151, 2155, 2163, and 2164, and BYKJET-9130, 9131, 9132, 9133, and 9151 (manufactured by BYK-Chemie); Efka PX 4310, PX 4320, PX 4330, PA 4401, 4402, PA 4403, 4570, 7411, 7477, PX 4700, and PX 4701 (manufactured by BASF), TREPLUS D-1200, D-1410, D-1420, and MD-1000 (manufactured by Otsuka Chemical Co., Ltd.), and FLOW-LEN DOPA-15BHFS, 17HF, 22, G-700, 900, NC-500, and GW-1500 (manufactured by Kyoeisha Chemical Co., Ltd.). Examples of the polycaprolactone dispersant include AJIS-PUR PB821, PB822, and PB881 (manufactured by Ajinomoto Fine-Techno Co., Inc.), Hinoact KF-1000, T-6000, T-7000, T-8000, T-8000E, and T-9050 (manufactured by Kawaken Fine Chemicals Co., Ltd.), Solsperse 20000, 24000, 32000, 32500, 32550, 32600, 33000, 33500, 34000, 35200, 36000, 37500, 39000, 71000, 76400, 76500, 86000, 88000, J180, and J200 (manufactured by The Lubrizol Corporation), and TEGO Dispers 652, 655, 685, 688, and 690 (manufactured by Evonik Japan Co., Ltd.). Preferred examples of the dispersant include BYKJET-9130, 9131, 9132, 9133, and 9151, Efka PX 4310, PX 4320, PX 4330, PX 4700, and PX 4701, Solsperse 20000, 24000, 32000, 33000, 33500, 34000, 35200, 39000, 71000, 76500, 86000, 88000, J180, and J200, and TEGO Dispers 655, 685, 688, and 690. These dispersants may be used alone, or any mixture of these dispersants may be used.

Dispersing Aid

If necessary, the nonaqueous ink composition according to this embodiment may contain a dispersing aid. The dispersing aid adsorbs on the surface of the colorant (pigment) to increase the dispersion stability by means of its functional group with a higher affinity for the organic solvents and the dispersant in the nonaqueous ink composition. Examples of the dispersing aid that may be used include known organic pigment derivatives having a functional group, such as an acidic, basic, or neutral group, on the organic pigment residue.

Surfactant

The nonaqueous ink composition according to this embodiment may contain a surfactant for the purpose of preventing volatilization or solidification of the ink composition in nozzles, tubes, and other device components, redissolving solidified materials, or reducing surface tension to increase the wettability on recording media (substrates). Examples of the surfactant include polyoxyalkylene alkyl ethers, such as NONION P-208, P-210, P-213, E-202S, E-205S, E-215, K-204, K-220, S-207, S-215, A-10R, A-13P, NC-203, and NC-207 (manufactured by NOF Corporation), EMULGEN 106, 108, 707, 709, A-90, and A-60 (manufactured by Kao Corporation), FLOWLEN G-70, D-90, and TG-740W (manufactured by Kyoeisha Chemical Co., Ltd.), POEM J-0081HV (manufactured by Riken Vitamin Co., Ltd.), ADEKA TOL NP-620, NP-650, NP-660, NP-675, NP-683, and NP-686, ADEKA COL CS-141E and TS-230E (manufactured by Adeka Corporation), SORGEN 30V, 40, TW-20, and TW-80, and NOIGEN CX-100 (manufactured by DKS Co., Ltd.), fluorosurfactants preferably including fluorine-modified polymers, such as BYK-340 (manufactured by BYK Chemie Japan K.K.), silicone surfactants preferably including polyester-modified silicones and polyether-modified silicones, such as BYK-313, 315N, 322, 326, 331, 347, and 348, BYK-UV3500, 3510, 3530, and 3570 (all manufactured by BYK Chemie Japan K.K.), and acetylene glycol surfactants, such as SURFYNOL (registered trademark) 82, 104, 465, 485, and TG (all manufactured by Air Products Japan K.K.) and ORFINE (registered trademark) STG and E1010 (all manufactured by Nisshin Chemical Industry Co., Ltd.).

Besides the above, the surfactant may be any of anionic, cationic, amphoteric, or nonionic surfactants, which may be appropriately selected depending on the purpose of the addition.

Other Components

The nonaqueous ink composition according to this embodiment may contain, as optional components, known additives including a stabilizer such as an antioxidant or an ultraviolet absorber, an epoxide, a polyvalent carboxylic acid, a surface modifier, a leveling agent (e.g., an acrylic or silicone leveling agent), an antifoaming agent, a pH adjuster, an antimicrobial agent, a preservative, an odor-control agent, a charge adjuster, and a wetting agent. Examples of the antioxidant include hindered phenol antioxidants, amine antioxidants, phosphorus antioxidants, sulfur antioxidants, and hydrazine antioxidants. Specifically, the antioxidant may be BHA (2,3-butyl-4-oxyanisole) or BHT (2,6-di-tert-butyl-p-cresol). The ultraviolet absorber may be a benzophenone compound or a benzotriazole compound. Examples of the epoxide include epoxy glycerides, epoxy fatty acid monoesters, and epoxy hexahydrophthalates, such as ADK CIZER O-130P and ADK CIZER O-180A (manufactured by Adeka Corporation). Examples of the polyvalent carboxylic acid include citric acid and maleic acid.

Substrate

The nonaqueous ink composition according to this embodiment may be used on any substrate (recording medium). The nonaqueous ink composition may be used on a variety of substrates including non-absorbable substrates, such as resin substrates, metal sheets, and glass, absorbable substrates, such as paper and fabrics, and surface-coated substrates, such as absorbing layer-bearing substrates. In particular, the nonaqueous ink composition according to this embodiment, which contains no water, is suitable for use on resin substrates. The resin may be a polyvinyl chloride polymer, acrylic, polyethylene terephthalate (PET), polycarbonate, polyethylene (PE), or polypropylene (PP). A particularly preferred substrate (recording medium) has a surface made of a hard or soft polyvinyl chloride polymer. Such a substrate (recoding medium) having a polyvinyl chloride polymer surface is, for example, a polyvinyl chloride substrate (film or sheet).

The nonaqueous ink composition according to this embodiment has a high ability to dry during recording and provides a recorded product with good post-processability. Thus, the nonaqueous ink composition according to this embodiment is more preferably for use on a resin substrate supposed to form a recorded product with a recorded surface to be bonded to a film (what is called a laminating resin substrate), and even more preferably for use on a laminating polyvinyl chloride polymer substrate.

Nonaqueous Ink Composition According to Second Embodiment

Another embodiment of the present invention is directed to a nonaqueous ink composition including: at least one organic solvent (organic solvent (b)) selected from the group consisting of an alkylamide solvent (b1), a cyclic amide solvent (b2), and a six- or more-membered ring lactone solvent (b3); and a resin having a weight average absolute molecular weight of 15,000 or more and 80,000 or less.

The nonaqueous ink composition with such features is useful on a variety of substrates. The nonaqueous ink composition of the present invention may also be used to record (print) on one side of a resin substrate with a pressure-sensitive adhesive layer on the other side. Even in such a case, the nonaqueous ink composition of the present invention is less likely to deteriorate the adhesion properties of the pressure-sensitive adhesive layer (the adhesion between the recorded product and the adherend), and is effectively prevented from causing blushing of the decorated layer even during the stretching of the recorded product.

A resin with a weight average absolute molecular weight of 15,000 or more and 80,000 or less, which is relatively high, has relatively low solubility in organic solvents, is relatively difficult to dissolve in nonaqueous ink compositions, and will tend to precipitate even if once dissolved. For example, therefore, when contained in a jet printing, nonaqueous ink composition being ejected onto the surface of a substrate by an inkjet method, such a resin may form precipitates on the interior of inkjet nozzles to cause nozzle chipping or bending, which may reduce the ejection stability and may make it impossible to continue normal printing. However, the nonaqueous ink composition according to this embodiment, which contains at least one organic solvent (b) selected from the group consisting of an alkylamide solvent (b1), a cyclic amide solvent (b2), and a six- or more-membered ring lactone solvent (b3), allows the dissolution of a resin with such a high weight average absolute molecular weight and can maintain ejection stability.

The nonaqueous ink composition preferably has a water content of 5.0 mass % or less, more preferably 3.0 mass % or less, even more preferably 1.0 mass % or less, furthermore preferably 0.5 mass % or less, based on the total mass of the nonaqueous ink composition. In particular, when the content of water in the nonaqueous ink composition according to this embodiment is at most 5.0 mass %, the organic solvent (b) in the nonaqueous ink composition helps to maintain ejection stability and storage stability even though the nonaqueous ink composition contains a resin with a relatively high weight average absolute molecular weight, which would otherwise reduce the ejection stability and storage stability of the nonaqueous ink composition.

Hereinafter, each component in the nonaqueous ink composition according to this embodiment will be described.

Organic Solvent

The organic solvent includes the organic solvent (b).

Organic solvent (b): at least one selected from the group consisting of an alkylamide solvent (b1), a cyclic amide solvent (b2), and a six- or more-membered ring lactone solvent (b3). Hereinafter, each of the organic solvent (b) and additional organic solvents that may be used will be described more specifically.

Organic Solvent (b)

The organic solvent (b) is at least one selected from the group consisting of an alkylamide solvent (b1), a cyclic amide solvent (b2), and a six- or more-membered ring lactone solvent (b3). The organic solvent (b) has a lower ability to permeate into substrates than five-membered ring lactone solvent-containing nonaqueous ink compositions. Thus, the nonaqueous ink composition is less likely to permeate from a resin substrate into a pressure-sensitive adhesive layer and effectively prevented from deteriorating the adhesion properties of the pressure-sensitive adhesive layer (the adhesion between the recorded product and the adherend).

The organic solvent (b) can quickly dry on the surfaces of substrates while it can somewhat permeate into substrates. Thus, the organic solvent (b)-containing ink composition has a high ability to dry during recording as five-membered ring lactone solvent-containing nonaqueous ink compositions do, and enables clear printing (recording) with less blurring. The less-blurring printing effect cannot be achieved simply by selecting a low-boiling-point solvent for increasing the ability to dry.

Moreover, at least one organic solvent (b) selected from the group consisting of an alkylamide solvent (b1), a cyclic amide solvent (b2), and a six- or more-membered ring lactone solvent (b3) helps to effectively dissolve the high molecular weight resin into the nonaqueous ink composition.

The alkylamide solvent (b1), the cyclic amide solvent (b2), and the six- or more-membered ring lactone solvent (b3) are the same as those for the organic solvent (b) in the nonaqueous ink composition according to the first embodiment described above. Preferred examples of the alkylamide solvent (b1), the cyclic amide solvent (b2), and the six- or more-membered ring lactone solvent (b3) are also the same as those for the organic solvent (b) in the nonaqueous ink composition according to the first embodiment described above.

The nonaqueous ink composition containing the organic solvent (b) including at least one selected from the group consisting of the alkylamide solvent (b1), the cyclic amide solvent (b2), and the six- or more-membered ring lactone solvent (b3) produces advantageous effects according to the present invention. In particular, to make the present invention particularly advantageous, the nonaqueous ink composition preferably contains, as the organic solvent (b), at least one of the alkylamide solvent (b1) and the cyclic amide solvent (b2), and more preferably contains the alkylamide solvent (b1) as the organic solvent (b).

The upper limit of the content of the organic solvent (b) (at least one selected from the group consisting of the alkylamide solvent (b1), the cyclic amide solvent (b2), and the six- or more-membered ring lactone solvent (b3)) in the nonaqueous ink composition is preferably, but not limited to, 30.0 mass % or less, more preferably 25.0 mass % or less, even more preferably 20.0 mass % or less, furthermore preferably 15.0 mass % or less, based on the total mass of the nonaqueous ink composition.

The lower limit of the content of the organic solvent (b) (at least one selected from the group consisting of the alkylamide solvent (b1), the cyclic amide solvent (b2), and the six- or more-membered ring lactone solvent (b3)) in the nonaqueous ink composition is preferably, but not limited to, 3.0 mass % or more, more preferably 5.0 mass % or more, based on the total mass of the ink composition.

The upper and lower limits of the content of the organic solvent (b) apply to all of the alkylamide solvent (b1), the cyclic amide solvent (b2), and the six- or more-membered ring lactone solvent (b3). In particular, in a case where the organic solvent (b) is the six- or more-membered ring lactone solvent (b3), the content of the organic solvent (b) is preferably 5.0 mass % or more and 15.0 mass % or less based on the total mass of the nonaqueous ink composition.

It is preferred that before the mixing of the organic solvent (b) (at least one selected from the group consisting of the alkylamide solvent (b1), the cyclic amide solvent (b2), and the six- or more-membered ring lactone solvent (b3)) with other components, the impurity content of the organic solvent (b) be preliminarily reduced to 0.5 mass % or less based on the total mass of the organic solvent (b). For example, when the nonaqueous ink composition is used to record on a resin substrate with a pressure-sensitive adhesive layer on one side, low-boiling-point impurities in the organic solvent (b) may permeate from the decorated layer into the pressure-sensitive adhesive layer on the back side to deteriorate the adhesion properties of the pressure-sensitive adhesive layer (the adhesion between the recorded product and the adherend). Low-boiling-point impurities in the organic solvent (b) may also cause troubles, such as dissolution or swelling of plastic materials or adhesives in printer components, such as inkjet heads. The preliminary reduction of the impurity content of the organic solvent (b) to 0.5 mass % or less before the mixing of the organic solvent (b) with other components will provide a solution to these problems and make the nonaqueous ink composition more advantageous according to the present invention.

The purification of the organic solvent (b) may be achieved by a method that includes repeatedly distilling the organic solvent (b) with narrow distillation temperature intervals to exclude impurities as much as possible or repeatedly performing extraction on the organic solvent (b) or by an industrial production process that includes the above steps and a procedure for preventing contamination.

Additional Organic Solvent

The organic solvent may include an additional organic solvent in addition to the organic solvent (b). Specifically, such an additional organic solvent may be a dialkyl glycol ether, which is a glycol derivative with alkyl-substituted OH groups at both ends, a monoalkyl glycol ether, which is a glycol derivative with one alkyl-substituted OH group, or a carbonate ester.

The dialkyl glycol ether may be, for example, a dialkyl glycol ether represented by formula (1) below.

[Chem. 9]

In formula (1), $R_1$ and $R_3$ each represent an alkyl group, $R_2$ represents an ethylene or propylene group, and n represents an integer of 2 to 4.

Examples of the dialkyl glycol ether includes ethylene glycol dibutyl ether, ethylene glycol dipropyl ether, diethylene glycol dimethyl ether, diethylene glycol diethyl ether, diethylene glycol methyl ethyl ether, diethylene glycol dipropyl ether, diethylene glycol propyl methyl ether, diethylene glycol isopropyl methyl ether, diethylene glycol dibutyl ether, diethylene glycol butyl methyl ether, diethylene glycol butyl ethyl ether, diethylene glycol methyl-2- ethyl hexyl ether, triethylene glycol dimethyl ether, triethylene glycol diethyl ether, triethylene glycol ethyl methyl ether, tetraethylene glycol dimethyl ether, tetraethylene glycol diethyl ether, tetraethylene glycol ethyl methyl ether, propylene glycol diethyl ether, propylene glycol ethyl methyl ether, propylene glycol methyl propyl ether, propylene glycol methyl butyl ether, propylene glycol methyl-2-ethyl hexyl ether, dipropylene glycol dimethyl ether, dipropylene glycol diethyl ether, dipropylene glycol ethyl methyl ether, dipropylene glycol methyl propyl ether, dipropylene glycol dipropyl ether, dipropylene glycol methyl butyl ether, tripropylene glycol dimethyl ether, tripropylene glycol diethyl ether, and tripropylene glycol ethyl methyl ether.

In the dialkyl glycol ether of formula (1), the total number of carbon atoms in $R_1$ and $R_3$ is preferably two or more and eight or less, more preferably two or more and six or less. In the dialkyl glycol ether of formula (1), $R_1$ is more preferably a methyl or ethyl group, and $R_3$ is more preferably an ethyl group, and/or $R_1$ and $R_3$ are more preferably methyl groups, and $R_2$ is more preferably a propylene group.

The dialkyl glycol ether with $R_1$ and $R_3$ having two or more and six or less carbon atoms in total is more volatile than, for example, diethylene glycol dibutyl ether (with $R_1$ and $R_3$ having 8 carbon atoms in total) and thus forms a nonaqueous ink composition with a higher ability to dry during recording.

Examples of the dialkyl glycol ether with $R_1$ and $R_3$ having two or more and six or less carbon atoms in total include diethylene glycol methyl ethyl ether, diethylene glycol diethyl ether, diethylene glycol dimethyl ether, dipropylene glycol dimethyl ether, diethylene glycol isopropyl methyl ether, triethylene glycol dimethyl ether, tetraethylene glycol dimethyl ether, and tetraethylene glycol diethyl ether.

The dialkyl glycol ether of formula (1) with $R_1$ being a methyl or ethyl group and $R_3$ being an ethyl group and/or the dialkyl glycol ether of formula (1) with $R_1$ and $R_3$ being methyl groups and $R_2$ being a propylene group has a lower ability to permeate than, for example, diethylene glycol dimethyl ether (with $R_1$ and $R_3$ being methyl groups and $R_2$ being an ethylene group). For example, therefore, the nonaqueous ink composition may also be used to record (print) on one side of a resin substrate with a pressure-sensitive adhesive layer on the other side, and even in such a case, the nonaqueous ink composition is more effectively prevented from deteriorating the adhesion properties of the pressure-sensitive adhesive layer (the adhesion between the recorded product and the adherend).

Examples of the dialkyl glycol ether of formula (1) with $R_1$ being a methyl or ethyl group and $R_3$ being an ethyl group include diethylene glycol methyl ethyl ether, diethylene glycol diethyl ether, triethylene glycol diethyl ether, and tetraethylene glycol diethyl ether. Examples of the dialkyl glycol ether of formula (1) with $R_1$ and $R_3$ being methyl groups and $R_2$ being a propylene group include dipropylene glycol dimethyl ether.

During the production of the dialkyl glycol ether, impurities are often generated, such as polymers, side reaction products, and decomposition products. For example, the content of impurities in a certain commercially available dialkyl glycol ether may be as high as about 10 mass % based on its total mass. It is preferred, therefore, that before the mixing of the dialkyl glycol ether with other components, the impurity content of the dialkyl glycol ether be preliminarily reduced to 0.5 mass % or less based on its total mass. Low-boiling-point impurities in the dialkyl glycol ether may give a bad odor. For example, when the nonaqueous ink composition is used to record on a resin substrate with a pressure-sensitive adhesive layer on one side, low-boiling-point impurities in the dialkyl glycol ether may also permeate from the decorated layer into the pressure-sensitive adhesive layer on the back side to deteriorate the adhesion properties of the pressure-sensitive adhesive layer (the adhesion between the recorded product and the adherend). Low-boiling-point impurities in the dialkyl glycol ether may also cause troubles, such as dissolution or swelling of plastic materials or adhesives in printer components, such as inkjet heads. Moreover, high-boiling-point impurities in the dialkyl glycol ether may reduce the ability of the nonaqueous ink composition to dry during recording and thus may cause print blurring. The preliminary reduction of the impurity content of the dialkyl glycol ether to 0.5 mass % or less before the mixing of the dialkyl glycol ether with other components will provide a solution to these problems and make the nonaqueous ink composition more advantageous according to the present invention.

The impurities in the dialkyl glycol ether are the same as those in the organic solvent (a) in the nonaqueous ink composition according to the first embodiment described above. The purification method is also the same.

The lower limit of the content of the dialkyl glycol ether, if any, in the nonaqueous ink composition is preferably, but not limited to, 30.0 mass % or more, more preferably 40.0 mass % or more, even more preferably 50.0 mass % or more, based on the total mass of the nonaqueous ink composition.

The upper limit of the content of the dialkyl glycol ether, if any, in the nonaqueous ink composition is preferably, but not limited to, 90.0 mass % or less, more preferably 80.0 mass % or less, based on the total mass of the nonaqueous ink composition.

Examples of the monoalkyl glycol ether include ethylene glycol mono-n-butyl ether, ethylene glycol mono-isobutyl ether, ethylene glycol mono-tert-butyl ether, ethylene glycol mono-2-ethylhexyl ether, diethylene glycol mono-methyl (or -ethyl, -propyl, -isopropyl, -n-butyl, -isobutyl, -tert-butyl, or -2-ethylhexyl) ether, triethylene glycol mono-methyl (or -ethyl, -propyl, -isopropyl, -n-butyl, -isobutyl, -tert-butyl, or -2-ethylhexyl) ether, tetraethylene glycol mono-methyl (or -ethyl, -propyl, -isopropyl, -n-butyl, -isobutyl, -tert-butyl, or -2-ethylhexyl) ether, propylene glycol mono-n-butyl ether, propylene glycol mono-isobutyl ether, propylene glycol mono-tert-butyl ether, propylene glycol mono-2-ethylhexyl ether, dipropylene glycol mono-methyl (or -ethyl, -propyl, -isopropyl, -n-butyl, -isobutyl, -tert-butyl, or -2-ethylhexyl) ether, tripropylene glycol mono-methyl (or -ethyl, -propyl, -isopropyl, -n-butyl, -isobutyl, or -tert-butyl) ether, and tetrapropylene glycol mono-methyl (or -ethyl, -propyl, -isopropyl, -n-butyl, -isobutyl, -tert-butyl, or -2-ethylhexyl) ether.

Examples of the carbonate ester include ethylene carbonate and propylene carbonate.

The nonaqueous ink composition may also contain organic solvents other than the above organic solvents. Examples of such other organic solvents include cyclic esters, such as γ-butyrolactone, γ-valerolactone, γ-hexalactone, γ-heptalactone, γ-octalactone, γ-nonalactone, γ-decalactone, and γ-undecalactone; oxazolidinone solvents, such as 3-methyl-2-oxazolidinone, 3-ethyl-2-oxazolidinone, and N-vinylmethyloxazolidinone; acetate solvents, such as triethylene glycol butyl ether acetate, ethylene glycol butyl ether acetate, diethylene glycol ethyl ether acetate, diethylene glycol methyl ether acetate, diethylene glycol butyl ether acetate, propylene glycol methyl ether acetate, dipropylene glycol methyl ether acetate, 1-methoxy-2-propyl acetate, 2-methylbutyl acetate, 3-methoxybutyl ether acetate, and cyclohexyl acetate; amide solvents other than the alkylamide solvent (b1) and the cyclic amide solvent (b2), such as 3-methoxypropanamide, 3-butoxypropanamide, N,N-dimethyl-3-methoxypropanamide, N,N-dibutyl-3-methoxypropanamide, N,N-dibutyl-3-butoxypropanamide, and N,N-dimethyl-3-butoxypropanamide; $C_1$ to $C_5$ alkyl alcohols, such as methyl alcohol, ethyl alcohol, n-propyl alcohol, isopropyl alcohol, n-butyl alcohol, sec-butyl alcohol, tert-butyl alcohol, isobutyl alcohol, and n-pentanol; monovalent alcohol solvents, such as 3-methoxy-3-methyl-1-butanol, 3-methoxy-1-propanol, 1-methoxy-2-propanol, and 3-methoxy-n-butanol; ketones or ketoalcohols, such as acetone, diacetone alcohol, methyl ethyl ketone, methyl n-propyl ketone, methyl isopropyl ketone, methyl n-butyl ketone, methyl isobutyl ketone, methyl n-amyl ketone, methyl hexyl ketone, methyl isoamyl ketone, diethyl ketone, ethyl n-propyl ketone, ethyl isopropyl ketone, ethyl n-butyl ketone, ethyl isobutyl ketone, di-n-propyl ketone, diisobutyl ketone, cyclopentanone, cyclohexanone, methyl cyclohexanone, isophorone, and acetyl ketone; ethers, such as tetrahydrofuran and dioxane; oxyethylene or oxypropylene copolymers, such as polyethylene glycol and polypropylene glycol; diols, such as ethylene glycol, propylene glycol, diethylene glycol, dipropylene glycol, 1,3-propanediol, isobutylene glycol, triethylene glycol, tripropylene glycol, tetraethylene glycol, 1,3-propanediol, 2-methyl-1,2-propanediol, 2-methyl-1,2-propanediol, 1,2-butanediol, 1,3-butanediol, 1,4-butanediol, 1,2-pentanediol, 1,2-hexanediol, 1,5-pentanediol, 1,6-hexanediol, 2-methyl-2,4-pentanediol, 3-methyl-1,3-butanediol, 3-methyl-1,5-pentanediol, and 2-methyl-2,4-pentanediol; triols, such as glycerol, trimethylolethane, trimethylolpropane, and 1,2,6-hexanetriol; tetravalent alcohols, such as meso-erythritol and pentaerythritol; alkanolamines, such as monoethanolamine, diethanolamine, triethanolamine, N-methylethanolamine, N-ethylethanolamine, N-butylethanolamine, N-methyldiethanolamine, N-ethyldiethanolamine, and N-butyldiethanolamine; acetic acid esters, such as methyl acetate, ethyl acetate, n-propyl acetate, isopropyl acetate, n-butyl acetate, isobutyl acetate, hexyl acetate, and octyl acetate; lactic acid esters, such as methyl lactate, ethyl lactate, butyl lactate, propyl lactate, ethylhexyl lactate, amyl lactate, and isoamyl lactate; saturated hydrocarbons, such as n-hexane, isohexane, n-nonane, isononane, dodecane, and isododecane; unsaturated hydrocarbons, such as 1-hexene, 1-heptene, and 1-octene; cyclic unsaturated hydrocarbons, such as cyclohexene, cycloheptene, cyclooctene, 1,1,3,5,7-cyclooctatetraene, and cyclododecene; aromatic hydrocarbons, such as benzene, toluene, and xylene; morpholines, such as N-methylmorpholine, N-ethylmorpholine, and N-formylmorpholine; terpene solvents; and dibasic acid esters, such as dimethyl oxalate, diethyl oxalate, dimethyl malonate, diethyl malonate, dipropyl malonate, dimethyl succinate, diethyl succinate, dimethyl glutarate, and diethyl glutarate. It is preferred to select solvents with suitable HLB values depending on the resin or the dispersant to be used in combination with them.

The nonaqueous ink composition may contain a five-membered ring lactone solvent. Preferably, however, the nonaqueous ink composition is free of any five-membered ring lactone solvent. The content of a five-membered ring lactone solvent, if any, in the nonaqueous ink composition should preferably be 5.0 mass % or less, more preferably 3.0 mass % or less, even more preferably 1.0 mass % or less, based on the total mass of the nonaqueous ink composition.

Examples of the five-membered ring lactone solvent include γ-butyrolactone, γ-valerolactone, γ-hexanolactone, and γ-heptanolactone.

Colorant

The colorant is the same as that in the nonaqueous ink composition according to the first embodiment. The preferred pigment content is also the same as that in the first embodiment.

Resin

A feature of the nonaqueous ink composition according to this embodiment is that it contains a resin with a weight average absolute molecular weight of 15,000 or more and 80,000 or less. This feature helps to provide a recorded product having a decorated layer that is effectively prevented from blushing during the stretching of the recorded product. The resin with such a high weight average absolute molecular weight has relatively low solubility in organic solvents. However, the nonaqueous ink composition according to this embodiment, which contains at least one organic solvent (b) selected from the group consisting of the alkylamide solvent (b1), the cyclic amide solvent (b2), and the six- or more-membered ring lactone solvent (b3), allows the dissolution of the resin with such a high weight average absolute molecular weight and can form a decorated layer that is effectively prevented from blushing, while it maintains storage stability and ejection stability.

As used herein, the term "weight average absolute molecular weight" means the weight average absolute molecular weight determined by gel permeation chromatography-multiangle light scattering (hereinafter referred to as GPC-MALS) method. The weight average absolute molecular weight may be measured using a gel permeation chromatography (GPC) system (Alliance GPC manufactured by Waters Corporation) equipped with a TSKgel column (manufactured by Tosoh Corporation) and a multiangle light scattering detector (miniDawn TREOS manufactured by Wyatt Technology Corporation) and using THF as a developing solvent. The weight average absolute molecular weight differs from the relative polystyrene-equivalent weight average molecular weight (relative value) determined by conventional GPC methods.

The relative polystyrene-equivalent weight average molecular weight (relative value) cannot always be correctly measured because of the difference between the molecular structures of the measurement target resin and the standard material, polystyrene, and the influence of column adsorption, which may interfere with the correct measurement of the molecular weight and the amount of gel components in the measurement target resin. Thus, the weight average absolute molecular weight measured using a GPC system equipped with a specific column and a multiangle light scattering detector is used to provide an index of the proper weight average molecular weight of the resin.

The resin may have any weight average absolute molecular weight in the range of 15,000 or more and 80,000 or less. The weight average absolute molecular weight of the resin preferably has a lower limit of 25,000 or more, more preferably 32,500 or more. This feature helps to form a decorated layer that has higher stretchability and is effectively prevented from blushing.

The weight average absolute molecular weight of the resin preferably has an upper limit of 70,000 or less, more preferably 50,000 or less. For example, when ejected onto the surfaces of substrates by inkjet method, the nonaqueous ink composition with improved ejection stability will provide prints with higher quality.

Examples of the resin that may be used include, but are not limited to, acrylic resins, polystyrene resins, polyester resins, vinyl chloride resins, vinyl acetate resins, vinyl chloride-vinyl acetate copolymer resins, polyethylene resins, polyurethane resins, rosin-modified resins, phenolic resins, terpene resins, polyamide resins, vinyl toluene-α-methylstyrene copolymers, ethylene-vinyl acetate copolymers, cellulose acetate butyrate, cellulose acetate propionate, silicone (silicon) resins, acrylamide resins, epoxy resins, resins produced by copolymerization of any of these resins, and any mixture of these resins.

In particular, the nonaqueous ink composition according to this embodiment preferably contains at least one selected from the group consisting of an acrylic resin, a vinyl chloride resin, and a cellulosic resin so that it can provide higher levels of water resistance, solvent resistance, and stretchability. Moreover, when used as a jet printing ink, it can be ejected with higher levels of responsiveness and stability during high-speed recording.

The acrylic resin may be any (meth)acrylate ester monomer-based polymer resin, examples of which may include those shown above for the nonaqueous ink composition. The acrylic resin may be a homopolymer of a single radically-polymerizable monomer or a copolymer of two or more selected radically-polymerizable monomers. In particular, the acrylic resin for use in the nonaqueous ink composition according to this embodiment is preferably a homopolymer of methyl methacrylate or a copolymer of methyl methacrylate and at least one compound selected from the group consisting of butyl methacrylate, ethoxyethyl methacrylate, and benzyl methacrylate.

The vinyl chloride resin may be either a homopolymer of a vinyl chloride monomer or a copolymer of two or more selected polymerizable monomers. The vinyl chloride copolymer resin may be, for example, a vinyl chloride-vinyl acetate copolymer resin. The vinyl chloride-vinyl acetate copolymer resin may be a polymer of a vinyl chloride monomer and a vinyl acetate monomer. Examples of the vinyl chloride-vinyl acetate copolymer resin include vinyl chloride-vinyl acetate copolymers, vinyl chloride-vinyl acetate-maleic acid copolymers, vinyl chloride-vinyl acetate-vinyl alcohol copolymers, vinyl chloride-vinyl acetate-hydroxyalkyl acrylate copolymers, and any mixture thereof.

The cellulosic resin is a resin that has a cellulose skeleton and is obtained by biologically or chemically introducing functional groups into cellulose used as a raw material. Examples of the cellulosic resin include cellulose acetate alkylate resins, such as cellulose acetate butyrate resins, cellulose acetate propionate resins, and cellulose acetate propionate butyrate resins, cellulose acetate resins, nitrocellulose resins, and any mixture thereof.

For example, the content of the resin in the nonaqueous ink composition according to this embodiment is preferably, but not limited to, 0.05 mass % or more, more preferably 0.1 mass % or more, even more preferably 0.5 mass % or more, furthermore preferably 1 mass % or more, based on the total mass of the nonaqueous ink composition. The content (mass %) of the resin in the nonaqueous ink composition is preferably, but not limited to, 20 mass % or less, more preferably 15 mass % or less, based on the total mass of the nonaqueous ink composition.

Dispersant

The dispersant is the same as that in the nonaqueous ink composition according to the first embodiment described above.

Dispersing Aid

The dispersing aid is the same as that in the nonaqueous ink composition according to the first embodiment described above.

Surfactant

The surfactant is the same as that in the nonaqueous ink composition according to the first embodiment described above.

Other Components

The nonaqueous ink composition according to this embodiment may contain, as optional components, known additives including a stabilizer such as an antioxidant or an ultraviolet absorber, an epoxide, a polyvalent carboxylic acid, a surface modifier, a leveling agent (e.g., an acrylic or silicone leveling agent), an antifoaming agent, a pH adjuster, an antimicrobial agent, a preservative, an odor-control agent, a charge adjuster, and a wetting agent. Each of other components is the same as that in the nonaqueous ink composition according to the first embodiment described above.

Substrate

The nonaqueous ink composition according to this embodiment may be used on the same substrate (recording medium) as that for the nonaqueous ink composition according to the first embodiment described above.

The nonaqueous ink composition according to this embodiment may also be used on a resin substrate (laminating resin substrate) with a pressure-sensitive adhesive layer on one side. In such a case, a film attached to the pressure-sensitive adhesive layer is effectively prevented from delaminating, and the adhesion properties of the pressure-sensitive adhesive layer (the adhesion between the recorded product and the adherend) are more effectively prevented from deteriorating. Thus, the substrate (recording medium), on which the nonaqueous ink composition according to this embodiment may be used, is preferably, but not limited to, a resin substrate with a pressure-sensitive adhesive layer on one side, more preferably a polyvinyl chloride substrate with a pressure-sensitive adhesive layer on one side.

Recording Method Using Ink Composition

There is provided a method for recording on a surface of a substrate (recording medium) using the nonaqueous ink composition according to the embodiment (the nonaqueous ink composition according to the first or second embodiment). The recording method may be any type. For example, the recording method may be a spray method, a coater method, an inkjet method, a gravure method, or a flexo method.

In particular, the nonaqueous ink composition is preferably ejected onto the surface of the substrate by an inkjet method. The nonaqueous ink composition according to the embodiment is less likely to dissolve or swell plastic components or adhesives, and thus has a good adequacy for inkjet heads and other components, which jet printing nonaqueous ink compositions should ensure. The nonaqueous ink composition according to the first embodiment described above, which has good drying ability, enables inkjet methods to efficiently produce recorded products with good post-processability.

The inkjet method may be performed using conventionally known inkjet printers. For example, such inkjet printers include VersaArt RE-640 manufactured by Roland DG Corporation.

The nonaqueous ink composition according to the embodiment may be used to form inks in various colors, such as yellow, magenta, cyan, black, light magenta, light cyan, light black, orange, green, red, and white. Colors may be printed in any order using heads in any positions with any configuration. The inkjet printer may or may not include a recording medium (substrate) winding mechanism, a substrate surface drying mechanism, or an ink circulating mechanism.

Recorded Product and Method for Producing Recorded Product

The nonaqueous ink composition according to the embodiment (the nonaqueous ink composition according to the first or second embodiment described above) may be used to produce recorded products. Recorded products may be produced using any suitable method, such as the above recording method using the ink composition. In particular, the nonaqueous ink composition is preferably ejected onto the surfaces of substrates by inkjet method.

The nonaqueous ink composition according to the first embodiment has a high ability to dry on the surfaces of substrates and provides recorded products with good post-processability. Thus, when a decorated layer is formed by applying (ejecting) the nonaqueous ink composition according to the first embodiment onto one side of a laminating resin substrate with a pressure-sensitive adhesive layer on the other side and a film is bonded to the pressure-sensitive adhesive layer, the resulting laminate (recorded product), which has the film on the surface of the decorated layer, will effectively prevent the film from lifting and have good post-processability.

The nonaqueous ink composition according to the second embodiment does not have a high ability to permeate into resin substrates. Thus, even when used to record (print) on one side of a resin substrate with a pressure-sensitive adhesive layer on the other side, the nonaqueous ink composition according to the second embodiment will be less likely to deteriorate the adhesion properties of the pressure-sensitive adhesive layer (the adhesion between the recorded product and the adherend).

Moreover, the nonaqueous ink composition according to the second embodiment, which contains at least one organic solvent (b) selected from the group consisting of the alkylamide solvent (b1), the cyclic amide solvent (b2), and the six- or more-membered ring lactone solvent (b3) and thus allows the dissolution of the resin with a high weight average absolute molecular weight, will maintain storage stability and ejection stability, which jet printing ink compositions should ensure, and will provide a recorded product having a decorated layer that is effectively prevented from blushing by the high weight average absolute molecular weight resin even during the stretching of the recorded product.

EXAMPLES

Hereinafter, the present invention will be described in more detail with reference to examples, which are not intended to limit the present invention at all.

Nonaqueous Ink Compositions According to First Embodiment

1. Preparation of Resins
(1) Acrylic Resin

A mixture of 150 g of methyl methacrylate, 50 g of butyl methacrylate, and a given amount (1.2 g) of tert-butyl peroxy-2-ethylhexanoate (polymerization initiator) was added dropwise over 1.5 hours to 300 g of diethylene glycol diethyl ether kept at 100° C. After the dropwise addition was completed, the mixture was reacted at 100° C. for 2 hours. The reaction mixture was then cooled to give a clear, colorless, methyl methacrylate polymer solution (solid content 39.5%). Subsequently, the solvent was sufficiently removed from the polymer solution by distillation. The resulting methyl methacrylate polymer (acrylic resin) had a weight average molecular weight (polystyrene-equivalent value) of 30,000 (in the tables, the polymer is expressed as "acrylic resin").

(2) Vinyl Chloride-Vinyl Acetate Copolymer Resin

After an autoclave equipped with a stirrer was purged with nitrogen, 100 parts of deionized water, 40 parts of methanol, 32 parts of vinyl chloride, 5 parts of vinyl acetate, 0.2 parts of glycidyl methacrylate, 3.55 parts of hydroxypropyl acrylate, 0.1 parts of hydroxypropyl methyl cellulose (suspension agent), 0.026 parts of di-2-ethylhexyl peroxydicarbonate (polymerization initiator), and a given amount of di-3,5,5-trimethylhexanol peroxide (polymerization initiator) were added into the autoclave. The mixture was heated to 63° C. with stirring under the nitrogen gas atmosphere. Immediately after the temperature reached 63° C., 48 parts of vinyl chloride and a mixture of 0.6 parts of glycidyl methacrylate and 10.65 parts of hydroxypropyl acrylate were continuously added under pressure to the mixture over 6 hours and 5.4 hours, respectively, for copolymerization reaction. At the time point when the pressure in the autoclave reached 0.3 MPa, the residual pressure was released, and after being cooled, the resulting resin slurry was taken out, filtered, and dried to give a vinyl chloride copolymer resin. In this process, the weight average molecular weight (polystyrene-equivalent value) of the vinyl chloride-vinyl acetate copolymer resin was controlled to 35,000 to 75,000 by varying the amount of the polymerization initiator, di-3,5,5-trimethylhexanol peroxide (in the tables, the resulting resins are expressed as "vinyl chloride-vinyl acetate copolymers 1, 2, and 3").

TABLE 1

| | | Weight average molecular weight | nitiator amount (g) |
|---|---|---|---|
| Vinyl chloride-vinyl acetate copolymer resin | Vinyl chloride-vinyl acetate resin 1 | 35000 | 0.64 |
| | Vinyl chloride-vinyl acetate resin 2 | 40000 | 0.57 |
| | Vinyl chloride-vinyl acetate resin 3 | 75000 | 0.14 |

2. Preparation of Nonaqueous Ink Compositions

Nonaqueous ink compositions categorized into Example A and Comparative Example A were prepared each containing components in the proportion shown in the tables below. Specifically, the components were dispersed with zirconia beads in a paint shaker to form each nonaqueous ink composition. The values are shown in units of parts by mass. Before the mixing, the content of impurities in each of the organic solvents (a) and (b) used for Examples 1 to 69 was determined by gas chromatography.

Evaluation

Ability to Dry during Recording

The nonaqueous ink compositions of Example A and Comparative Example A were evaluated for their ability to dry. Specifically, using an inkjet printer (VersaArt RE-640 (trade name) manufactured by Roland DG Corporation), a solid image was printed in high-quality mode (1,440×720 dpi) on a recording medium (an adhesive polyvinyl chloride film (IMAGin JT5829R manufactured by MACtac)) by an inkjet method using each of the nonaqueous ink compositions of Example A and Comparative Example A, during which the time taken for the print to dry at 40° C. was measured (in the tables, the evaluation result is shown in the "Ability to dry during recording" column).

Evaluation Criteria

Rating 5: The print dries in less than 2 minutes.
Rating 4: The print dries in a time of 2 minutes or more and less than 4 minutes.
Rating 3: The print dries in a time of 4 minutes or more and less than 6 minutes.
Rating 2: The print dries in a time of 6 minutes or more and less than 8 minutes.
Rating 1: The print dries in a time of 8 minutes or more.

Adequacy for Component

The nonaqueous ink compositions of Example A and Comparative Example A were evaluated for adequacy for component (adequacy for an inkjet head component). Specifically, an epoxy adhesive (two-component curing epoxy adhesive No. 1500 manufactured by Cemedine Co., Ltd.) for use to bond inkjet head components was dried at 60° C. for 1 day to form a cured product, and 0.2 g of the cured product was subjected to an immersion test in which it was immersed in each of the ink compositions of Example A and Comparative Example A and allowed to stand at 60° C. for 1 week. After the test, it was determined how much the weight of the cured product changed (in the tables, the evaluation result is shown in the "Adequacy for component" column).

Evaluation Criteria

Rating 5: The rate of change in weight is less than 3% with no degradation in the quality of the epoxy adhesive material.
Rating 4: The rate of change in weight is 3% or more and less than 5% with no degradation in the quality of the epoxy adhesive material.
Rating 3: The rate of change in weight is 5% or more and less than 10% with no degradation in the quality of the epoxy adhesive material.
Rating 2: The rate of change in weight is 10% or more and less than 15% with no degradation in the quality of the epoxy adhesive material.
Rating 1: The rate of change in weight is 15% or more and/or there is a degradation in the quality of the epoxy adhesive material.

Post-Processability

The nonaqueous ink compositions of Example A and Comparative Example A were evaluated for post-processability. As in the evaluation of the ability to dry during recording, a solid image (30 cm×30 cm, magenta 100%) was printed in high-quality mode (1,440×720 dpi) on a recording medium (an adhesive polyvinyl chloride film (IMAGin JT5829R manufactured by MACtac)) at a substrate surface temperature of 40° C. Immediately after the printing, a laminating film (LL Glossy Lami S manufactured by Sakurai Co., Ltd.) was bonded to the entire surface of the recorded product. The resulting laminate was allowed to stand for one day, which was followed by determining how much area delamination of the film occurred in. The results of the evaluation based on the following criteria are shown in Table 1 (in Table 1, the evaluation result is shown in the "Post-processability" column).

Evaluation Criteria

Rating 5: The rate of delamination of the film is 0%.
Rating 4: The rate of delamination of the film is more than 0% and less than 3%.
Rating 3: The rate of delamination of the film is 3% or more and less than 5%.
Rating 2: The rate of delamination of the film is 5% or more and less than 10%.
Rating 1: The rate of delamination of the film is 10% or more.

Storage Stability

The nonaqueous ink compositions of Example A and Comparative Example A were evaluated for storage stability. Specifically, the nonaqueous ink compositions were stored at 60° C. for 1 month, and before and after the test, it was observed how much the viscosity of the compositions and the volume average particle diameter (D50) of the pigment changed. The storage stability of the compositions was evaluated according to the criteria below. The viscosity of the ink was measured using a falling-ball viscometer (AMVn manufactured by Anton Paar) under 20° C. conditions. The volume average particle diameter (D50) of the pigment was measured using a particle size distribution measurement system (Nanotrac Wave (a particle size analyzer manufactured by MicrotracBEL)) under 25° C. conditions. Either the rate of change in the viscosity or the rate of change in the volume average particle diameter of the pigment, whichever was higher, was used for the evaluation of the nonaqueous ink composition.

Evaluation Criteria

Rating 5: The rate of change in the viscosity and the rate of change in the volume average particle diameter of the pigment are all less than 3%.
Rating 4: Either the rate of change in the viscosity or the rate of change in the volume average particle diameter of the pigment is 3% or more and less than 5%.
Rating 3: Either the rate of change in the viscosity or the rate of change in the volume average particle diameter of the pigment is 5% or more and less than 8%.
Rating 2: Either the rate of change in the viscosity or the rate of change in the volume average particle diameter of the pigment is 8% or more and less than 10%.
Rating 1: Either the rate of change in the viscosity or the rate of change in the volume average particle diameter of the pigment is 10% or more.

Evaluation of Blurring

An image consisting of: a solid background of a given color; and 6-point letters of a different color on the background was printed in high-quality mode (1,440×720 dpi) on a recording medium (an adhesive polyvinyl chloride film (IMAGin JT5829R manufactured by MACtac)) at a substrate surface temperature of 40° C. as in the evaluation of the ability to dry during recording. The resulting recorded product was dried in an oven at 60° C. for 5 minutes, and then it was visually observed whether and how the recorded product blurred.

Evaluation Criteria

Rating 4: No ink blurring is observed, and the 6-point letters are clear.
Rating 3: Slight ink blurring is observed with no esthetic damage.
Rating 2: Ink blurring is observed while the 6-point letters are identifiable.
Rating 1: Significant ink blurring is observed, and the 6-point letters are not visually identifiable.

TABLE 2

| | Components | Example A | | | | | | | | | | | | | |
|---|---|---|---|---|---|---|---|---|---|---|---|---|---|---|
| | | Example1 | Example2 | Example3 | Example4 | Example5 | Example6 | Example7 | Example8 | Example9 | Example10 | Example11 | Example12 | Example13 | Example14 |
| Organic solvent (a) Dialkyl glycol ether | Diethylene glycol methyl ethyl ether | 51.0 | 61.0 | 71.0 | 76.0 | 86.0 | 76.0 | 76.0 | 76.0 | 76.0 | 76.0 | 76.0 | 76.0 | 61.0 | 71.0 |
| | Diethylene glycol diethyl ether | | | | | | | | | | | | | | |
| | Diethylene glycol dibutyl ether | | | | | | | | | | | | | | |
| | Dipropylene glycol dimethyl ether | | | | | | | | | | | | | | |
| Organic solvent (b) Alkylamide solvent(b1) | N,N-Diethylformamide | 40.0 | | | | | | | | | | | | | |
| | N,N-Diethylpropanamide | | 30.0 | 20.0 | 15.0 | 5.0 | | | | | | | | | |
| | N,N-Diethylacetamide | | | | | | 15.0 | | | | | | | | |
| | N,N-Dimethylformamide | | | | | | | 15.0 | | | | | | | |
| | N,N-Dimethylacetamide | | | | | | | | | | | | | | |
| Organic solvent (b) Cyclic amide solvent(b2) | ε-Caprolactam | | | | | | | | 15.0 | | | | | | |
| | N-Methylcaprolactam | | | | | | | | | 15.0 | | | | | |
| | N-Vinylcaprolactam | | | | | | | | | | 15.0 | | | | |
| | 1,3-Dimethylimidazolidinone | | | | | | | | | | | | | | |
| | N-Methyloxazolidinone | | | | | | | | | | | | | | |
| | N-Methyl-2-pyrolidone | | | | | | | | | | | | | | |
| Organic solvent(b) Six- or more-membered ring lactone solvent(b3) | δ-Valerolactone | | | | | | | | | | | 15.0 | | | |
| | δ-Hexanolactone | | | | | | | | | | | | 15.0 | | |
| | ε-Caprolactone | | | | | | | | | | | | | 30.0 | 20.0 |
| Additional solvent | Triethylene glycol mono-n-butyl ether | | | | | | | | | | | | | | |
| | Tetraethylene glycol monobutyl ether | | | | | | | | | | | | | | |
| | Dipropylene glycol monomethyl ether | | | | | | | | | | | | | | |
| | Propylene carbonate | | | | | | | | | | | | | | |
| | Ethylene glycol monobutyl ether acetate | | | | | | | | | | | | | | |
| | γ-Butyrolactone | | | | | | | | | | | | | | |
| | γ-Valerolactone | | | | | | | | | | | | | | |
| | 3-Methoxy-N,N-dimethylpropanamide | | | | | | | | | | | | | | |
| Resin | Acrylic resin | 3.0 | 3.0 | 3.0 | 3.0 | 3.0 | 3.0 | 3.0 | 3.0 | 3.0 | 3.0 | 3.0 | 3.0 | 3.0 | 3.0 |
| | Vinyl chloride-vinyl acetate copolymer 1 | 1.5 | 1.5 | 1.5 | 1.5 | 1.5 | 1.5 | 1.5 | 1.5 | 1.5 | 1.5 | 1.5 | 1.5 | 1.5 | 1.5 |
| | Vinyl chloride-vinyl acetate copolymer 2 | | | | | | | | | | | | | | |
| | Vinyl chloride-vinyl acetate copolymer 3 | | | | | | | | | | | | | | |
| Dispersant | Solsperse32000 | 1.5 | 1.5 | 1.5 | 1.5 | 1.5 | 1.5 | 1.5 | 1.5 | 1.5 | 1.5 | 1.5 | 1.5 | 1.5 | 1.5 |
| Additive | Polyether-modified polydimethylsiloxane | | | | | | | | | | | | | | |
| Pigment | Carbon black | 3.0 | 3.0 | 3.0 | 3.0 | 3.0 | 3.0 | 3.0 | 3.0 | 3.0 | 3.0 | 3.0 | 3.0 | 3.0 | 3.0 |
| | Cyan pigment(P.B.154) | | | | | | | | | | | | | | |
| | Magenta pigment(P.R.122) | | | | | | | | | | | | | | |
| | Yellow pigment(P.Y.155) | | | | | | | | | | | | | | |
| | Yellow pigment(P.Y.150) | | | | | | | | | | | | | | |
| | Orange pigment(P.O.43) | | | | | | | | | | | | | | |
| | Orange pigment(P.O.71) | | | | | | | | | | | | | | |
| | Green pigment(P.G.36) | | | | | | | | | | | | | | |
| | Green pigment(P.G.58) | | | | | | | | | | | | | | |
| | Red pigment(P.R.254) | | | | | | | | | | | | | | |
| | White pigment(Titanium oxide) | | | | | | | | | | | | | | |
| Total | | 100.0 | 100.0 | 100.0 | 100.0 | 100.0 | 100.0 | 100.0 | 100.0 | 100.0 | 100.0 | 100.0 | 100.0 | 100.0 | 100.0 |

TABLE 2-continued

| | | Example 15 | Example 16 | Example 17 | Example 18 | Example 19 | Example 20 | Example 21 | Example 22 | Example 23 | Example 24 | Example 25 | Example 26 | Example 27 |
|---|---|---|---|---|---|---|---|---|---|---|---|---|---|---|
| Water content | 0.4 | 0.9 | 0.3 | 0.5 | 0.3 | 0.4 | 0.3 | 0.2 | 0.5 | 0.3 | 0.3 | 0.3 | 0.3 | 0.5 |
| Content of impurities derived from organic solvent (a) | 0.24 | 0.31 | 0.15 | 0.18 | 0.19 | 0.25 | 0.27 | 0.16 | 0.18 | 0.25 | 0.11 | 0.32 | 0.27 | 0.24 |
| Content of impurities derived from organic solvent (b) | 0.31 | 0.22 | 0.16 | 0.12 | 0.10 | 0.18 | 0.25 | 0.15 | 0.17 | 0.42 | 0.20 | 0.25 | 0.19 | 0.35 |
| Evaluation — Ability to dry during recording | 5 | 5 | 5 | 5 | 4 | 5 | 5 | 5 | 5 | 5 | 4 | 3 | 4 | 4 |
| Evaluation — Adequacy for component | 3 | 3 | 4 | 5 | 5 | 5 | 5 | 4 | 5 | 5 | 4 | 4 | 3 | 3 |
| Evaluation — Post-processability | 4 | 4 | 5 | 5 | 5 | 5 | 5 | 5 | 5 | 5 | 3 | 5 | 2 | 2 |
| Evaluation — Storage stability | 4 | 5 | 5 | 5 | 5 | 5 | 5 | 5 | 5 | 5 | 5 | 5 | 5 | 5 |
| Evaluation — Blurring | 4 | 4 | 4 | 4 | 3 | 4 | 4 | 4 | 4 | 4 | 4 | 4 | 4 | 4 |

| | Components | Example 15 | Example 16 | Example 17 | Example 18 | Example 19 | Example 20 | Example 21 | Example 22 | Example 23 | Example 24 | Example 25 | Example 26 | Example 27 |
|---|---|---|---|---|---|---|---|---|---|---|---|---|---|---|
| Organic solvent (a) Dialkyl glycol ether | Diethylene glycol methyl ethyl ether | 76.0 | 86.0 | 41.0 | 51.0 | 61.0 | 66.0 | 76.0 | 51.0 | 61.0 | 66.0 | 76.0 | 66.0 | 41.0 |
| | Diethylene glycol diethyl ether | | | | | | | | | | | | | |
| | Diethylene glycol dibutyl ether | | | | | | | | | | | | | |
| | Dipropylene glycol dimethyl ether | | | | | | | | | | | | | |
| Organic solvent (b) Alkylamide solvent (b1) | N,N-Diethylformamide | | | 40.0 | | | | | | | | | | |
| | N,N-Diethylpropanamide | | | | | | | 5.0 | | | | | | |
| | N,N-Diethylacetamide | | | | 30.0 | 20.0 | | | | | | | | |
| | N,N-Dimethylformamide | | | | | | 15.0 | | | | 15.0 | | | |
| | N,N-Dimethylacetamide | | | | | | | | 30.0 | 20.0 | | 5.0 | 15.0 | |
| Organic solvent (b) Cyclic amide solvent (b2) | ε-Caprolactam | 15.0 | | | | | | | | | | | | |
| | N-Methylcaprolactam | | | | | | | | | | | | | 40.0 |
| | N-Vinylcaprolactam | | | | | | | | | | | | | |
| | 1,3-Dimethylimidazolidinone | | | | | | | | | | | | | |
| | N-Methyloxazolidinone | | | | | | | | | | | | | |
| | N-Methyl-2-pyrrolidone | | | | | | | | | | | | | |
| Organic solvent (b) Six- or more-membered ring lactone solvent (b3) | δ-Valerolactone | | | | | | | | | | | | | |
| | δ-Hexanolactone | | | | | | | | | | | | | |
| | ε-Caprolactone | | 5.0 | | | | | | | | | | | |
| Additional solvent | Triethylene glycol mono-n-butyl ether | | | | | | | | | | | | | |
| | Tetraethylene glycol monobutyl ether | | | | | | | | | | | | | |
| | Dipropylene glycol monomethyl ether | | | 10.0 | 10.0 | 10.0 | 10.0 | 10.0 | 10.0 | 10.0 | 10.0 | 10.0 | 10.0 | 10.0 |
| | Propylene carbonate | | | | | | | | | | | | | |
| | Ethylene glycol monobutyl ether acetate | | | | | | | | | | | | | |
| | γ-Butyrolactone | | | | | | | | | | | | | |
| | γ-Valerolactone | | | | | | | | | | | | | |
| | 3-Methoxy-N,N-dimethylpropanamide | | | | | | | | | | | | | |
| Resin | Acrylic resin | 3.0 | 3.0 | 3.0 | 3.0 | 3.0 | 3.0 | 3.0 | 3.0 | 3.0 | 3.0 | 3.0 | 3.0 | 3.0 |
| | Vinyl chloride-vinyl acetate copolymer 1 | | | | | | | | | | | | | |
| | Vinyl chloride-vinyl acetate copolymer 2 | | | | | | | | | | | | | |
| | Vinyl chloride-vinyl acetate copolymer 3 | | | | | | | | | | | | | |
| Dispersant | Solsperse32000 | 1.5 | 1.5 | 1.5 | 1.5 | 1.5 | 1.5 | 1.5 | 1.5 | 1.5 | 1.5 | 1.5 | 1.5 | 1.5 |
| Additive | Polyether-modified polydimethylsiloxane | 1.5 | 1.5 | 1.5 | 1.5 | 1.5 | 1.5 | 1.5 | 1.5 | 1.5 | 1.5 | 1.5 | 1.5 | 1.5 |
| Pigment | Carbon black | 3.0 | 3.0 | 3.0 | 3.0 | 3.0 | 3.0 | 3.0 | 3.0 | 3.0 | 3.0 | 3.0 | 3.0 | 3.0 |
| | Cyan pigment(P.B.15:4) | | | | | | | | | | | | | |
| | Magenta pigment(P.R.122) | | | | | | | | | | | | | |
| | Yellow pigment(P.Y.155) | | | | | | | | | | | | | |
| | Yellow pigment(P.Y.150) | | | | | | | | | | | | | |
| | Orange pigment(P.O.43) | | | | | | | | | | | | | |
| | Orange pigment(P.O.71) | | | | | | | | | | | | | |

TABLE 2-continued

| | | | | | | | | | | | | | |
|---|---|---|---|---|---|---|---|---|---|---|---|---|---|
| Green pigment(P.G.36) | | | | | | | | | | | | | |
| Green pigment(P.G.58) | | | | | | | | | | | | | |
| Red pigment(P.R.254) | | | | | | | | | | | | | |
| White pigment(Titanium oxide) | | | | | | | | | | | | | |
| Total | 100.0 | 100.0 | 100.0 | 100.0 | 100.0 | 100.0 | 100.0 | 100.0 | 100.0 | 100.0 | 100.0 | 100.0 | 100.0 |
| Water content | 0.3 | 0.8 | 0.4 | 0.9 | 0.3 | 0.5 | 0.3 | 0.2 | 0.3 | 0.4 | 0.3 | 0.3 | 0.3 |
| Content of impurities derived from organic solvent (a) | 0.22 | 0.25 | 0.22 | 0.27 | 0.29 | 0.27 | 0.27 | 0.27 | 0.24 | 0.18 | 0.24 | 0.14 | 0.18 |
| Content of impurities derived from organic solvent (b) | 0.30 | 0.22 | 0.31 | 0.22 | 0.15 | 0.12 | 0.10 | 0.42 | 0.28 | 0.18 | 0.11 | 0.25 | 0.41 |
| Evaluation Ability to dry during recording | 3 | 2 | 5 | 5 | 5 | 5 | 4 | 5 | 5 | 5 | 4 | 5 | 5 |
| Adequacy for component | 4 | 5 | 3 | 3 | 4 | 5 | 5 | 3 | 4 | 5 | 5 | 5 | 3 |
| Post-processability | 3 | 3 | 4 | 4 | 5 | 5 | 5 | 4 | 4 | 5 | 5 | 5 | 3 |
| Storage stability | 5 | 5 | 5 | 5 | 5 | 5 | 5 | 5 | 5 | 5 | 5 | 5 | 4 |
| Blurring | 4 | 3 | 4 | 4 | 4 | 4 | 3 | 4 | 4 | 4 | 3 | 4 | 4 |

TABLE 3

| | Components | Example28 | Example29 | Example30 | Example31 | Example32 | Example33 | Example34 | Example35 | Example36 | Example37 | Example38 | Example39 | Example40 | Example41 |
|---|---|---|---|---|---|---|---|---|---|---|---|---|---|---|---|
| Organic solvent (a) Dialkyl glycol ether | Diethylene glycol methyl ethyl ether | 51.0 | 61.0 | 66.0 | 76.0 | 66.0 | 66.0 | 66.0 | 66.0 | 41.0 | 51.0 | 61.0 | 66.0 | 76.0 | 71.0 |
| | Diethylene glycol diethyl ether | | | | | | | | | | | | | | |
| | Diethylene glycol dibutyl ether | | | | | | | | | | | | | | |
| | Dipropylene glycol dimethyl ether | | | | | | | | | | | | | | 15.0 |
| Organic solvent(b) Alkylamide solvent(b1) | N,N-Diethylformamide | | | | | | | | | | | | | | |
| | N,N-Diethylpropanamide | | | | | | | | | | | | | | |
| | N,N-Diethylacetamide | | | | | | | | | | | | | | |
| | N,N-Dimethylformamide | | | | | | | | | | | | | | |
| | N,N-Dimethylacetamide | | | | | | | | | | | | | | |
| Organic solvent(b) Cyclic amide solvent(b2) | ε-Caprolactam | 30.0 | | | | | | | | | | | | | |
| | N-Methylcaprolactam | | 20.0 | 15.0 | 5.0 | 15.0 | | | | | | | | | |
| | N-Vinylcaprolactam | | | | | | 15.0 | | | | | | | | |
| | 1,3-Dimethylimidazolidinone | | | | | | | 15.0 | | | | | | | |
| | N-Methyloxazolidinone | | | | | | | | 15.0 | | | | | | |
| | N-Methyl-2-pyrolidone | | | | | | | | | | | | | | |
| Organic solvent(b) Six- or more-membered ring lactone solvent(b3) | δ-Valerolactone | | | | | | | | | 40.0 | 30.0 | 20.0 | 15.0 | 5.0 | |
| | ε-Hexanolactone | | | | | | | | | | | | | | |
| | ε-Caprolactone | | | | | | | | | | | | | | |
| Additional solvent | Triethylene glycol mono-n-butyl ether | | | | | | | | | | | | | | |
| | Tetraethylene glycol monomethyl ether | | | | | | | | | | | | | | |
| | Dipropylene glycol monomethyl ether | 10.0 | 10.0 | 10.0 | 10.0 | 10.0 | 10.0 | 10.0 | 10.0 | 10.0 | 10.0 | 10.0 | 10.0 | 10.0 | 5.0 |
| | Propylene carbonate | | | | | | | | | | | | | | |
| | Ethylene glycol monobutyl ether acetate | | | | | | | | | | | | | | |
| | γ-Butyrolactone | | | | | | | | | | | | | | |
| | γ-Valerolactone | | | | | | | | | | | | | | |
| | 3-Methoxy-N,N-dimethylpropanamide | | | | | | | | | | | | | | |
| Resin | Acrylic resin | 3.0 | 3.0 | 3.0 | 3.0 | 3.0 | 3.0 | 3.0 | 3.0 | 3.0 | 3.0 | 3.0 | 3.0 | 3.0 | 3.0 |
| | Vinyl chloride-vinyl acetate copolymer 1 | 1.5 | 1.5 | 1.5 | 1.5 | 1.5 | 1.5 | 1.5 | 1.5 | 1.5 | 1.5 | 1.5 | 1.5 | 1.5 | 1.5 |
| | Vinyl chloride-vinyl acetate copolymer 2 | | | | | | | | | | | | | | |
| | Vinyl chloride-vinyl acetate copolymer 3 | | | | | | | | | | | | | | |
| Dispersant | Solsperse32000 | 1.5 | 1.5 | 1.5 | 1.5 | 1.5 | 1.5 | 1.5 | 1.5 | 1.5 | 1.5 | 1.5 | 1.5 | 1.5 | 1.5 |
| Additive | Polyether-modified polydimethylsiloxane | | | | | | | | | | | | | | |
| Pigment | Carbon black | 3.0 | 3.0 | 3.0 | 3.0 | 3.0 | 3.0 | 3.0 | 3.0 | 3.0 | 3.0 | 3.0 | 3.0 | 3.0 | 3.0 |
| | Cyan pigment(P.B.154) | | | | | | | | | | | | | | |
| | Magenta pigment(P.R.122) | | | | | | | | | | | | | | |
| | Yellow pigment(P.Y.155) | | | | | | | | | | | | | | |
| | Yellow pigment(P.Y.150) | | | | | | | | | | | | | | |
| | Orange pigment(P.O.43) | | | | | | | | | | | | | | |
| | Orange pigment(P.O.71) | | | | | | | | | | | | | | |
| | Green pigment(P.G.36) | | | | | | | | | | | | | | |
| | Green pigment(P.G.58) | | | | | | | | | | | | | | |
| | Red pigment(P.R.254) | | | | | | | | | | | | | | |
| | White pigment(Titanium oxide) | | | | | | | | | | | | | | |
| | Total | 100.0 | 100.0 | 100.0 | 100.0 | 100.0 | 100.0 | 100.0 | 100.0 | 100.0 | 100.0 | 100.0 | 100.0 | 100.0 | 100.0 |

TABLE 3-continued

| | Components | Example42 | Example43 | Example44 | Example45 | Example46 | Example47 | Example48 | Example49 | Example50 | Example51 | Example52 | Example53 | Example54 |
|---|---|---|---|---|---|---|---|---|---|---|---|---|---|---|
| Water content | | 0.6 | 0.2 | 0.3 | 0.5 | 0.3 | 0.3 | 0.3 | 0.4 | 0.3 | 0.5 | 0.3 | 0.8 | 0.7 |
| Content of impurities derived from organic solvent (a) | | 0.25 | 0.24 | 0.24 | 0.20 | 0.26 | 0.18 | 0.19 | 0.15 | 0.24 | 0.31 | 0.21 | 0.28 | 0.24 |
| Content of impurities derived from organic solvent (b) | | 0.20 | 0.15 | 0.09 | 0.17 | 0.42 | 0.20 | 0.25 | 0.24 | 0.19 | 0.35 | 0.30 | 0.22 | 0.12 |
| Evaluation | Ability to dry during recording | 5 | 5 | 4 | 5 | 3 | 3 | 3 | 4 | 4 | 4 | 3 | 2 | 5 |
| | Adequacy for component | 4 | 4 | 5 | 4 | 5 | 4 | 4 | 3 | 3 | 3 | 4 | 5 | 5 |
| | Post-processability | 4 | 5 | 5 | 5 | 5 | 5 | 3 | 2 | 2 | 2 | 3 | 5 | 5 |
| | Storage stability | 5 | 5 | 5 | 5 | 5 | 5 | 5 | 4 | 5 | 5 | 5 | 5 | 5 |
| | Blurring | 4 | 4 | 3 | 4 | 4 | 4 | 4 | 4 | 4 | 4 | 4 | 3 | 4 |
| Organic solvent (a) Dialkyl glycol ether | Diethylene glycol methyl ethyl ether | 66.0 | | | | 66.0 | | | | | | | | |
| | Diethylene glycol diethyl ether | | | | 66.0 | | | | | | | | | |
| | Diethylene glycol dibutyl ether | | | 66.0 | | | | | | | | | | |
| | Dipropylene glycol dimethyl ether | | 65.9 | | | | 65.9 | 65.9 | 65.9 | 65.9 | 66.0 | 66.0 | 66.0 | 66.0 |
| Organic solvent (b) Alkylamide solvent (b1) | N,N-Diethylformamide | 15.0 | | | | | | | | | | | | |
| | N,N-Diethylpropanamide | | 15.0 | 15.0 | | | | | | | | | | |
| | N,N-Diethylacetamide | | | | 15.0 | 15.0 | | | | | | | | |
| | N,N-Dimethylformamide | | | | | | 15.0 | 15.0 | | | | | | |
| | N,N-Dimethylacetamide | | | | | | | | 15.0 | 15.0 | | | | |
| Organic solvent (b) Cyclic amide solvent (b2) | ε-Caprolactam | | | | | | | | | | | | | |
| | N-Methylcaprolactam | | | | | | | | | | | | | |
| | N-Vinylcaprolactam | | | | | | | | | | | | | |
| | 1,3-Dimethylimidazolidinone | | | | | | | | | | 15.0 | | | |
| | N-Methyloxazolidinone | | | | | | | | | | | 15.0 | | |
| | N-Methyl-2-pyrrolidone | | | | | | | | | | | | 15.0 | |
| Organic solvent (b) Six- or more-membered ring lactone solvent (b3) | δ-Valerolactone | | | | | | | | | | | | | |
| | δ-Hexanolactone | | | | | | | | | | | | | |
| | ε-Caprolactone | | | | | | | | | | | | | 15.0 |
| Additional solvent | Triethylene glycol mono-n-butyl ether | 10.0 | | | | | | | | | | | | |
| | Tetraethylene glycol monobutyl ether | | 10.0 | | | | | | | | | | | |
| | Dipropylene glycol monomethyl ether | | | | | | 5.0 | | | | | | | |
| | Propylene carbonate | | | | | | 5.0 | 5.0 | | | | | | |
| | Ethylene glycol monobutyl ether acetate | | | | | | | 5.0 | | | | | | |
| | γ-Butyrolactone | | | 10.0 | 10.0 | 10.0 | | | 10.0 | 10.0 | 10.0 | 10.0 | 10.0 | 10.0 |
| | γ-Valerolactone | | | | | | | | | | | | | |
| | 3-Methoxy-N,N-dimethylpropanamide | | | | | | | | | | | | | |
| Resin | Acrylic resin | 3.0 | 3.0 | 3.0 | 3.0 | 3.0 | 3.0 | 3.0 | 3.0 | 3.0 | 3.0 | 3.0 | 3.0 | 3.0 |
| | Vinyl chloride-vinyl acetate copolymer 1 | 1.5 | 1.5 | 1.5 | 1.5 | 1.5 | 1.5 | 1.5 | 1.5 | | 1.5 | 1.5 | 1.5 | 1.5 |
| | Vinyl chloride-vinyl acetate copolymer 2 | | | | | | | | | 1.5 | | | | |
| | Vinyl chloride-vinyl acetate copolymer 3 | | | | | | | | | | | | | |
| Dispersant | Solsperse32000 | 1.5 | 1.5 | 1.5 | 1.5 | 1.5 | 1.5 | 1.5 | 1.5 | 1.5 | 1.5 | 1.5 | 1.5 | 1.5 |
| Additive | Polyether-modified polydimethylsiloxane | 0.1 | 0.1 | 0.1 | 0.1 | 0.1 | 0.1 | 0.1 | 0.1 | 0.1 | | | | |
| Pigment | Carbon black | 3.0 | 3.0 | | | | | | | | | | | |
| | Cyan pigment (P.B.15:4) | | | 3.0 | | | | | | | | | | |
| | Magenta pigment (P.R.122) | | | | 3.0 | | | | | | | | | |
| | Yellow pigment (P.Y.155) | | | | | 3.0 | 3.0 | 3.0 | | | | | | |
| | Yellow pigment (P.Y.150) | | | | | | | | 3.0 | 3.0 | | | | |
| | Orange pigment (P.O.43) | | | | | | | | | | 3.0 | | | |
| | Orange pigment (P.O.71) | | | | | | | | | | | 3.0 | 3.0 | 3.0 |

TABLE 3-continued

|  | | | | | | | | | | | | | |
|---|---|---|---|---|---|---|---|---|---|---|---|---|---|
| Green pigment(P.G.36) | | | | | | | | | | | | | |
| Green pigment(P.G.58) | | | | | | | | | | | | | |
| Red pigment(P.R.254) | | | | | | | | | | | | | |
| White pigment(Titanium oxide) | | | | | | | | | | | | | |
| Total | 100.0 | 100.0 | 100.0 | 100.0 | 100.0 | 100.0 | 100.0 | 100.0 | 100.0 | 100.0 | 100.0 | 100.0 | 100.0 |
| Water content | 0.3 | 0.4 | 0.4 | 0.4 | 0.4 | 0.4 | 0.2 | 0.2 | 0.2 | 1.5 | 0.3 | 0.3 | 0.5 |
| Content of impurities derived from organic solvent (a) | 0.26 | 0.16 | 0.24 | 0.22 | 0.26 | 0.27 | 0.22 | 0.28 | 0.14 | 0.48 | 0.84 | 0.18 | 0.25 |
| Content of impurities derived from organic solvent (b) | 0.16 | 0.14 | 0.16 | 0.16 | 0.12 | 0.12 | 0.15 | 0.15 | 0.15 | 0.16 | 0.98 | 0.19 | 0.24 |
| Evaluation Ability to dry during recording | 5 | 5 | 5 | 2 | 5 | 5 | 5 | 5 | 5 | 3 | 2 | 5 | 5 |
| Adequacy for component | 5 | 5 | 5 | 5 | 5 | 5 | 5 | 5 | 5 | 3 | 2 | 2 | 2 |
| Post-processability | 5 | 5 | 5 | 5 | 5 | 5 | 5 | 5 | 5 | 4 | 2 | 2 | 2 |
| Storage stability | 5 | 5 | 5 | 5 | 5 | 5 | 5 | 5 | 5 | 2 | 2 | 2 | 2 |
| Blurring | 4 | 4 | 4 | 4 | 4 | 4 | 4 | 4 | 4 | 4 | 4 | 4 | 4 |

TABLE 4

| | | Example A | | | | | | | | | | | | | |
|---|---|---|---|---|---|---|---|---|---|---|---|---|---|---|
| | | Example 55 | Example 56 | Example 57 | Example 58 | Example 59 | Example 60 | Example 61 | Example 62 | Example 63 | Example 64 | Example 65 | Example 66 | Example 67 | Example 68 |
| Organic solvent (a) Dialkyl glycol ether | Diethylene glycol methyl ethyl ether | 66.0 | 65.0 | 65.0 | 65.0 | 68.5 | 68.5 | 68.5 | 68.4 | 66.0 | 66.5 | 66.5 | 66.0 | 66.0 | 66.0 |
| | Diethylene glycol diethyl ether | | | | | | | | | | | | | | |
| | Diethylene glycol dibutyl ether | | | | | | | | | | | | | | |
| | Dipropylene glycol dimethyl ether | | | | | | | | | | | | | | |
| Organic solvent(b) Alkylamide solvent(b1) | N,N-Diethylformamide | 15.0 | 15.0 | 15.0 | 15.0 | 15.0 | 15.0 | 15.0 | 15.0 | 15.0 | 15.0 | 15.0 | 15.0 | 15.0 | 15.0 |
| | N,N-Diethylpropanamide | | | | | | | | | | | | | | |
| | N,N-Diethylacetamide | | | | | | | | | | | | | | |
| | N,N-Dimethylformamide | | | | | | | | | | | | | | |
| | N,N-Dimethylacetamide | | | | | | | | | | | | | | |
| Organic solvent(b) Cyclic amide solvent(b2) | ε-Caprolactam | | | | | | | | | | | | | | |
| | N-Methylcaprolactam | | | | | | | | | | | | | | |
| | N-Vinylcaprolactam | | | | | | | | | | | | | | |
| | 1,3-Dimethylimidazolidinone | | | | | | | | | | | | | | |
| | N-Methyloxazolidinone | | | | | | | | | | | | | | |
| | N-Methyl-2-pyrolidone | | | | | | | | | | | | | | |
| Organic solvent(b) Six- or more-membered ring lactone solvent(b3) | δ-Valerolactone | 10.0 | 10.0 | 10.0 | 10.0 | 10.0 | 10.0 | 10.0 | 10.0 | 10.0 | 10.0 | 10.0 | 10.0 | 10.0 | 10.0 |
| | δ-Hexanolactone | | | | | | | | | | | | | | |
| | ε-Caprolactone | | | | | | | | | | | | | | |
| Additional solvent | Triethylene glycol mono-n-butyl ether | | | | | | | | | | | | | | |
| | Tetraethylene glycol monobutyl ether | | | | | | | | | | | | | | |
| | Dipropylene glycol monomethyl ether | | | | | | | | | | | | | | |
| | Propylene carbonate | | | | | | | | | | | | | | |
| | Ethylene glycol monobutyl ether acetate | | | | | | | | | | | | | | |
| | γ-Butyrolactone | | | | | | | | | | | | | | |
| | γ-Valerolactone | | | | | | | | | | | | | | |
| | 3-Methoxy-N,N-dimethylpropanamide | | | | | | | | | | | | | | |
| Resin | Acrylic resin | 3.0 | 3.0 | 3.0 | 3.0 | 3.0 | 3.0 | 3.0 | 3.0 | 3.0 | 3.0 | 3.0 | 3.0 | 3.0 | 3.0 |
| | Vinyl chloride-vinyl acetate copolymer 1 | 1.5 | 1.5 | 1.5 | 1.5 | 1.5 | 1.5 | 1.5 | 1.5 | 1.5 | 1.5 | 15 | 1.5 | 1.5 | 1.5 |
| | Vinyl chloride-vinyl acetate copolymer 2 | | | | | | | | | | | | | | |
| | Vinyl chloride-vinyl acetate copolymer 3 | | | | | | | | | | | | | | |
| Dispersant | Solsperse32000 | 1.5 | 1.5 | 1.5 | 1.5 | 1.5 | 1.5 | 1.5 | 1.5 | 1.5 | 1.5 | 1.5 | 1.5 | 1.5 | 1.5 |
| Additive | Polyether-modified polydimethylsiloxane | | | | | | | | | 0.5 | | | | | |
| Pigment | Carbon black | 3.0 | | | | | | | 0.1 | | | | | | |
| | Cyan pigment(P.B.154) | | | | | 0.5 | | | | | | | | | |
| | Magenta pigment(P.R.122) | | 4.0 | | | | 0.5 | | | | | | | | |
| | Yellow pigment(P.Y.155) | | | 4.0 | | | | 0.5 | | | | | | | |
| | Yellow pigment(P.Y.150) | | | | 4.0 | | | | | 3.0 | | | | | |
| | Orange pigment(P.O.43) | | | | | | | | | | 2.5 | | | | |
| | Orange pigment(P.O.71) | | | | | | | | | | | 2.5 | | | |
| | Green pigment(P.G.36) | | | | | | | | | | | | 3.0 | | |
| | Green pigment(P.G.58) | | | | | | | | | | | | | 3.0 | |
| | Red pigment(P.R.254) | | | | | | | | | | | | | | 3.0 |
| | White pigment(Titanium oxide) | | | | | | | | | | | | | | |
| Total | | 100.0 | 100.0 | 100.0 | 100.0 | 100.0 | 100.0 | 100.0 | 100.0 | 100.0 | 100.0 | 100.0 | 100.0 | 100.0 | 100.0 |

TABLE 4-continued

| | | ExampleA | | | | | | | Comparative Example A | | | | | |
|---|---|---|---|---|---|---|---|---|---|---|---|---|---|---|
| | | Example69 | Example70 | Example71 | Example72 | Example73 | Example74 | Example75 | Example76 | Example77 | Example78 | Example79 | Example80 | Example81 |
| Water content | | 0.3 | 0.2 | 0.2 | 0.4 | 0.3 | 0.4 | 0.4 | 0.4 | 0.3 | 0.4 | 0.4 | 0.3 | 0.4 |
| Content of impurities derived from organic solvent (a) | | 0.32 | 0.27 | 0.24 | 0.18 | 0.25 | 0.22 | 0.27 | 0.29 | 0.27 | 0.19 | 0.27 | 0.24 | 0.22 |
| Content of impurities derived from organic solvent (b) | | 0.15 | 0.16 | 0.16 | 0.13 | 0.13 | 0.15 | 0.16 | 0.13 | 0.13 | 0.13 | 0.15 | 0.13 | 0.16 |
| Evaluation | Ability to dry during recording | 5 | 5 | 5 | 5 | 5 | 5 | 5 | 5 | 5 | 5 | 5 | 5 | 5 |
| | Adequacy for component | 5 | 5 | 5 | 5 | 5 | 5 | 5 | 5 | 5 | 5 | 5 | 5 | 5 |
| | Post-processability | 5 | 5 | 5 | 5 | 5 | 5 | 5 | 5 | 5 | 5 | 5 | 5 | 5 |
| | Storage stability | 5 | 5 | 5 | 5 | 5 | 5 | 5 | 5 | 5 | 5 | 5 | 5 | 5 |
| | Blurring | 4 | 4 | 4 | 4 | 4 | 4 | 4 | 4 | 4 | 4 | 4 | 4 | 4 |
| Organic solvent (a) Dialkyl glycol ether | Diethylene glycol methyl ethyl ether | 54.0 | 81.0 | 66.0 | 71.0 | 76.0 | 66.0 | 66.0 | 76.0 | 56.0 | 85.9 | 70.9 | 75.9 | 75.9 |
| | Diethylene glycol diethyl ether | | | | | | | | | | | | | |
| | Diethylene glycol dibutyl ether | | | | | | | | | | | | | |
| | Dipropylene glycol dimethyl ether | | | | | | | | | | | | | |
| Organic solvent (b) Alkylamide solvent (b1) | N,N-Diethylformamide | | | | | | | | | | | | | |
| | N,N-Diethylpropanamide | 15.0 | | | | | | | | | | | | |
| | N,N-Diethylacetamide | | | | | | | | | | | | | |
| | N,N-Dimethylformamide | | | 15.0 | | | | | | | | | | |
| | N,N-Dimethylacetamide | | | | 10.0 | | | | | | | | | |
| Organic solvent (b) Cyclic amide solvent (b2) | ε-Caprolactam | | | | | 5.0 | | | | | | | | |
| | N-Methylcaprolactam | | | | | | 15.0 | | | | | | | |
| | N-Vinylcaprolactam | | | | | | | 15.0 | | | | | | |
| | 1,3-Dimethylimidazolidinone | | | | | | | | 15.0 | | | | | |
| | N-Methyloxazolidinone | | | | | | | | | 15.0 | | | | |
| | N-Methyl-2-pyrrolidone | | | | | | | | | | | | | |
| Organic solvent (b) Six- or more-membered ring lactone solvent (b3) | δ-Valerolactone | | | | | | | | | | | | | |
| | δ-Hexanolactone | | | | | | | | | | | | | |
| | ε-Caprolactone | | 5.0 | | | | | | | | | | | |
| Additional solvent | Triethylene glycol mono-n-butyl ether | | | | | | | | | | | | | |
| | Tetraethylene glycol monobutyl ether | | | | | | | | | | | | | |
| | Dipropylene glycol monomethyl ether | | | | | | | | | | | | | |
| | Propylene carbonate | | | | | | | | | | | | | |
| | Ethylene glycol monobutyl ether acetate | 10.0 | 5.0 | 10.0 | 10.0 | 10.0 | 10.0 | 10.0 | 10.0 | 20.0 | 5.0 | 20.0 | 10.0 | 10.0 |
| | γ-Butyrolactone | | | | | | | | | | | | | |
| | γ-Valerolactone | | | | | | | | | | | | | |
| | 3-Methoxy-N,N-dimethylpropanamide | | | | | | | | | | | | | |
| Resin | Acrylic resin | 3.0 | 3.0 | 3.0 | 3.0 | 3.0 | 3.0 | 3.0 | 3.0 | 3.0 | | | | |
| | Vinyl chloride-vinyl acetate copolymer 1 | | | | | | | | | | 4.5 | 4.5 | 4.5 | 4.5 |
| | Vinyl chloride-vinyl acetate copolymer 2 | | | | | | | | | | | | | |
| | Vinyl chloride-vinyl acetate copolymer 3 | | | | | | | | | | | | | |
| Dispersant | Solsperse32000 | 1.5 | 1.5 | 1.5 | 1.5 | 1.5 | 1.5 | 1.5 | 1.5 | 1.5 | 1.5 | 1.5 | 1.5 | 1.5 |
| Additive | Polyether-modified polydimethylsiloxane | | | | | | | | | | 0.1 | 0.1 | 0.1 | 0.1 |
| Pigment | Carbon black | 1.5 | 1.5 | 1.5 | 1.5 | 1.5 | 1.5 | 1.5 | 1.5 | 1.5 | | | | |
| | Cyan pigment (P.B.15:4) | | | | | | | | | | 1.5 | 1.5 | 1.5 | 1.5 |
| | Magenta pigment (P.R.122) | | | | | | | | | | | | | |
| | Yellow pigment (P.Y.155) | | | | | | | | | | 3.0 | 3.0 | 3.0 | 3.0 |
| | Yellow pigment (P.Y.150) | | | | | | | | | | | | | |
| | Orange pigment (P.O.43) | | | | | | | | | | | | | |
| | Orange pigment (P.O.71) | | | | | | | | | | | | | |

TABLE 4-continued

|  | | | | | | | | | | | | | |
|---|---|---|---|---|---|---|---|---|---|---|---|---|---|
| Green pigment(P.G.36) | | | | | | | | | | | | | |
| Green pigment(P.G.58) | | | | | | | | | | | | | |
| Red pigment(P.R.254) | | | | | | | | | | | | | |
| White pigment(Titanium oxide) | 15.0 | | | | | | | | | | | | |
| Total | 100.0 | 100.0 | 100.0 | 100.0 | 100.0 | 100.0 | 100.0 | 100.0 | 100.0 | 100.0 | 100.0 | 100.0 | 100.0 |
| Water content | 0.6 | 0.2 | 0.3 | 0.3 | 0.4 | 0.5 | 0.4 | 0.3 | 0.4 | 0.3 | 0.2 | 0.3 | 0.2 |
| Content of impurities derived from organic solvent (a) | 0.24 | 0.14 | 0.16 | 0.18 | 0.25 | 0.24 | 0.24 | 0.20 | 0.22 | 0.24 | 0.18 | 0.24 | 0.18 |
| Content of impurities derived from organic solvent (b) | 0.12 | | | | | | | | | | | | |
| Evaluation: Ability to dry during recording | 5 | 1 | 5 | 5 | 4 | 5 | 5 | 1 | 1 | 4 | 4 | 4 | 4 |
| Adequacy for component | 5 | 5 | 1 | 2 | 2 | 1 | 1 | 4 | 2 | 1 | 1 | 1 | 1 |
| Post-processability | 5 | 5 | 4 | 1 | 1 | 1 | 1 | 3 | 2 | 1 | 1 | 2 | 1 |
| Storage stability | 5 | 4 | 4 | 4 | 5 | 2 | 2 | 4 | 4 | 4 | 3 | 4 | 4 |
| Blurring | 4 | 1 | 4 | 4 | 3 | 4 | 4 | 3 | 3 | 3 | 4 | 3 | 3 |

As is evident from the tables, the nonaqueous ink compositions of Example A, which contain the organic solvents (a) and (b), had a high ability to dry on the substrate surface during recording and provided recorded products with good post-processability. The nonaqueous ink compositions of Example A, which contain the organic solvents (a) and (b), also had good adequacy for component and good storage stability and were less likely to cause blurring. Moreover, Examples 55 to 69 containing colorants of different colors showed the same results as those of Example 20 containing carbon black.

A comparison was made between nonaqueous ink composition examples containing 15.0 mass % of the organic solvent (b), such as Example 20 (containing the alkylamide solvent (b1)), Example 24 (containing the alkylamide solvent (b1)), Example 30 (containing the cyclic amide solvent (b2)), Example 32 (containing the cyclic amide solvent (b2)), Example 33 (containing the cyclic amide solvent (b2)), Example 34 (containing the six- or more-membered ring lactone solvent (b3)), Example 35 (containing the six- or more-membered ring lactone solvent (b3)), and Example 39 (containing the six- or more-membered ring lactone solvent (b3)). As a result, Examples 20, 24, 30, 32, and 33, which contain the alkyl amide solvent (b1) or the cyclic amide solvent (b2) as the organic solvent (b), were found to have a higher ability to dry during recording than Examples 34, 35, and 39.

A comparison was also made between Examples 17 to 21, which contain N,N-diethylformamide (the alkylamide solvent (b1)) as the organic solvent (b). As a result, Examples 20 and 21, which contain at most 17.0 mass % of the organic solvent (b), were found to have particularly good adequacy for component and to provide particularly good post-processability.

The nonaqueous ink composition of Example 30 with a lower water content had a higher ability to dry on the substrate surface during recording and better storage stability than Example 51 having the same proportion of components. The nonaqueous ink composition of Example 30 with a lower concentration of impurities derived from the organic solvents (a) and (b) had a higher ability to dry on the substrate surface and provided a recorded product with better post-processability than Example 52 having the same proportion of components.

Examples 20, 44 and 46, which respectively contain diethylene glycol methyl ethyl ether, diethylene glycol diethyl ether, and dipropylene glycol dimethyl ether as the organic solvent (a), had a particularly higher ability to dry during recording than Example 45, which contains diethylene glycol dibutyl ether as the organic solvent (a).

On the other hand, the nonaqueous ink composition of Example 70, which neither contains the organic solvent (b) nor a five-membered ring lactone solvent, had a low ability to dry during recording and caused blurring. The nonaqueous ink compositions of Examples 71 to 75, which contain a five-membered ring lactone solvent or 3-methoxy-N,N-dimethylpropanamide instead of the organic solvent (b), reduced the post-processability although blurring was at a low level. The nonaqueous ink compositions of Examples 76 to 81, which do not contain the organic solvent (a), had a low ability to dry during recording and low adequacy for component.

Nonaqueous Ink Compositions According to Second Embodiment

1. Preparation of Resins
(1) Acrylic Resin

A mixture of 150 g of methyl methacrylate, 50 g of butyl methacrylate, and a given amount of tert-butyl peroxy-2-ethylhexanoate (polymerization initiator) was added dropwise over 1.5 hours to 300 g of diethylene glycol diethyl ether kept at 100° C. After the dropwise addition was completed, the mixture was reacted at 100° C. for 2 hours. The reaction mixture was then cooled to give a clear, colorless, methyl methacrylate polymer solution (solid content 39.5%). Subsequently, the solvent was sufficiently removed from the polymer solution by distillation. In this process, the weight average absolute molecular weight of the methyl methacrylate polymer (acrylic resin) was controlled by varying the amount of the polymerization initiator, tert-butyl peroxy-2-ethylhexanoate (the mass of the polymerization initiator used in this process is shown in the "Initiator amount" column of Table 5). The weight average absolute molecular weight was measured using a GPC system equipped with a TSKgel column (manufactured by Tosoh Corporation) and a multiangle light scattering detector (miniDawn TREOS manufactured by Wyatt Technology Corporation). The developing solvent was THF.

(2) Vinyl Chloride-Vinyl Acetate Copolymer Resin

After an autoclave equipped with a stirrer was purged with nitrogen, 100 parts of deionized water, 40 parts of methanol, 32 parts of vinyl chloride, 5 parts of vinyl acetate, 0.2 parts of glycidyl methacrylate, 3.55 parts of hydroxypropyl acrylate, 0.1 parts of hydroxypropyl methyl cellulose (suspension agent), 0.026 parts of di-2-ethylhexyl peroxydicarbonate (polymerization initiator), and a given amount of di-3,5,5-trimethylhexanol peroxide (polymerization initiator) were added into the autoclave. The mixture was heated to 63° C. with stirring under the nitrogen gas atmosphere. Immediately after the temperature reached 63° C., 48 parts of vinyl chloride and a mixture of 0.6 parts of glycidyl methacrylate and 10.65 parts of hydroxypropyl acrylate were continuously added under pressure to the mixture over 6 hours and 5.4 hours, respectively, for copolymerization reaction. At the time point when the pressure in the autoclave reached 0.3 MPa, the residual pressure was released, and after being cooled, the resulting resin slurry was taken out, filtered, and dried to give a vinyl chloride copolymer resin. In this process, the weight average absolute molecular weight of the vinyl chloride-vinyl acetate copolymer resin was controlled by varying the amount of the polymerization initiator, di-3,5,5-trimethylhexanol peroxide (the mass of the polymerization initiator used in this process is shown in the "Initiator amount" column of Table 5). The weight average absolute molecular weight was measured using a GPC system equipped with a TSKgel column (manufactured by Tosoh Corporation) and a multiangle light scattering detector (miniDawn TREOS manufactured by Wyatt Technology Corporation). The developing solvent was THF.

(3) Cellulosic Resin

Commercially available cellulosic resins (CAP-482-0.5, CAB-553-0.4, and CAB-551-0.01 from Eastman Chemical Company) were used.

Table 5 shows the weight average absolute molecular weight of each of the resins (acrylic resins, vinyl chloride-vinyl acetate copolymer resins, and cellulosic resins).

TABLE 5

| | | Weight average absolute molecular weight | Product number | Initiator amount (g) |
|---|---|---|---|---|
| Acrylic resin | Acrylic resin 1 | 120000 | — | 0.06 |
| | Acrylic resin 2 | 90000 | — | 0.10 |
| | Acrylic resin 3 | 80000 | — | 0.30 |
| | Acrylic resin 4 | 55000 | — | 0.60 |
| | Acrylic resin 5 | 40000 | — | 1.00 |
| | Acrylic resin 6 | 15000 | — | 3.30 |
| | Acrylic resin 7 | 10000 | — | 4.50 |
| Vinyl chloride-vinyl acetate copolymer | Vinyl chloride-vinyl acetate copolymer 1 | 90000 | — | 0.06 |
| | Vinyl chloride-vinyl acetate copolymer 2 | 80000 | — | 0.10 |
| | Vinyl chloride-vinyl acetate copolymer 3 | 55000 | — | 0.18 |
| | Vinyl chloride-vinyl acetate copolymer 4 | 40000 | — | 0.30 |
| | Vinyl chloride-vinyl acetate copolymer 5 | 35000 | — | 0.37 |
| | Vinyl chloride-vinyl acetate copolymer 6 | 30000 | — | 0.45 |
| | Vinyl chloride-vinyl acetate copolymer 7 | 20000 | — | 0.65 |
| Cellulosic resin | Cellulosic resin 1 | 50000 | CAP-482-0.5 | — |
| | Cellulosic resin 2 | 35000 | CAB553-0.4 | — |
| | Cellulosic resin 3 | 13000 | CAB551-0.01 | — |

2. Preparation of Nonaqueous Ink Compositions

Nonaqueous ink compositions categorized into Example B and Comparative Example B were prepared each containing components in the proportion shown in Table 6 below. Specifically, the components were dispersed with zirconia beads in a paint shaker to form each nonaqueous ink composition. The values are shown in units of parts by mass. Before the mixing, the concentrations of impurities in the organic solvent (b) and the dialkyl glycol ether used for Examples 1 to 69 were determined by gas chromatography.

Evaluation

Ability to Dry During Recording

The nonaqueous ink compositions of Example B and Comparative Example B were evaluated for their ability to dry. Specifically, using an inkjet printer (VersaArt RE-640 (trade name) manufactured by Roland DG Corporation), a solid image was printed in high-quality mode (1,440×720 dpi) on a recording medium (an adhesive polyvinyl chloride film (IMAGin JT5829R manufactured by MACtac)) by an inkjet method using each of the nonaqueous ink compositions of Example B and Comparative Example B, during which the time taken for the print to dry at 40° C. was measured (in the tables, the evaluation result is shown in the "Ability to dry during recording" column).

Evaluation Criteria

Rating 5: The print dries in less than 2 minutes.
Rating 4: The print dries in a time of 2 minutes or more and less than 4 minutes.
Rating 3: The print dries in a time of 4 minutes or more and less than 6 minutes.
Rating 2: The print dries in a time of 6 minutes or more and less than 8 minutes.
Rating 1: The print dries in a time of 8 minutes or more.

Adhesion Strength of Original Adhesive

The nonaqueous ink compositions of Example B and Comparative Example B were evaluated for adhesion to adherend. Specifically, as in the evaluation of the ability to dry during recording, a solid image was printed in high-quality mode (1,440×720 dpi) on a recording medium (an adhesive polyvinyl chloride film (3M Controltac Graphic Film IJ180 manufactured by 3M Company)) at a substrate surface temperature of 40° C., and the resulting print was bonded to an aluminum sheet (adherend). The resulting laminate was allowed to stand for 1 hour and then subjected to a peel strength test using a tensile tester (TSNSILON RTG 1250 manufactured by A&D Company, Limited). The test was performed using a 50 N load cell at a speed of 5 mm/s. The results of the evaluation based on the following criteria are shown in Table 5 below (in Table 5, the evaluation result is shown in the "Adhesion strength of original adhesive" column).

Rating 5: The peel strength is 5 N/20 mm or more.
Rating 4: The peel strength is 4 N/20 mm or more and less than 5 N/20 mm.
Rating 3: The peel strength is 3 N/20 mm or more and less than 4 N/20 mm.
Rating 2: The peel strength is 2 N/20 mm or more and less than 3 N/20 mm.
Rating 1: The peel strength is 2 N/20 mm or less.

Odor Test

As in the evaluation of the ability to dry during recording, printing was performed in high-quality mode (1,440×720 dpi) on a recording medium (an adhesive polyvinyl chloride film IMAGin JT5829R manufactured by MACtac)) at a substrate surface temperature of 40° C. Immediately after the printing, six testers smelled and rated the odor of the recorded product. The most common rate was used for the evaluation of the nonaqueous ink composition (in the tables, the evaluation result is shown in the "Odor" column).

Rating 5: There is no unpleasant odor.
Rating 4: There is a slight odor.
Rating 3: There is a certain odor.
Rating 2: There is a slight unpleasant odor.
Rating 1: There is an unpleasant odor.

Storage Stability

The nonaqueous ink compositions of Example B and Comparative Example B were evaluated for storage stability. Specifically, the nonaqueous ink compositions of Example B and Comparative Example B were stored at 60° C. for 1 month, and before and after the test, it was observed how much the viscosity of the compositions and the average particle diameter (D50) of the pigment changed. The storage stability of the compositions was evaluated according to the criteria below. The viscosity of the ink was measured using a falling-ball viscometer (AMVn manufactured by Anton Paar) under 20° C. conditions. The volume average particle diameter (D50) of the pigment was measured using a particle size distribution measurement system (Nanotrac Wave (a particle size analyzer manufactured by Microtrac- BEL)) under 25° C. conditions. Either the rate of change in the viscosity or the rate of change in the volume average particle diameter of the pigment, whichever was higher, was used for the evaluation of the nonaqueous ink composition.

Evaluation Criteria
- Rating 5: The rate of change in the viscosity and the rate of change in the volume average particle diameter of the pigment are all less than 3%.
- Rating 4: Either the rate of change in the viscosity or the rate of change in the volume average particle diameter of the pigment is 3% or more and less than 5%.
- Rating 3: Either the rate of change in the viscosity or the rate of change in the volume average particle diameter of the pigment is 5% or more and less than 8%.
- Rating 2: Either the rate of change in the viscosity or the rate of change in the volume average particle diameter of the pigment is 8% or more and less than 10%.
- Rating 1: Either the rate of change in the viscosity or the rate of change in the volume average particle diameter of the pigment is 10% or more.

Stretchability

The nonaqueous ink compositions of Example B and Comparative Example B were evaluated for Stretchability. Specifically, using an inkjet printer, printing was performed in high-quality mode (1,440×720 dpi) on a recording medium (an adhesive polyvinyl chloride film (IMAGin JT5829R manufactured by MACtac)) at a substrate surface temperature of 40° C. as in the evaluation of the ability to dry during recording. Immediately after the printing, a magenta 100% solid print (record) part of the resulting recorded product was stretched to 200% at room temperature. Before and after the stretching, the L*a*b* values of the decorated layer were measured using X-Rite eXact manufactured by X-Rite, Inc. under the conditions of D65 light source and 2° viewing angle. The stretchability of the recorded product was evaluated based on $\Delta E$ calculated from the formula: $\Delta E=[(\Delta L^*)^2+(\Delta a^*)^2+(\Delta b+)^2]^{1/2}$, where $\Delta L^*$ is the difference between the L* values before and after the test, $\Delta a^*$ is the difference between the a* values before and after the test, and $\Delta b^*$ is the difference between the b* values before and after the test.

Evaluation Criteria
- Rating 5: $\Delta E$ is less than 7.5.
- Rating 4: $\Delta E$ is 7.5 or more and less than 10.
- Rating 3: $\Delta E$ is 10 or more and less than 12.5.
- Rating 2: $\Delta E$ is 12.5 or more and less than 15.
- Rating 1: $\Delta E$ is 15 or more.

Ejection Stability

The nonaqueous ink compositions of Example B and Comparative Example B were evaluated for ejection stability. Specifically, fine lines were reciprocally printed in high-speed mode (360×720 dpi) on a recording medium (an adhesive polyvinyl chloride film (IMAGin JT5829R manufactured by MACtac)) at a substrate surface temperature of 40° C. as in the evaluation of the ability to dry during recording. The fine lines were observed with the naked eyes and with a loupe (5×) when they were evaluated (in the tables, the evaluation result is shown in the "ejection stability" column).

Evaluation Criteria
- Rating 4: Correct reproduction of fine lines is confirmed even when they are observed with a loupe.
- Rating 3: Slight bending of fine lines is observed with a loupe although it is not clearly observed with the naked eyes.
- Rating 2: Slight bending of fine lines is also observed with the naked eyes.
- Rating 1: Bending of fine lines are clearly observed with the naked eyes.

Evaluation of Blurring

An image consisting of: a solid background of a given color; and 6-point letters of a different color on the background was printed in high-quality mode (1,440×720 dpi) on a recording medium (an adhesive polyvinyl chloride film (IMAGin JT5829R manufactured by MACtac)) at a substrate surface temperature of 40° C. as in the evaluation of the ability to dry during recording. The resulting print was dried in an oven at 60° C. for 5 minutes, and then it was visually observed whether and how the print blurred.

Evaluation Criteria
- Rating 4: No ink blurring is observed, and the 6-point letters are clear.
- Rating 3: Slight ink blurring is observed with no esthetic damage.
- Rating 2: Ink blurring is observed while the 6-point letters are identifiable.
- Rating 1: Significant ink blurring is observed, and the 6-point letters are not visually identifiable.

TABLE 6

| | Components | Example B | | | | | | | | | | | | | |
|---|---|---|---|---|---|---|---|---|---|---|---|---|---|---|---|
| | | Example 1 | Example 2 | Example 3 | Example 4 | Example 5 | Example 6 | Example 7 | Example 8 | Example 9 | Example 10 | Example 11 | Example 12 | Example 13 | Example 14 |
| Organic solvent (b) Alkylamide solvent (b1) | N,N-Diethylformamide | 30.0 | | | | | | | | | | | | | |
| | N,N-Diethylpropanamide | | 20.0 | | | | | | | | | | | | |
| | N,N-Diethylacetamide | | | 10.0 | | | | | | | | | | | |
| | N,N-Dimethylformamide | | | | 5.0 | | | | | | | | | | |
| | N,N-Dimethylacetamide | | | | | 10.0 | | | | | | | | | |
| Organic solvent (b) Cyclic amide solvent (b2) | ε-Caprolactam | | | | | | 10.0 | | | | | | | | |
| | N-Methylcaprolactam | | | | | | | 10.0 | | | | | | | |
| | N-Acetylcaprolactam | | | | | | | | 30.0 | | | | | | |
| | N-Vinylcaprolactam | | | | | | | | | 20.0 | | | | | |
| | 1,3-Dimethylimidazolidinone | | | | | | | | | | 10.0 | | | | |
| | N-Methyloxazolidinone | | | | | | | | | | | 10.0 | | | |
| | N-Methyl-2-pyrolidone | | | | | | | | | | | | 10.0 | | |
| Organic solvent (b) Six- or more-membered ring lactone solvent (b3) | δ-Valerolactone | | | | | | | | | | | | | 10.0 | |
| | δ-Hexanolactone | | | | | | | | | | | | | | 30.0 |
| | ε-Caprolactone | 51.0 | 61.0 | 71.0 | 76.0 | 71.0 | 71.0 | 71.0 | 51.0 | 61.0 | 71.0 | 70.0 | 71.0 | 71.0 | 51.0 |
| Additional solvent | Diethylene glycol methyl ethyl ether | 10.0 | 10.0 | 10.0 | 10.0 | 10.0 | 10.0 | 10.0 | 10.0 | 10.0 | 10.0 | 10.0 | 10.0 | 10.0 | 10.0 |
| | Triethylene glycol mono-n-butyl ether | | | | | | | | | | | | | | |
| | Dipropylene glycol monomethyl ether | | | | | | | | | | | | | | |
| | Propylene carbonate | | | | | | | | | | | | | | |
| | Ethylene glycol monobutyl ether acetate | | | | | | | | | | | | | | |
| | γ-Butyrolactone | | | | | | | | | | | | | | |
| | γ-Valerolactone | | | | | | | | | | | | | | |
| | 3-Methoxy-N,N-dimethylpropanamide | | | | | | | | | | | | | | |
| Acrylic resin | Acrylic resin 1 (|Mw|:120000) | 3.0 | 3.0 | 3.0 | 3.0 | 3.0 | 3.0 | 3.0 | 3.0 | 3.0 | 3.0 | 3.0 | 3.0 | 3.0 | 3.0 |
| | Acrylic resin 2 (|Mw|:90000) | | | | | | | | | | | | | | |
| | Acrylic resin 3 (|Mw|:80000) | | | | | | | | | | | | | | |
| | Acrylic resin 4 (|Mw|:55000) | | | | | | | | | | | | | | |
| | Acrylic resin 5 (|Mw|:40000) | | | | | | | | | | | | | | |
| | Acrylic resin 6 (|Mw|:15000) | | | | | | | | | | | | | | |
| | Acrylic resin 7 (|Mw|:10000) | | | | | | | | | | | | | | |
| Vinyl chloride-vinyl acetate copolymer | Vinyl chloride-vinyl acetate copolymer 1 (Mw:90000) | 1.5 | 1.5 | 1.5 | 1.5 | 1.5 | 1.5 | 1.5 | 1.5 | 1.5 | 1.5 | 1.5 | 1.5 | 1.5 | 1.5 |
| | Vinyl chloride-vinyl acetate copolymer 2 (|Mw|:80000) | | | | | | | | | | | | | | |
| | Vinyl chloride-vinyl acetate copolymer 3 (|Mw|:55000) | | | | | | | | | | | | | | |
| | Vinyl chloride-vinyl acetate copolymer 4 (|Mw|:40000) | | | | | | | | | | | | | | |
| | Vinyl chloride-vinyl acetate copolymer 5 (|Mw|:35000) | | | | | | | | | | | | | | |
| | Vinyl chloride-vinyl acetate copolymer 6 (|Mw|:30000) | | | | | | | | | | | | | | |
| | Vinyl chloride-vinyl acetate copolymer 7 (|Mw|:20000) | | | | | | | | | | | | | | |

TABLE 6-continued

| | Components | Example 15 | Example 16 | Example 17 | Example 18 | Example 19 | Example 20 | Example 21 | Example 22 | Example 23 | Example 24 | Example 25 | Example 26 | Example 27 |
|---|---|---|---|---|---|---|---|---|---|---|---|---|---|---|
| Cellulosic resin | Cellulosic resin 1 (Mw:50000) | | | | | | | | | | | | | |
| | Cellulosic resin 2 (Mw:35000) | | | | | | | | | | | | | |
| | Cellulosic resin 3 (Mw:13000) | 1.5 | 1.5 | 1.5 | 1.5 | 1.5 | 1.5 | 1.5 | 1.5 | 1.5 | 1.5 | 1.5 | 1.5 | 1.5 |
| Dispersant | Solsperse32000 | 3.0 | 3.0 | 3.0 | 3.0 | 3.0 | 3.0 | 3.0 | 3.0 | 3.0 | 3.0 | 3.0 | 3.0 | 3.0 |
| Additive | Polyether-modified polydimethylsiloxane | | | | | | | | | | | | | |
| Pigment | Carbon black | | | | | | | | | | | | | |
| | Cyan pigment (P.B.15:4) | | | | | | | | | | | | | |
| | Magenta pigment (P.R.122) | | | | | | | | | | | | | |
| | Yellow pigment (P.Y.155) | | | | | | | | | | | | | |
| | Yellow pigment (P.Y.150) | | | | | | | | | | | | | |
| | Orange pigment (P.O.43) | | | | | | | | | | | | | |
| | Orange pigment (P.O.71) | | | | | | | | | | | | | |
| | Green pigment (P.G.36) | | | | | | | | | | | | | |
| | Green pigment (P.G.58) | | | | | | | | | | | | | |
| | Red pigment (P.R.254) | | | | | | | | | | | | | |
| | White pigment (Titanium oxide) | | | | | | | | | | | | | |
| Total | | 100.0 | 100.0 | 100.0 | 100.0 | 100.0 | 100.0 | 100.0 | 100.0 | 100.0 | 100.0 | 100.0 | 100.0 | 100.0 |
| Water content | | 0.9 | 0.9 | 0.5 | 0.3 | 0.3 | 0.3 | 0.5 | 0.3 | 0.4 | 0.6 | 0.2 | 0.3 | 0.4 |
| Content of impurities derived from organic solvent (b) | | 0.22 | 0.22 | 0.12 | 0.10 | 0.33 | 0.25 | 0.15 | 0.26 | 0.26 | 0.20 | 0.15 | 0.09 | 0.14 |
| Content of impurities derived from dialkyl glycol ether | | 0.31 | 0.22 | 0.12 | 0.10 | 0.18 | 0.25 | 0.24 | 0.22 | 0.42 | 0.21 | 0.25 | 0.16 | 0.21 |
| Evaluation | Ability to dry during recording | 4 | 5 | 4 | 5 | 5 | 5 | 5 | 5 | 5 | 5 | 5 | 5 | 4 |
| | Adhesion strength of original adhesive | 5 | 4 | 5 | 5 | 4 | 5 | 5 | 4 | 4 | 5 | 4 | 3 | 2 |
| | Odor | 5 | 5 | 5 | 5 | 5 | 5 | 4 | 5 | 5 | 5 | 4 | 4 | 4 |
| | Storage stability | 5 | 5 | 5 | 5 | 5 | 5 | 5 | 5 | 5 | 4 | 5 | 4 | 4 |
| | Stretchability | 4 | 4 | 3 | 4 | 4 | 4 | 4 | 4 | 4 | 4 | 3 | 5 | 4 |
| | Ejection stability | 4 | 4 | 3 | 4 | 4 | 4 | 4 | 4 | 4 | 4 | 3 | 3 | 4 |
| | Blurring | | | | | | | | | | | | | |

Example B

| | Components | Example 15 | Example 16 | Example 17 | Example 18 | Example 19 | Example 20 | Example 21 | Example 22 | Example 23 | Example 24 | Example 25 | Example 26 | Example 27 |
|---|---|---|---|---|---|---|---|---|---|---|---|---|---|---|
| Organic solvent (b) Alkylamide solvent (b1) | N,N-Diethylformamide | | | | | | | | | | | | | |
| | N,N-Diethylpropanamide | | | | | | | | | | | | | |
| | N,N-Diethylacetamide | | | | | | | | | | | | | |
| | N,N-Dimethylformamide | | | | | | | | | | | | | |
| | N,N-Dimethylacetamide | | | | | | | | | | | | | |
| Organic solvent (b) Cyclic amide solvent (b2) | ε-Caprolactam | 10.0 | 10.0 | 10.0 | 10.0 | 10.0 | 10.0 | | 91.0 | 81.0 | 51.0 | 10.0 | 10.0 | 10.0 |
| | N-Methylcaprolactam | | | | | | | | | | | | | |
| | N-Acetylcaprolactam | | | | | | | | | | | | | |
| | N-Vinylcaprolactam | | | | | | | | | | | | | |
| | 1,3-Dimethylimidazolidinone | | | | | | | | | | | | | |
| | N-Methyloxazolidinone | | | | | | | | | | | | | |
| | N-Methyl-2-pyrrolidone | | | | | | | | | | | | | |

TABLE 6-continued

| | | | | | | | | | | | | | | |
|---|---|---|---|---|---|---|---|---|---|---|---|---|---|---|
| Organic solvent (b) Six- or more-membered ring lactone solvent(b3) | δ-Valerolactone | 20.0 | 10.0 | | | | | | | | | | | |
| | δ-Hexanolactone | | | | | | | | | | | | | |
| | ε-Caprolactone | 61.0 | 71.0 | 71.0 | 71.0 | 76.0 | 76.0 | | | 70.9 | 70.9 | 71.0 | | |
| Additional solvent | Diethylene glycol methyl ethyl ether | 10.0 | 10.0 | 10.0 | 10.0 | | | | | | | | | |
| | Triethylene glycol mono-n-butyl ether | | | | | | | 10.0 | | | | | | |
| | Dipropylene glycol monomethyl ether | | | | | | | | 20.0 | | | | | |
| | Propylene carbonate | | | | | 5.0 | 5.0 | | 10.0 | | | | | |
| | Ethylene glycol monobutyl ether acetate | | | | | | | | | | | | | |
| | γ-Butyrolactone | | | | | | | | | | | 4.5 | | |
| | γ-Valerolactone | | | | | | | | | | | | | |
| | 3-Methoxy-N,N-dimethylpropanamide | | | | | | | | | | | | | |
| Acrylic resin | Acrylic resin 1(Mw:120000) | 3.0 | | | | | | | 3.0 | | | | | |
| | Acrylic resin 2(Mw:90000) | | 3.0 | | | | | | | | | | | |
| | Acrylic resin 3(Mw:80000) | | | 3.0 | | | | | | | 2.0 | | | |
| | Acrylic resin 4(Mw:55000) | | | | 3.0 | | | | | | | | | |
| | Acrylic resin 5(Mw:40000) | | | | | 3.0 | | | | | | 2.0 | | |
| | Acrylic resin 6(Mw:15000) | | | | | | 3.0 | | | | | | | |
| | Acrylic resin 7(Mw:10000) | | | | | | | | | | | | | |
| Vinyl chloride-vinyl acetate copolymer | Vinyl chloride-vinyl acetate copolymer 1(Mw:90000) | 1.5 | | | | | | | | | | | | |
| | Vinyl chloride-vinyl acetate copolymer 2(Mw:80000) | | 1.5 | | | | | | | | | | | |
| | Vinyl chloride-vinyl acetate copolymer 3(Mw:55000) | | | 1.5 | | | | | | | | | | |
| | Vinyl chloride-vinyl acetate copolymer 4(Mw:40000) | | | | | | | | | 1.5 | | | | |
| | Vinyl chloride-vinyl acetate copolymer 5(Mw:35000) | | | | 1.5 | | | 1.5 | | | | | | |
| | Vinyl chloride-vinyl acetate copolymer 6(Mw:30000) | | | | | | | | | | | 2.5 | | |
| | Vinyl chloride-vinyl acetate copolymer 7(Mw:20000) | | | | | | 1.5 | | | | | | | |
| Cellulosic resin | Cellulosic resin 1(Mw:50000) | 1.5 | | | | 1.5 | 1.5 | 1.5 | 1.5 | 1.5 | 1.5 | 1.5 | | |
| | Cellulosic resin 2(Mw:35000) | | | | | | | | | | | | | |
| | Cellulosic resin 3(Mw:13000) | | | | | | | | | | | | | |
| Dispersant | Solsperse32000 | 3.0 | 3.0 | 3.0 | 3.0 | 3.0 | 3.0 | 3.0 | 3.0 | 3.0 | 3.0 | 3.0 | | |
| Additive | Polyether-modified polydimethylsiloxane | | | | | | | | | | | | | |
| Pigment | Carbon black | | | | | | | | | | | | | |
| | Cyan pigment(P.B.15:4) | | | | | | | | | | | | | |
| | Magenta pigment(P.R.122) | | | | | | | | | | | | | |
| | Yellow pigment(P.Y.155) | | | | | | | | | | | | | |
| | Yellow pigment(P.Y.150) | | | | | | | | | | | | | |
| | Orange pigment(P.O.43) | | | | | | | | | | | | | |
| | Orange pigment(P.O.71) | | | | | | | | | | | | | |
| | Green pigment(P.G.36) | | | | | | | | | | | | | |
| | Green pigment(P.G.58) | | | | | | | | | | | | | |
| | Red pigment(P.R.254) | | | | | | | | | | | | | |
| | White pigment(Titanium oxide) | | | | | | | | | | | | | |
| | Total | 100.0 | 100.0 | 100.0 | 100.0 | 100.0 | 100.0 | 100.0 | 100.0 | 100.0 | 100.0 | 100.0 | 100.0 | |
| | Water content | 0.4 | 0.5 | 0.3 | 0.3 | 0.3 | 0.7 | 0.3 | 0.3 | 0.3 | 0.2 | 0.3 | 0.3 | |
| | Content of impurities derived from organic solvent (b) | 0.19 | 0.17 | 0.42 | 0.20 | 0.25 | 0.12 | 0.30 | 0.16 | 0.18 | 0.11 | 0.16 | 0.25 | 0.16 |
| | Content of impurities derived from dialkyl glycol ether | 0.22 | 0.25 | 0.31 | 0.22 | 0.16 | 0.10 | 0.12 | 0.16 | 0.18 | 0.18 | 0.25 | 0.41 | |

TABLE 6-continued

| Evaluation | | Example B | | | | | | | | |
|---|---|---|---|---|---|---|---|---|---|---|
| | Components | Example 28 | Example 29 | Example 30 | Example 31 | Example 32 | Example 33 | Example 34 | Example 35 | Example 36 |
| Ability to dry during recording | | 4 | 5 | 3 | 5 | 5 | 5 | 5 | 5 | 5 |
| Adhesion strength of original adhesive | | 3 | 5 | 4 | 4 | 4 | 4 | 5 | 5 | 5 |
| Odor | | 4 | 4 | 4 | 5 | 5 | 5 | 5 | 5 | 5 |
| Storage stability | | 4 | 5 | 5 | 4 | 4 | 4 | 4 | 4 | 4 |
| Stretchability | | 5 | 5 | 5 | 5 | 5 | 5 | 5 | 5 | 5 |
| Ejection stability | | 3 | 4 | 3 | 4 | 4 | 4 | 3 | 4 | 4 |
| Blurring | | 3 | 4 | 3 | 4 | 4 | 4 | 4 | 4 | 4 |
| Organic solvent (b) Alkylamide solvent(b1) | N,N-Diethylformamide | 10.0 | 10.0 | 10.0 | 10.0 | 10.0 | 10.0 | 10.0 | 10.0 | 10.0 |
| | N,N-Diethylpropanamide | | | | | | | | | |
| | N,N-Diethylacetamide | | | | | | | | | |
| | N,N-Dimethylformamide | | | | | | | | | |
| | N,N-Dimethylacetamide | | | | | | | | | |
| Organic solvent (b) Cyclic amide solvent(b2) | ε-Caprolactam | | | | | | | | | |
| | N-Methylcaprolactam | | | | | | | | | |
| | N-Acetylcaprolactam | | | | | | | | | |
| | N-Vinylcaprolactam | | | | | | | | | |
| | 1,3-Dimethylimidazolidinone | | | | | | | | | |
| | N-Methyloxazolidinone | | | | | | | | | |
| | N-Methyl-2-pyrolidone | | | | | | | | | |
| Organic solvent (b) Six- or more-membered ring lactone solvent(b3) | δ-Valerolactone | | | | | | | | | |
| | δ-Hexanolactone | | | | | | | | | |
| | ε-Caprolactone | 71.0 | 71.0 | 71.0 | 71.0 | 71.0 | 71.0 | 71.0 | 71.0 | 71.0 |
| Additional solvent | Diethylene glycol methyl ethyl ether | 10.0 | 10.0 | 10.0 | 10.0 | 10.0 | 10.0 | 10.0 | 10.0 | 10.0 |
| | Triethylene glycol mono-n-butyl ether | | | | | | | | | |
| | Dipropylene glycol monomethyl ether | | | | | | | | | |
| | Propylene carbonate | | | | | | | | | |
| | Ethylene glycol monobutyl ether acetate | | | | | | | | | |
| | γ-Butyrolactone | | | | | | | | | |
| | γ-Valerolactone | | | | | | | | | |
| | 3-Methoxy-N,N-dimethylpropanamide | | | | | | | | | |
| Acrylic resin | Acrylic resin 1((Mw):120000) | 4.5 | | | | | | | | |
| | Acrylic resin 2((Mw):90000) | | 4.5 | | | | | | | |
| | Acrylic resin 3((Mw):80000) | | | 4.5 | | | | | | |
| | Acrylic resin 4((Mw):55000) | | | | 4.5 | | | | | |
| | Acrylic resin 5((Mw):40000) | | | | | 4.5 | | | | |
| | Acrylic resin 6((Mw):15000) | | | | | | | | | |
| | Acrylic resin 7((Mw):10000) | | | | | | | | | |
| Vinyl chloride-vinyl acetate copolymer | Vinyl chloride-vinyl acetate copolymer 1((Mw):90000) | | | | | | | | | |
| | Vinyl chloride-vinyl acetate copolymer 2((Mw):80000) | | | | | | | | | |
| | Vinyl chloride-vinyl acetate copolymer 3((Mw):55000) | | | | | | | | | |
| | Vinyl chloride-vinyl acetate copolymer 4((Mw):40000) | | | | | | | | | |

TABLE 6-continued

|  |  | | | | | | | | | |
|---|---|---|---|---|---|---|---|---|---|---|
| | Vinyl chloride-vinyl acetate copolymer 5(Mw:35000) | | | | 4.5 | | | | | |
| | Vinyl chloride-vinyl acetate copolymer 6(Mw:30000) | | | | | 4.5 | | | | |
| | Vinyl chloride-vinyl acetate copolymer 7(Mw:20000) | | | | | | 4.5 | | | |
| Cellulosic resin | Cellulosic resin 1(Mw:50000) | | | | | | | 4.5 | | |
| | Cellulosic resin 2(Mw:35000) | | | | | | | | 4.5 | |
| | Cellulosic resin 3(Mw:13000) | | | | | | | | | 4.5 |
| Dispersant | Solsperse32000 | 1.5 | 1.5 | 1.5 | 1.5 | 1.5 | 1.5 | 1.5 | 1.5 | 1.5 |
| Additive | Polyether-modified polydimethylsiloxane | | | | | | | | | |
| Pigment | Carbon black | 3.0 | 3.0 | 3.0 | 3.0 | 3.0 | 3.0 | 3.0 | 3.0 | 3.0 |
| | Cyan pigment(P.B.15:4) | | | | | | | | | |
| | Magenta pigment(P.R.122) | | | | | | | | | |
| | Yellow pigment(P.Y.155) | | | | | | | | | |
| | Yellow pigment(P.Y.150) | | | | | | | | | |
| | Orange pigment(P.O.43) | | | | | | | | | |
| | Orange pigment(P.O.71) | | | | | | | | | |
| | Green pigment(P.G.36) | | | | | | | | | |
| | Green pigment(P.G.58) | | | | | | | | | |
| | Red pigment(P.R.254) | | | | | | | | | |
| | White pigment(Titanium oxide) | | | | | | | | | |
| | Total | 100.0 | 100.0 | 100.0 | 100.0 | 100.0 | 100.0 | 100.0 | 100.0 | 100.0 |
| Water content | | 0.3 | 0.3 | 0.3 | 0.3 | 0.3 | 0.3 | 0.3 | 0.3 | 0.3 |
| Content of impurities derived from organic solvent (b) | | 0.16 | 0.16 | 0.16 | 0.15 | 0.15 | 0.16 | 0.16 | 0.16 | 0.16 |
| Content of impurities derived from dialkyl glycol ether | | 0.26 | 0.20 | 0.15 | 0.09 | 0.17 | 0.42 | 0.20 | 0.25 | 0.24 |
| Evaluation | Ability to dry during recording | 5 | 5 | 5 | 5 | 5 | 5 | 5 | 5 | 5 |
| | Adhesion strength of original adhesive | 5 | 5 | 5 | 5 | 5 | 5 | 5 | 5 | 5 |
| | Odor | 5 | 5 | 5 | 5 | 5 | 5 | 5 | 5 | 5 |
| | Storage stability | 5 | 5 | 5 | 5 | 5 | 5 | 5 | 5 | 5 |
| | Stretchability | 5 | 5 | 2 | 5 | 5 | 5 | 3 | 3 | 3 |
| | Ejection stability | 4 | 4 | 4 | 2 | 3 | 4 | 4 | 4 | 4 |
| | Blurring | 4 | 4 | 4 | 4 | 4 | 4 | 4 | 4 | 4 |

TABLE 7

| | | Example B | | | | | | | | | | | | |
|---|---|---|---|---|---|---|---|---|---|---|---|---|---|---|
| | | Example 37 | Example 38 | Example 39 | Example 40 | Example 41 | Example 42 | Example 43 | Example 44 | Example 45 | Example 46 | Example 47 | Example 48 | Example 49 | Example 50 |
| Organic solvent (b) Alkylamide solvent (b1) | N,N-Diethylformamide | 10.0 | | | | | | | | | | | | | 10.0 |
| | N,N-Diethylpropanamide | | 10.0 | | | | | | | | | | | | |
| | N,N-Diethylacetamide | | | 10.0 | | | | | | | | | | | |
| | N,N-Dimethylformamide | | | | 10.0 | | | | | | | | | | |
| | N,N-Dimethylacetamide | | | | | | 10.0 | | | | | | | | |
| Organic solvent (b) Cyclic amide solvent (b2) | ε-Caprolactam | | | | | | | | | | | | | | |
| | N-Methylcaprolactam | | | | | | | | | | | | | | |
| | N-Acetylcaprolactam | | | | | | | | | | | | | | |
| | N-Vinylcaprolactam | | | | | | | | | | | | | | |
| | 1,3-Dimethylimidazolidinone | | | | | | | | | | | | | | |
| | N-Methyloxazolidinone | | | | | | | | | | | | | | |
| | N-Methyl-2-pyrolidone | | | | | 10.0 | | | | | | | | | |
| Organic solvent (b) Six- or more-membered ring lactone solvent (b3) | δ-Valerolactone | | | | | | | | | | | | | | |
| | δ-Hexanolactone | | | | | | | | | | | | | | |
| | ε-Caprolactone | | | | | | | | | | | | | | |
| Additional solvent | Diethylene glycol methyl ethyl ether | 71.0 | 71.0 | 71.0 | 71.0 | 71.0 | 71.0 | 70.0 | 70.0 | 70.0 | 73.5 | 73.5 | 73.5 | 73.4 | 71.0 |
| | Triethylene glycol mono-n-butyl ether | | | | | | | | | | | | | | |
| | Dipropylene glycol monomethyl ether | 10.0 | 10.0 | 10.0 | 10.0 | 10.0 | 10.0 | 10.0 | 10.0 | 10.0 | 10.0 | 10.0 | 10.0 | 10.0 | 10.0 |
| | Propylene carbonate | | | | | | | | | | | | | | |
| | Ethylene glycol monobutyl ether acetate | | | | | | | | | | | | | | |
| | γ-Butyrolactone | | | | | | | | | | | | | | |
| | γ-Valerolactone | | | | | | | | | | | | | | |
| | 3-Methoxy-N,N-dimethylpropanamide | | | | | | | | | | | | | | |
| Acrylic resin | Acrylic resin 1 (|Mw|:120000) | 3.0 | 3.0 | 3.0 | 3.0 | 3.0 | 3.0 | 3.0 | 3.0 | 3.0 | 3.0 | 3.0 | 3.0 | 3.0 | 3.0 |
| | Acrylic resin 2 (|Mw|:90000) | | | | | | | | | | | | | | |
| | Acrylic resin 3 (|Mw|:80000) | | | | | | | | | | | | | | |
| | Acrylic resin 4 (|Mw|:55000) | | | | | | | | | | | | | | |
| | Acrylic resin 5 (|Mw|:40000) | | | | | | | | | | | | | | |
| | Acrylic resin 6 (|Mw|:15000) | | | | | | | | | | | | | | |
| | Acrylic resin 7 (|Mw|:10000) | | | | | | | | | | | | | | |
| Vinyl chloride-vinyl acetate copolymer | Vinyl chloride-vinyl acetate copolymer 1 (|Mw|:90000) | 1.5 | 1.5 | 1.5 | 1.5 | 1.5 | 1.5 | 1.5 | 1.5 | 1.5 | 1.5 | 1.5 | 1.5 | 1.5 | 1.5 |
| | Vinyl chloride-vinyl acetate copolymer 2 (|Mw|:80000) | | | | | | | | | | | | | | |
| | Vinyl chloride-vinyl acetate copolymer 3 (|Mw|:55000) | | | | | | | | | | | | | | |
| | Vinyl chloride-vinyl acetate copolymer 4 (|Mw|:40000) | | | | | | | | | | | | | | |
| | Vinyl chloride-vinyl acetate copolymer 5 (|Mw|:35000) | | | | | | | | | | | | | | |
| | Vinyl chloride-vinyl acetate copolymer 6 (|Mw|:30000) | | | | | | | | | | | | | | |
| | Vinyl chloride-vinyl acetate copolymer 7 (|Mw|:20000) | | | | | | | | | | | | | | |

TABLE 7-continued

| | | Example 51 | Example 52 | Example 53 | Example 54 | Example 55 | Example 56 | Example 57 | Example 58 | Example 59 | Example 60 |
|---|---|---|---|---|---|---|---|---|---|---|---|
| Cellulosic resin | Cellulosic resin 1(Mw:50000) | 1.5 | 1.5 | 1.5 | 1.5 | 1.5 | 1.5 | 1.5 | 1.5 | 1.5 | 1.5 |
| | Cellulosic resin 2(Mw:35000) | | | | | | | | | 0.5 | 0.1 |
| | Cellulosic resin 3(Mw:13000) | | | | | | | | | | |
| Dispersant | Solsperse32000 | 3.0 | 3.0 | 3.0 | 3.0 | | | 0.5 | 0.5 | | |
| Additive | Polyether-modified polydimethylsiloxane | | | | | | | | | | |
| Pigment | Carbon black | | 3.0 | 3.0 | | | | | | | |
| | Cyan pigment(P.B.15:4) | | | | 3.0 | | | | | | |
| | Magenta pigment(P.R.122) | | | | | 4.0 | | | | | |
| | Yellow pigment(P.Y.155) | | | | | | 4.0 | | | | |
| | Yellow pigment(P.Y.150) | | | | | | | | 0.5 | | |
| | Orange pigment(P.O.43) | | | | | | | | | 0.5 | |
| | Orange pigment(P.O.71) | | | | | | | | | | |
| | Green pigment(P.G.36) | | | | | | | | | | |
| | Green pigment(P.G.58) | | | | | | | | | | |
| | Red pigment(P.R.254) | | | | | | | | | | |
| | White pigment(Titanium oxide) | | | | | | | | | | 3.0 |
| Total | | 100.0 | 100.0 | 100.0 | 100.0 | 100.0 | 100.0 | 100.0 | 100.0 | 100.0 | 100.0 |
| Water content | | 1.2 | 0.3 | 0.5 | 0.4 | 0.5 | 0.5 | 0.1 | 0.2 | 0.3 | 0.3 |
| Content of impurities derived from organic solvent (b) | | 0.15 | 0.35 | 0.25 | 0.20 | 0.21 | 0.24 | 0.22 | 0.24 | 0.18 | 0.18 |
| Content of impurities derived from dialkyl glycol ether | | 0.15 | 0.16 | 0.18 | 0.24 | 0.12 | 0.16 | 0.16 | 0.13 | 0.13 | 0.16 |
| Evaluation | Ability to dry during recording | 3 | 5 | 5 | 5 | 5 | 5 | 5 | 5 | 5 | 5 |
| | Adhesion strength of original adhesive | 3 | 2 | 2 | 5 | 5 | 5 | 5 | 5 | 5 | 5 |
| | Odor | 5 | 5 | 5 | 5 | 5 | 5 | 5 | 5 | 5 | 5 |
| | Storage stability | 5 | 2 | 2 | 5 | 5 | 5 | 5 | 5 | 5 | 5 |
| | Stretchability | 2 | 5 | 5 | 5 | 5 | 5 | 5 | 5 | 5 | 5 |
| | Ejection stability | 2 | 5 | 5 | 5 | 5 | 5 | 5 | 5 | 5 | 5 |
| | Blurring | 4 | 4 | 4 | 4 | 4 | 4 | 4 | 4 | 4 | 4 |
| | | 4 | 4 | 4 | 4 | 4 | 4 | 4 | 4 | 4 | 4 |

Example B

| | | Example 51 | Example 52 | Example 53 | Example 54 | Example 55 | Example 56 | Example 57 | Example 58 | Example 59 | Example 60 |
|---|---|---|---|---|---|---|---|---|---|---|---|
| Organic solvent (b) Alkylamide solvent(b1) | N,N-Diethylformamide | 10.0 | 10.0 | 10.0 | 10.0 | 10.0 | 10.0 | | | | |
| | N,N-Diethylpropanamide | | | | | | | | | | |
| | N,N-Diethylacetamide | | | | | | | | | | |
| | N,N-Dimethylformamide | | | | | | | | | 5.0 | |
| | N,N-Dimethylacetamide | | | | | | | | | | 5.0 |
| Organic solvent (b) Cyclic amide solvent(b2) | ε-Caprolactam | | | | | | | | | | |
| | N-Methylcaprolactam | | | | | | | | | | |
| | N-Acetylcaprolactam | | | | | | | | | | |
| | N-Vinylcaprolactam | | | | | | | | | | |
| | 1,3-Dimethylimidazolidinone | | | | | | | | | | |
| | N-Methyloxazolidinone | | | | | | | | | | |
| | N-Methyl-2-pyrrolidone | | | | | | | | | | |
| Organic solvent (b) Six- or more-membered ring lactone solvent(b3) | δ-Valerolactone | | | | | | | 5.0 | | | |
| | δ-Hexanolactone | | | | | | | | 20.0 | | |
| | ε-Caprolactone | | | | | | | | | | |
| Additional solvent | Diethylene glycol methyl ethyl ether | 71.5 | 71.5 | 71.0 | 71.0 | 71.0 | 59.0 | | | | |
| | Triethylene glycol mono-n-butyl ether | | | | | | | | | | |

TABLE 7-continued

| | | | | | | | | | | | |
|---|---|---|---|---|---|---|---|---|---|---|---|
| | Dipropylene glycol monomethyl ether | 10.0 | 10.0 | 10.0 | 10.0 | 10.0 | 10.0 | | | 10.0 | 10.0 |
| | Propylene carbonate | | | | | | | | | | |
| | Ethylene glycol monobutyl ether acetate | | | | | | | 85.9 | 70.9 | 75.9 | 75.9 |
| | γ-Butyrolactone | | | | | | | | | | |
| | γ-Valerolactone | | | | | | | | | | |
| | 3-Methoxy-N,N-dimethylpropanamide | | | | | | | | | | |
| Acrylic resin | Acrylic resin 1 (Mw:120000) | | | | | | | | | | |
| | Acrylic resin 2 (Mw:90000) | | | | | | | | | | |
| | Acrylic resin 3 (Mw:80000) | | | | | | | | | | |
| | Acrylic resin 4 (Mw:55000) | 3.0 | | 3.0 | 3.0 | 3.0 | 3.0 | | | | |
| | Acrylic resin 5 (Mw:40000) | | | | | | | | | | |
| | Acrylic resin 6 (Mw:15000) | | | | | | | | | | |
| | Acrylic resin 7 (Mw:10000) | | | | | | | | | | |
| Vinyl chloride-vinyl acetate copolymer | Vinyl chloride-vinyl acetate copolymer 1 (Mw:90000) | | | | | | | | | | |
| | Vinyl chloride-vinyl acetate copolymer 2 (Mw:80000) | | | | | | | | | | |
| | Vinyl chloride-vinyl acetate copolymer 3 (Mw:55000) | | | | | | | | | | |
| | Vinyl chloride-vinyl acetate copolymer 4 (Mw:40000) | 1.5 | | 1.5 | 1.5 | 1.5 | 1.5 | 4.5 | 4.5 | 4.5 | 4.5 |
| | Vinyl chloride-vinyl acetate copolymer 5 (Mw:35000) | | | | | | | | | | |
| | Vinyl chloride-vinyl acetate copolymer 6 (Mw:30000) | | | | | | | | | | |
| | Vinyl chloride-vinyl acetate copolymer 7 (Mw:20000) | | | | | | | | | | |
| Cellulosic resin | Cellulosic resin 1 (Mw:50000) | 1.5 | 1.5 | 1.5 | 1.5 | 1.5 | 1.5 | 1.5 | 1.5 | 1.5 | 1.5 |
| | Cellulosic resin 2 (Mw:35000) | | | | | | | | | | |
| | Cellulosic resin 3 (Mw:13000) | | | | | | | | | | |
| Dispersant | Solsperse32000 | 2.5 | 2.5 | | | | | | | | |
| Additive | Polyether-modified polydimethylsiloxane | | | | | | | 0.1 | 0.1 | 0.1 | 0.1 |
| Pigment | Carbon black | | | | | | | 3.0 | 3.0 | 3.0 | 3.0 |
| | Cyan pigment (P.B.15:4) | | | | | | | | | | |
| | Magenta pigment (P.R.122) | | | | | | | | | | |
| | Yellow pigment (P.Y.155) | | | | | | | | | | |
| | Yellow pigment (P.Y.150) | | | | | | | | | | |
| | Orange pigment (P.O.43) | | | | | | | | | | |
| | Orange pigment (P.O.71) | 2.5 | | | | | | | | | |
| | Green pigment (P.G.36) | | | 3.0 | | | | | | | |
| | Green pigment (P.G.58) | | | | 3.0 | | | | | | |
| | Red pigment (P.R.254) | | | | | 3.0 | | | | | |
| | White pigment (Titanium oxide) | | | | | | 15.0 | | | | |
| Total | | 100.0 | 100.0 | 100.0 | 100.0 | 100.0 | 100.0 | 100.0 | 100.0 | 100.0 | 100.0 |
| Water content | | 0.4 | 0.5 | 0.1 | 0.2 | 0.3 | 0.1 | 0.3 | 0.2 | 0.3 | 0.2 |
| Content of impurities derived from organic solvent (b) | | 0.20 | 0.21 | 0.22 | 0.24 | 0.18 | 0.15 | 0.24 | 0.18 | 0.24 | 0.18 |
| Content of impurities derived from dialkyl glycol ether | | 0.13 | 0.13 | 0.13 | 0.15 | 0.13 | 0.16 | | | | |
| Evaluation — Ability to dry during recording | | 5 | 5 | 5 | 5 | 5 | 5 | 4 | 4 | 4 | 4 |
| Evaluation — Adhesion strength of original adhesive | | 5 | 5 | 5 | 5 | 5 | 5 | 2 | 2 | 2 | 2 |
| Evaluation — Odor | | 5 | 5 | 5 | 5 | 5 | 5 | 2 | 2 | 2 | 2 |
| Evaluation — Storage stability | | 5 | 5 | 5 | 5 | 5 | 5 | 4 | 3 | 4 | 4 |
| Evaluation — Stretchability | | 5 | 5 | 5 | 5 | 5 | 5 | 5 | 5 | 5 | 5 |

TABLE 7-continued

| | | Example 61 | Example 62 | Example 63 | Example 64 | Example 65 | Example 66 | Example 67 | Example 68 | Example 69 | Example 70 |
|---|---|---|---|---|---|---|---|---|---|---|---|
| | | | | | | | Comparative Example B | | | | |
| Ejection stability | | 4 | 4 | 4 | 4 | 4 | 4 | 4 | 4 | 4 | 4 |
| Blurring | | 4 | 4 | 4 | 4 | 4 | 3 | 3 | 3 | 3 | 3 |
| Organic solvent (b) Alkylamide solvent(b1) | N,N-Diethylformamide | 10.0 | | | | 10.0 | | | | | |
| | N,N-Diethylpropanamide | | 10.0 | | | | | | | | |
| | N,N-Diethylacetamide | | | | | | | | | | |
| | N,N-Dimethylformamide | | | | | | | | | | |
| | N,N-Dimethylacetamide | | | | | | | | | | |
| Organic solvent (b) Cyclic amide solvent(b2) | ε-Caprolactam | | | | | | | | | | |
| | N-Methylcaprolactam | | | | | | 10.0 | | | | |
| | N-Acetylcaprolactam | | | | | | | | | | |
| | N-Vinylcaprolactam | | | | | | | | | | |
| | 1,3-Dimethylimidazolidinone | | | | | | | | | | |
| | N-Methyloxazolidinone | | | | | | | | | | |
| | N-Methyl-2-pyrolidone | | | | | | | | | | |
| Organic solvent (b) Six- or more-membered ring lactone solvent(b3) | δ-Valerolactone | | | | | | | | | | |
| | δ-Hexanolactone | | | | | | | | | | |
| | ε-Caprolactone | | | | | | | | | | |
| Additional solvent | Diethylene glycol methyl ethyl ether | 71.0 | 71.0 | 71.0 | 71.0 | 71.0 | 71.0 | 71.0 | 71.0 | | |
| | Triethylene glycol mono-n-butyl ether | | | | | | | | | | |
| | Dipropylene glycol monomethyl ether | | | | | | | | | | |
| | Propylene carbonate | | | | | | | | | | |
| | Ethylene glycol monobutyl ether acetate | | | | | | | | | 85.9 | 85.9 |
| | γ-Butyrolactone | | | 4.5 | | | | | | 5.0 | 5.0 |
| | γ-Valerolactone | | | | | | | 10.0 | | | |
| | 3-Methoxy-N,N-dimethylpropanamide | | | | 4.5 | | | | 10.0 | | |
| Acrylic resin | Acrylic resin 1 (|Mw|:120000) | 4.5 | | | | | | | | | |
| | Acrylic resin 2 (|Mw|:90000) | | 4.5 | | | | | | | | |
| | Acrylic resin 3 (|Mw|:80000) | | | | | | | | | | |
| | Acrylic resin 4 (|Mw|:55000) | | | | | | | | | | |
| | Acrylic resin 5 (|Mw|:40000) | | | | | | 3.0 | 3.0 | 3.0 | 1.5 | 3.0 |
| | Acrylic resin 6 (|Mw|:15000) | | | | | | | | | | |
| | Acrylic resin 7 (|Mw|:10000) | | | | | | | | | | |
| Vinyl chloride-vinyl acetate copolymer | Vinyl chloride-vinyl acetate copolymer 1 (|Mw|:90000) | | | | | | | | | | |
| | Vinyl chloride-vinyl acetate copolymer 2 (|Mw|:80000) | | | | | | | | | | |
| | Vinyl chloride-vinyl acetate copolymer 3 (|Mw|:55000) | | | | | | | | | | |
| | Vinyl chloride-vinyl acetate copolymer 4 (|Mw|:40000) | | | | | | | | | | |
| | Vinyl chloride-vinyl acetate copolymer 5 (|Mw|:35000) | | | | | | 1.5 | 1.5 | 1.5 | 3.0 | 1.5 |
| | Vinyl chloride-vinyl acetate copolymer 6 (|Mw|:30000) | | | | | | | | | | |
| | Vinyl chloride-vinyl acetate copolymer 7 (|Mw|:20000) | | | | | | | | | | |

TABLE 7-continued

| | | | | | | | | | | | |
|---|---|---|---|---|---|---|---|---|---|---|---|
| Cellulosic resin | Cellulosic resin 1 (\|Mw\|:50000) | | | | | | | | | | |
| | Cellulosic resin 2 (\|Mw\|:35000) | | | | | 4.5 | | | | | |
| | Cellulosic resin 3 (\|Mw\|:13000) | 1.5 | 1.5 | 1.5 | 1.5 | 1.5 | 1.5 | 1.5 | 1.5 | 1.5 | 1.5 |
| Dispersant | Solsperse32000 | | | | | | | | | 0.1 | 0.1 |
| Additive | Polyether-modified polydimethylsiloxane | | | | | | | | | | |
| Pigment | Carbon black | 3.0 | 3.0 | 3.0 | 3.0 | 3.0 | 3.0 | 3.0 | 3.0 | 3.0 | 3.0 |
| | Cyan pigment (P.B.15:4) | | | | | | | | | | |
| | Magenta pigment (P.R.122) | | | | | | | | | | |
| | Yellow pigment (P.Y.155) | | | | | | | | | | |
| | Yellow pigment (P.Y.150) | | | | | | | | | | |
| | Orange pigment (P.O.43) | | | | | | | | | | |
| | Orange pigment (P.O.71) | | | | | | | | | | |
| | Green pigment (P.G.36) | | | | | | | | | | |
| | Green pigment (P.G.58) | | | | | | | | | | |
| | Red pigment (P.R.254) | | | | | | | | | | |
| | White pigment (Titanium oxide) | | | | | | | | | | |
| | Total | 100.0 | 100.0 | 100.0 | 100.0 | 100.0 | 100.0 | 100.0 | 100.0 | 100.0 | 100.0 |
| Water content | | 0.4 | 0.4 | 0.4 | 0.4 | 0.4 | 0.4 | 0.2 | 0.3 | 0.4 | 0.3 |
| Content of impurities derived from organic solvent (b) | | 0.24 | 0.18 | 0.15 | 0.24 | 0.18 | 0.24 | 0.26 | 0.25 | | |
| Content of impurities derived from dialkyl glycol ether | | 0.27 | 0.19 | 0.18 | 0.16 | 0.28 | | | | | |
| Evaluation | Ability to dry during recording | 5 | 5 | 5 | 5 | 5 | 5 | 5 | 5 | 3 | 3 |
| | Adhesion strength of original adhesive | 5 | 5 | 5 | 5 | 5 | 1 | 1 | 1 | 2 | 2 |
| | Odor | 5 | 5 | 5 | 5 | 5 | 5 | 2 | 3 | 1 | 1 |
| | Storage stability | 5 | 5 | 5 | 5 | 1 | 4 | 5 | 2 | 4 | 4 |
| | Stretchability | 1 | 1 | 1 | 1 | 4 | 5 | 4 | 5 | 5 | 5 |
| | Ejection stability | 4 | 4 | 4 | 4 | 4 | 4 | 4 | 4 | 4 | 4 |
| | Blurring | 4 | 4 | 4 | 4 | 4 | 4 | 4 | 4 | 3 | 3 |

As is evident from Tables 6 and 7, the nonaqueous ink compositions containing the organic solvent (b) and the resin with a weight average absolute molecular weight of 15,000 or more and 80,000 or less can also be used to record (print) on one side of a resin substrate with a pressure-sensitive adhesive layer on the other side, and even in such a case, they are less likely to deteriorate the adhesion properties of the pressure-sensitive adhesive layer (the adhesion between the recorded product and the adherend), and are effectively prevented from causing blushing of the decorated layer even during the stretching of the recorded product. The nonaqueous ink compositions containing the organic solvent (b) and the resin with a weight average absolute molecular weight of 15,000 or more and 80,000 or less had a high ability to dry during recording, high storage stability, and high ejection stability and were favorable in terms of odor and less likely to cause blurring. Moreover, Examples 42 to 56 containing colorants of different colors showed the same results as those of Example 3 containing carbon black.

A comparison was made between nonaqueous ink composition examples containing 10.0 mass % of the organic solvent (b), such as Examples 3, 5, and 6 (containing the alkylamide solvent (b1)), Examples 7, 10, and 11 (containing the cyclic amide solvent (b2)), and Examples 12, 13, and 16 (containing the six- or more-membered ring lactone solvent (b3)). As a result, Examples 3, 5, 6, 7, 10, and 11, which contain the alkyl amide solvent (b1) or the cyclic amide solvent (b2) as the organic solvent (b), were found to allow the original adhesive to maintain a higher adhesion strength than Examples 12, 13, and 16.

A comparison was also made between Examples 1 to 4, which contain N,N-diethylformamide (the alkylamide solvent (b1)) as the organic solvent (b). As a result, Examples 3 and 4, which contain at most 15.0 mass % of the organic solvent (b), were found to allow the original adhesive to maintain a higher adhesion strength.

A comparison was also made, for example, between Examples 3 and 17 to 19, which share common features except that they contain resins with different weight average absolute molecular weights. As a result, Examples 3, 17, and 18, in which the resin has a weight average absolute molecular weight of at least 25,000, were found to provide higher stretchability, and in particular, Examples 3 and 17, in which the resin has a weight average absolute molecular weight of at least 32,500, were found to provide particularly higher stretchability.

The nonaqueous ink composition of Example 3 with a lower water content had better storage stability and a higher ability to dry during recording than Example 37 having the same proportion of components. The nonaqueous ink composition of Example 3 with a lower concentration of impurities derived from the organic solvent (b) and the dialkyl glycol ether had a higher ability to dry, allowed the original adhesive to maintain a higher adhesion strength, and was more favorable in terms of odor than Example 38 having the same proportion of components.

On the other hand, Examples 61, 62, and 64, which contain a resin with a weight average absolute molecular weight of more than 80,000, did not have good ejection stability. Examples 63 and 65, which contain a resin with a weight average absolute molecular weight of less than 15,000, provided lower stretchability. The nonaqueous ink compositions of Examples 66 to 70, which contain a five-membered ring lactone solvent or 3-methoxy-N,N-dimethylpropanamide instead of the organic solvent (b), deteriorated the adhesion strength of the original adhesive.

The invention claimed is:

1. A nonaqueous ink composition comprising organic solvents,
    the organic solvents including an organic solvent (a) and an organic solvent (b),
    wherein the organic solvent (a) is a dialkyl glycol ether, and
    wherein the organic solvent (b) is at least one selected from the group consisting of an alkylamide solvent (b1), a cyclic amide solvent (b2), and a six- or more-membered ring lactone solvent (b3).

2. The nonaqueous ink composition according to claim 1, wherein the content of the organic solvent (b) is in a range of 3.0 mass % or more and 30.0 mass % or less based on the total mass of the nonaqueous ink composition.

3. The nonaqueous ink composition according to claim 1, wherein the organic solvent (a) is a dialkyl glycol ether represented by formula (1):

[Chem. 1]

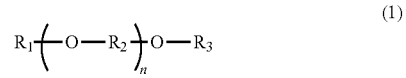

(1)

where $R_1$ and $R_3$ each represent an alkyl group, $R_2$ represents an ethylene or propylene group, and
n represents an integer of 2 to 4.

4. The nonaqueous ink composition according to claim 3, wherein the total number of carbon atoms in $R_1$ and $R_3$ in formula (1) is two or more and six or less.

5. The nonaqueous ink composition according to claim 4, wherein in formula (1) for the organic solvent (a), $R_1$ is a methyl or ethyl group and $R_3$ is an ethyl group,
and/or
in formula (1), $R_1$ and $R_3$ are methyl groups and $R_2$ is a propylene group.

6. The nonaqueous ink composition according to claim 1,
    wherein the content of impurities derived from the organic solvent (a) is 0.5 mass % or less based on the total mass of the organic solvent (a), and
    wherein the content of impurities derived from the organic solvent (b) is 0.5 mass % or less based on the total mass of the organic solvent (b).

7. The nonaqueous ink composition according to claim 1, wherein the organic solvent (b) is an alkylamide solvent (b1).

8. The nonaqueous ink composition according to claim 7, wherein the alkylamide solvent (b1) is represented by formula (2):

[Chem. 2]

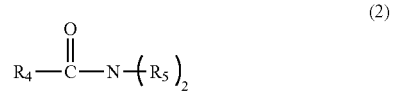

(2)

where $R_4$ represents hydrogen or an alkyl group having one or more and four or less carbon atoms, and $R_5$ represents an alkyl group having two or more and four or less carbon atoms.

9. The nonaqueous ink composition according to claim 8, wherein the alkylamide solvent (b1) comprises at least one selected from the group consisting of N,N-diethylformamide, N,N-diethylpropanamide, and N,N-diethylacetamide.

10. The nonaqueous ink composition according to claim 1, wherein the organic solvent (b) is a cyclic amide solvent (b2).

11. The nonaqueous ink composition according to claim 10, wherein the cyclic amide solvent (b2) is represented by formula (3):

[Chem. 3]

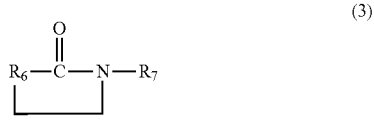

(3)

where $R_6$ represents an alkylene group having four or more and five or less carbon atoms, and $R_7$ represents hydrogen, an alkyl group having one or more and two or less carbon atoms, or an unsaturated hydrocarbon group.

12. The nonaqueous ink composition according to claim 11, wherein the cyclic amide solvent (b2) comprises at least one selected from the group consisting of ε-caprolactam, N-methylcaprolactam, and N-vinylcaprolactam.

13. The nonaqueous ink composition according to claim 1, wherein the organic solvent (b) is a six- or more-membered ring lactone solvent (b3).

14. The nonaqueous ink composition according to claim 13, wherein the six- or more-membered ring lactone solvent (b3) is represented by formula (4):

[Chem. 4]

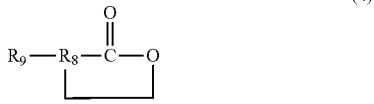

(4)

where $R_8$ represents an alkylene group having four or more and five or less carbon atoms, and $R_9$ represents hydrogen or an alkyl group having one or more and two or less carbon atoms.

15. The nonaqueous ink composition according to claim 14, wherein the six- or more-membered ring lactone solvent (b3) comprises at least one selected from the group consisting of δ-valerolactone, δ-hexanolactone, and ε-caprolactone.

16. The nonaqueous ink composition according to claim 1, wherein the content of water is 1.0 mass % or less based on the total mass of the nonaqueous ink composition.

17. The nonaqueous ink composition according to claim 1, wherein the nonaqueous ink composition is for use on a resin substrate.

18. A recording method comprising ejecting the nonaqueous ink composition according to claim 1 onto a surface of a substrate by an inkjet method.

19. A method for producing a recorded product, the method comprising ejecting the nonaqueous ink composition according to claim 1 onto a surface of a substrate by an inkjet method.

20. A nonaqueous ink composition comprising an organic solvent and a resin,
wherein the organic solvent includes an organic solvent (b),
wherein the resin has a weight average absolute molecular weight of 15,000 or more and 80,000 or less, and
wherein the organic solvent (b) is at least one selected from the group consisting of an alkylamide solvent (b1), a cyclic amide solvent (b2), and a six- or more-membered ring lactone solvent (b3).

21. The nonaqueous ink composition according to claim 20, wherein the resin comprises at least one selected from the group consisting of an acrylic resin, a vinyl chloride-vinyl acetate copolymer resin, and a cellulosic resin.

22. The nonaqueous ink composition according to claim 20, wherein the content of impurities derived from the organic solvent (b) is 0.5 mass % or less based on the total mass of the organic solvent (b).

* * * * *